(12) United States Patent
Ramasubramonian et al.

(10) Patent No.: US 10,003,815 B2
(45) Date of Patent: Jun. 19, 2018

(54) HYPOTHETICAL REFERENCE DECODER MODEL AND CONFORMANCE FOR CROSS-LAYER RANDOM ACCESS SKIPPED PICTURES

(71) Applicant: QUALCOMM Incorporated, San Diego, CA (US)

(72) Inventors: Adarsh Krishnan Ramasubramonian, San Diego, CA (US); Ye-Kui Wang, San Diego, CA (US); Ying Chen, San Diego, CA (US); Krishnakanth Rapaka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 773 days.

(21) Appl. No.: 14/293,829

(22) Filed: Jun. 2, 2014

(65) Prior Publication Data

US 2014/0355692 A1 Dec. 4, 2014

Related U.S. Application Data

(60) Provisional application No. 61/830,512, filed on Jun. 3, 2013.

(51) Int. Cl.
*H04N 7/12* (2006.01)
*H04N 19/46* (2014.01)
*H04N 19/597* (2014.01)
*H04N 19/70* (2014.01)
*H04N 19/30* (2014.01)
(Continued)

(52) U.S. Cl.
CPC ............. *H04N 19/46* (2014.11); *H04N 19/30* (2014.11); *H04N 19/573* (2014.11); *H04N 19/58* (2014.11); *H04N 19/597* (2014.11); *H04N 19/70* (2014.11)

(58) Field of Classification Search
USPC ........................................ 375/240.01–240.26
See application file for complete search history.

(56) References Cited

U.S. PATENT DOCUMENTS

| | | | |
|---|---|---|---|
| 8,411,746 B2 | 4/2013 | Chen et al. | |
| 8,976,871 B2 | 3/2015 | Chen et al. | |
| 9,674,532 B2 * | 6/2017 | Kim | ..................... H04N 19/105 |

(Continued)

FOREIGN PATENT DOCUMENTS

| | | |
|---|---|---|
| CN | 102106156 A | 6/2011 |
| EP | 2304955 A1 | 4/2011 |

(Continued)

OTHER PUBLICATIONS

Tech, et al., "MV-HEVC Draft Text 4," Joint Collaborative Team on Video Coding (JCT-VC) of ITU-T SG 16 WP 3 and ISO/IEC JCT 1/SC 29/WG 11, No. JCT3V-D1004_d0, version 1, Apr. 20-26, 2013; 4th Meeting; May 13, 2013; 53 pp.

(Continued)

*Primary Examiner* — Farzana Hossain
(74) *Attorney, Agent, or Firm* — Shumaker & Sieffert, P.A.

(57) ABSTRACT

A device may determine, based on a value, whether all cross-layer random access skipped (CL-RAS) pictures of an intra random access point (IRAP) access unit are present in a video data bitstream. In addition, the device may reconstruct pictures of the video data based at least in part on syntax elements decoded from the video data bitstream.

26 Claims, 8 Drawing Sheets

(51) Int. Cl.
  *H04N 19/573* (2014.01)
  *H04N 19/58* (2014.01)

(56) References Cited

U.S. PATENT DOCUMENTS

| | | | |
|---|---|---|---|
| 2006/0153463 | A1 | 7/2006 | Notoya et al. |
| 2009/0116558 | A1 | 5/2009 | Chen et al. |
| 2010/0232520 | A1 | 9/2010 | Wu et al. |
| 2011/0081133 | A1 | 4/2011 | Chen et al. |
| 2011/0134994 | A1 | 6/2011 | Lu et al. |
| 2013/0272430 | A1 | 10/2013 | Sullivan et al. |
| 2014/0050264 | A1 | 2/2014 | He et al. |
| 2014/0085415 | A1 | 3/2014 | Bici et al. |
| 2014/0301437 | A1 | 4/2014 | Wang |
| 2014/0211849 | A1* | 7/2014 | Deshpande .......... H04N 19/105 375/240.12 |
| 2014/0219346 | A1* | 8/2014 | Ugur ............... H04N 19/00575 375/240.12 |
| 2014/0301453 | A1* | 10/2014 | Deshpande ............ H04N 19/50 375/240.12 |
| 2014/0301476 | A1* | 10/2014 | Deshpande ............ H04N 19/70 375/240.25 |
| 2014/0301477 | A1* | 10/2014 | Deshpande ............ H04N 19/82 375/240.25 |
| 2014/0301485 | A1* | 10/2014 | Ramasubramonian H04N 19/895 375/240.27 |
| 2014/0355692 | A1 | 12/2014 | Ramasubramonian et al. |

FOREIGN PATENT DOCUMENTS

| | | | |
|---|---|---|---|
| JP | 2003319340 | A | 11/2003 |
| JP | 2009512307 | A | 3/2009 |
| JP | 2011529321 | A | 12/2011 |
| WO | 2007042916 | | 4/2007 |
| WO | 2010014123 | A1 | 2/2010 |
| WO | 2010144852 | A1 | 12/2010 |
| WO | 2011035211 | A2 | 3/2011 |

OTHER PUBLICATIONS

Wang, et al., "AHG9: On cross-layer alignments in HEVC 3DV and scalable extensions," Joint Collaborative Team on Video Coding (JCT-VC) of ITU-T SG 16 WP 3 and ISO/IEC JCT 1/SC 29/WG 11; No. JCTVC-M0266_v2, Apr. 18-26, 2013; 13th Meeting; Apr. 21, 2013; 6 pp.

Boyce et al., "Joint BoG report on extension high-level syntax", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL:http://phenix.int-evry.fr/jct2/, No. JCT3V-C0235, XP030130651, 5 pp.

Bross, et al., High Efficiency Video Coding (HEVC) text specification draft 10 (for FDIS & Last Call), JCTVC-L1003 v32 11, Joint Collaborative Team on Video Coding (JCT-VC) of ITU-T SG 16 WP 3 and ISO/IEC JTC 1/SC 29/WG 11 12th Meeting, vol. JCTVC-L1003 v32, revised Mar. 16, 2013, XP055140558, 325 pp.

Bross, et al., "High Efficiency Video Coding (HEVC) text Specification draft 10 (for FDIS & Consent)," JCT-VC Meeting; MPEG Meeting; Jan. 17-23, 2013; Geneva; (Joint Collaborative Team on Video Coding of ISO/IEC JTC1/SC29/WG11 and ITU-T SG.16); Retrieved from the Internet , No. JCTVC-L1003, XP030113948, 321 pp.

Chen, et al., "High efficiency video coding (HEVC) scalable extensions Draft 5", JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P1008-v4, XP030115882, 125 pp.

Chen et al., "SHVC Working Draft 1", JCT-VC Meeting; MPEG Meeting; Jan. 14-23, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-L1008, XP030113953, 33 pp.

Chen et al., "MV-HEVC/SHVC HLS: On restriction and indication of cross-layer IRAP picture distribution" , JCT-VC Meeting; Jul. 27-Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/, No. JCTVC-N0147, XP030114616, 3 pp.

Choi et al., "AHG7: On Random access point pictures and picture order counts for MV-HEVC", JCT-3V Meeting; 103. MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-C0081, XP030130497, 3 pp.

Choi, et al., "MV-HEVC/SHVC HLS: Random access of multiple layers", JCT-VC Meeting; Jul. 25-Aug. 2, 2013 Vienna, (Joint Collaborative Team on Video Coding of ISO/IEC JTC1/SC29/WG11 and ITU-T SG.16 ), URL : http://wftp3.itu.int/av-arch/jctvc-site/ No. JCTVC-N0121-v4, XP030114579, 4 pp.

Hannuksela "MV-HEVC/SHVC HLS: Layer-wise startup of the decoding process", JCT-VC Meeting; MPEG Meeting; Apr. 18-26, 2013; Incheon; (Joint Collaborative Team on Video Coding of ISO/IEC JTC1/SC29/WG11 and ITU-T SG.16 ); URL: http://wftp3.itu.int/av-arch/jctvc-site/ No. JCTVC-M0206, XP030114163, 5 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Hannuksela "MV-HEVC/SHVC HLS: Layer-wise startup of the decoding process", JCT-3V Meeting; Jul. 27-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-E0052, XP030131052, 5 pp.

Hannuksela "MV-HEVC/SHVC HLS: on splicing and layer-wise start-up of the decoding", JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/ No. JCTVC-O0149, XP030115167, 2 pp.

Ikai et al., "AHG7: RAP picture alignment and slice definition", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-C0085, XP030130501, 4 pp.

Merkle et al, "Efficient Prediction Structures for Multiview Video Coding", IEEE Trans on Circuits and Systems for Video Technology, vol. 17, No. 11, Nov. 2007, pp. 1461-1473.

Ramasubramonian et al., "MV-HEVC/SHVC HLS: On CL-RAS Pictures", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/., No. JCTVC-O0212, XP030115260, 17 pp.

Ramasubramonian et al., "MV-HEVC/SHVC HLS: Cross-Layer Non-Alignment of IRAP Pictures", JCT-VC Meeting; Jul. 25-Aug. 2, 2013; Vienna, (Joint Collaborative Team on Video Coding of ISO/IEC JTC1/SC29/WG11 and ITU-T SG.16), URL: http://wftp3.itu.int/av-arch/jctvc-site/, No. JCTVC-N0090, XP030114536, 4 pp.

Rapaka et al., "MV-HEVC/SHVC HLS: On Signalling of random accessibility for IRAP pictures in non-IRAP AUs", JCT-3V Meeting; Oct. 23-Nov. 1, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-F0079, XP030131487, 3 pp.

Schwarz et al., "Overview of the Scalable Video Coding Extension of the H.264/AVC Standard", IEEE Transactions on Circuits and Systems for Video Technology, IEEE Service Center, Piscataway, NJ, US, vol. 17, No. 9, Sep. 2007, XP011193019, pp. 1103-1120.

Sjoberg, et al., "Overview of HEVC high-level syntax and reference picture management" IEEE Transactions on Circuits and Systems for Video Technology, Jan. 2012, XP055045360, 14 pp.

(56) References Cited

OTHER PUBLICATIONS

Tech et al: "MV-HEVC Draft Text 3", JCT-3V Meeting; MPEG Meeting; Jan. 17-23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/ No. JCT3V-C1004 d3, XP002727084, 34 pp.
Wang, et al., "AHG9: On cross-layer alignments in HEVC 3DV and scalable extensions," JCT-VC Meeting; MPEG Meeting; Apr. 18-26, 2013; Incheon; (Joint collaborative team on video coding of ISO/IEC JTC1/SC29/WG11 and ITU-T SG.16); Retrieved from the Internet No. JCTVC-M0266, XP030114223, 6 pp.
Wang, "AHG9: On CRA and BLA pictures", JCT-VC Meeting; MPEG Meeting; Oct. 10-19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/ No. JCTVC-K0122, XP030113004, 3 pp.
Wang, et al., "MV-HEVC/SHVC HLS: On various cross-layer alignments", JCT-VC Meeting; Jul. 25-Aug. 2, 2013; Vienna; (Joint Collaborative Team on Video Coding of ISO/IEC JTC1/SC29/WG11 and ITU-T SG.16 ); URL: http://wftp3.itu.int/av-arch/jctvc-site/, No. JCTVC-N0084, XP030114530, 5 pp.
Wang et al: "Enhancement-layer IDR picture (EIDR)", JUT Meeting; MPEG Meeting; Oct. 14-21, 2005; Nice, FR;(Joint Video Team of ISO/IEC JTC1/SC29/WG11 and ITU-T SG.16 ) No. JVT-Q065, XP030006226, 7 pp.
Deshpande, et al., "AHG11: Signaling of CRA Pictures", JCT-VC Meeting; MPEG Meeting; Apr. 27-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/., No. JCTVC-I0278, XP030112041, 4 pp.
Hannuksela, et al., "HEVC v1 Scalability Hook: Long-Tem Pictures with Layer Id Values", JCT-VC Meeting, 103. MPEG Meeting, Jan. 14-23, 2013, Geneva, (Joint Collaborative Team on Video Coding of ISO/IEC JTC1/SC29/WG11 and ITU-T SG.16), URL: http://wftp3.itu.int/av-arch/jctvc-site/, No. JCTVC-L0170, XP030113658, 9 pp.
Wang et al., "AHG9: HEVC HRD Cleanups", JCT-VC Meeting; MPEG Meeting; Jan. 14-23, 2013; Geneva; (Joint Collaborative Team on Video Coding of ISO/IEC JTC1/SC29/WG11 and ITU-T SG.16 ); URL: http://wftp3.itu.int/av-arch/jctvc-site/ No. JCTVC-L0044, XP030113532, 4 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, Ch, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
Tech, et al., "MV-HEVC Draft Text 4—JCT3V-D1004 v4", Joint Collaborative Team on 3D Video Coding Extension Development of ITU-T SG 16 WP 3 and ISO/IEC JTC 1/SC 29/WG 11 4th Meeting: Incheon, vol. JCT3V-D1004 v4, XP055141490, 62 pp.
Chen, et al., "SHVC Working Draft 2," Joint Collaborative Team on 3D Video Coding Extension Development of ITU-T SG 16 WP 3 and ISO/IEC JTC 1/SC 29/WG 11; Apr. 18-26, 2013, Document: JCTVC-M1008_V1, 53 pp.
Tech, et al., "MV-HEVC Draft Text 5", Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Jul. 27-Aug. 2, 2013, 65 pp.
Bross et al., "Editors' proposed corrections to HEVC version 1,"Joint Collaborative Team on Video Coding (JCT-VC) of ITU-T SG 16 WP 3 and ISO/IEC JTC 1/SC 29/WG 11, JCTVC-M0432_v3, Apr. 18-26, 2013, 310 pp.
McCann, et al., "HM6: High Efficiency Video Coding (HEVC) Test Model 6 Encoder Description," Joint Collaborative Team on Video Coding (JCT-VC) of ITU-T SG 16 WP 3 and ISO/IEC JTC 1/SC 29/WG 11, Document No. JCTVC-H1002, Feb. 1-10, 2012, 53 pp.
International Search Report and Written Opinion from International Application No. PCT/US2014/040611, dated Oct. 21, 2014, 20 pp.
Response to Written Opinion dated Oct. 21, 2014, from International Application No. PCT/US2014/040611, filed Apr. 1, 2015, 6 pp.
Second Written Opinion from International Application No. PCT/US2014/040611, dated May 11, 2015, 8 pp.
Response to Second Written Opinion dated May 11, 2015, from International Application No. PCT/US2014/040611, filed Jul. 10, 2015, 6 pp.
International Preliminary Report on Patentability from International Application No. PCT/US2014/040611, dated Jul. 28, 2015, 29 pp.
Wang, et al., "AHG9: On cross-layer alignments in HEVC 3DV and scalable extensions," Joint Collaborative Team on Video Coding (JCT-VC) of ITU-T SG 16 WP 3 and ISO/IEC JTC 1/SC 29/WG 11, Document: JCTVC-M0266_v2, Apr. 18-26, 2013, 6 pp.
Tech, et al., "MV-HEVC Draft Text 3 (ISO/IEC 23008-2:201x/PDAM2)," Joint Collaborative Team on Video Coding (JCT-VC) of ITU-T SG 16 WP 3 and ISO/IEC JTC 1/SC 29/WG 11, Document: JCT3V-C1004_d3, Jan. 17-23, 2013, 39 pp.
Hannuksela M.M., "MV-HEVC/SHVC HLS: Layer-Wise Startup of the Decoding Process", No. m28667, JCTVC-M0206r1, Apr. 21, 2013 (Apr. 21, 2013), pp. 1-6, XP030057200.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

* cited by examiner

HYPOTHETICAL REFERENCE DECODER MODEL AND CONFORMANCE FOR CROSS-LAYER RANDOM ACCESS SKIPPED PICTURES

This application claims the benefit of U.S. Provisional Patent Application No. 61/830,512, filed Jun. 3, 2013, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10 Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, one or more techniques of this disclosure define, for a video coding process, additional conformance when enhancement layer pictures that are not correctly decodable are not present in the bitstream. Furthermore, one or more techniques of this disclosure define a complete decoding process for unavailable reference pictures when decoding a cross-layer random access skipped (CL-RAS) picture in an initial intra random access point (IRAP) access unit (AU) and when it is indicated that CL-RAS pictures are not to be output, and providing hypothetical reference decoder (HRD) parameters for both cases when CL-RAS pictures are present or absent.

In one example, this disclosure describes a method of decoding video data, the method comprising: determining, based on a value, whether all CL-RAS pictures of an IRAP access unit are present in a video data bitstream; and reconstructing pictures of the video data based at least in part on syntax elements decoded from the video data bitstream.

In another example, this disclosure describes a method of processing video data, the method comprising: generating a SEI message that sets a variable that specifies whether CL-RAS pictures of an IRAP access unit are present in a bitstream that includes a sequence of bits that forms a representation of coded pictures and associated data; and including the SEI message in the bitstream.

In another example, this disclosure describes a device comprising: a data storage medium configured to store video data, and one or more processors configure to: determine, based on a value, whether all CL-RAS pictures of an IRAP access unit are present in a video data bitstream; and reconstruct pictures of the video data based at least in part on syntax elements decoded from the video data bitstream.

In another example, this disclosure describes a device comprising: a data storage medium configured to store video data, and one or more processors configured to: generate a SEI message that sets a variable that specifies whether CL-RAS pictures of an IRAP access unit are present in a bitstream that includes a sequence of bits that forms a representation of coded pictures and associated data; and include the SEI message in the bitstream.

In another example, this disclosure describes a device comprising: means for determining, based on a value, whether all CL-RAS pictures of an IRAP access unit are present in a video data bitstream; and means for reconstructing pictures of the video data based at least in part on syntax elements decoded from the video data bitstream.

In another example, this disclosure describes a device comprising: means for generating a SEI message that sets a variable that specifies whether CL-RAS pictures of an IRAP access unit are present in a bitstream that includes a sequence of bits that forms a representation of coded pictures and associated data; and means for including the SEI message in the bitstream.

In another example, this disclosure describes a computer-readable data storage medium having stored thereon instructions that, when executed, cause a device to: determine, based on a value, whether all CL-RAS pictures of an IRAP access unit are present in a video data bitstream; and reconstruct pictures of the video data based at least in part on syntax elements decoded from the video data bitstream.

In another example, this disclosure describes a computer-readable data storage medium having stored thereon instructions that, when executed, cause a device to: generate a SEI message that sets a variable that specifies whether CL-RAS pictures of an IRAP access unit are present in a bitstream that includes a sequence of bits that forms a representation of coded pictures and associated data; and include the SEI message in the bitstream.

The details of one or more examples of the disclosure are set forth in the accompanying drawings and the description below. Other features, objects, and advantages will be apparent from the description, drawings, and claims.

DETAILED DESCRIPTION

Figure 1:
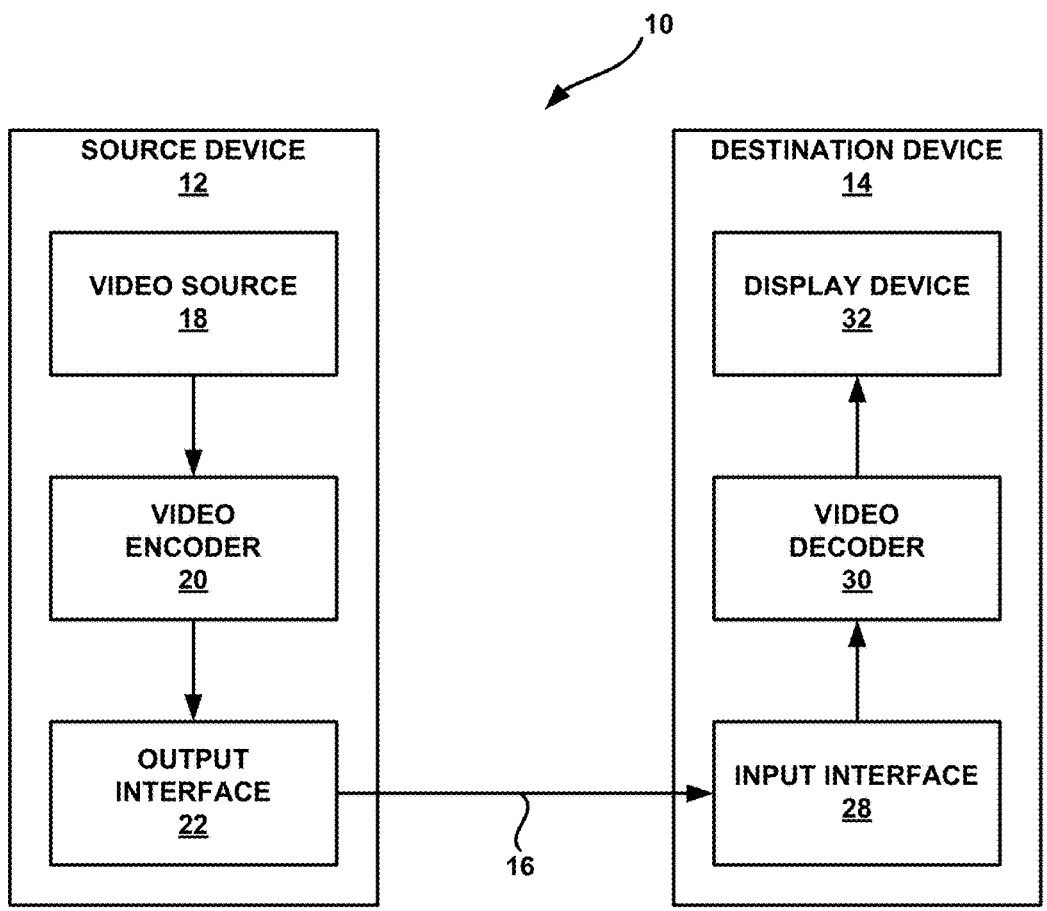
FIG. 1 is a block diagram illustrating an example video coding system that may utilize the techniques described in this disclosure.

In general, this disclosure describes techniques for multi-layer video coding. As described herein, a video data bitstream may comprise a sequence of bits that forms a representation of coded pictures and associated data. The pictures may belong to different access units and layers. Pictures belonging to the same access unit may have the same output time. Pictures belonging to different access units may have different output times. In multi-view coding, pictures belonging to different layers may belong to different views. In scalable video coding, pictures belonging to higher layers may provide enhanced visual quality.

Some of the pictures are Intra Random Access Point (IRAP) pictures. A video coder may decode an IRAP picture without reference to any picture occurring prior to the IRAP picture in decoding order. Furthermore, the pictures may include cross-layer random access skipped (CL-RAS) pictures. In some examples, a CL-RAS picture is a picture that satisfies one of the following criteria. First, the picture is not an IRAP picture but is in an IRAP access unit. Second, the picture is not an IRAP picture, the picture is in an access unit that follows (in decoding order) an IRAP access unit, the picture is in an access unit that precedes a layer-switch IRAP access unit, and the picture is in a layer equal to a layer containing an IRAP picture in the layer-switch IRAP access unit. In some instances, a CL-RAS picture cannot be decoded correctly because the CL-RAS picture depends on pictures occurring prior to the previous (or current) IRAP access unit. In such examples, an IRAP access unit may be an access unit that contains one or more IRAP pictures and a picture in a base layer of the access unit is an IRAP picture. Furthermore, in such examples, a layer-switch IRAP access unit may be an access unit that is not an IRAP access unit, but contains at least one IRAP picture. CL-RAS pictures may arise because of bitstream switching, random access within a bitstream, and/or in other circumstances.

In some instances, a device (e.g., a media aware network element (MANE)) may remove CL-RAS pictures from a bitstream. The device may be free to remove the CL-RAS pictures from a bitstream because a video decoder would not be able to decode the CL-RAS pictures correctly. Advantageously, removing CL-RAS pictures from the bitstream may reduce the amount of data in the bitstream. However, removing CL-RAS pictures from the bitstream may result in a video decoder (e.g., a hypothetical reference decoder (HRD)) removing coded pictures from a coded picture buffer of the video decoder at inappropriate times. For example, the video decoder may remove coded pictures from the coded picture buffer at a particular rate. In this example, the video decoder may decode coded pictures removed from the coded picture buffer. Furthermore, in this example, if the bitstream does not include CL-RAS pictures for an IRAP access unit, the coded picture buffer may include fewer coded pictures than the video decoder expects. Consequently, in this example, the rate at which the video decoder removes coded pictures from the coded picture buffer may be large, resulting in the bitstream being non-conforming.

Hence, in accordance with one or more techniques of this disclosure, a video decoder may determine, based on a value, whether all CL-RAS pictures of an IRAP access unit are present in a bitstream. In some examples, the video decoder may set the value based at least in part on data in a Supplemental Enhancement Information (SEI) message of the bitstream. In other examples, a mechanism outside a decoding process may set the value. Furthermore, in some examples, the video decoder may use different sets of HRD parameters, as appropriate, depending on whether all CL-RAS pictures of the IRAP access unit are present in the bitstream. The HRD parameters may include parameters that control how the video decoder removes pictures from the coded picture buffer. In this way, video decoders conforming to a video coding standard may be able to decode bitstreams that include all CL-RAS pictures of an IRAP access unit and bitstreams that do not include all CL-RAS pictures of an IRAP access unit.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device (e.g., via streaming or download). The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data (e.g., video data) to memory, and/or a video decoding device may retrieve and decode data (e.g., video data) from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signalling" certain information to another device, such as video decoder 30. The term "signalling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any bitstream conforming to MVC-based 3DV always contains a sub-bitstream that is compliant to a MVC profile, e.g., stereo high profile. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 10" or "HEVC WD10," is described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013. At least as of May 30, 2014, HEVC Working Draft 10 is available from http://phenix.int-evey.fr/jct/doc_end_user/documents/13_Incheon/wg11/JCTVC-M0432-v3.zip, the entire content of which is hereby incorporated by reference.

Furthermore, there are ongoing efforts to produce scalable video coding, multi-view coding, and 3DV extensions for HEVC. The 3DV extension of HEVC may be referred to as HEVC-based 3DV, HEVC-3DV, or 3D-HEVC. The multi-view extension to HEVC, namely MV-HEVC, is also being developed by the Joint Collaborative Team on 3D Video Coding Extension Development (JCT-3V). A recent Working Draft (WD) of MV-HEVC, referred to hereinafter as MV-HEVC WD4, is described in Tech et al., "MV-HEVC Draft Text 4," Joint Collaborative Team on Video Coding (JCT-VC) of ITU-T SG16 WP3 and ISO/IEC JTC1/SC29/WG11, 4$^{th}$ Meeting, Incheon, KR, April 2013, document no. JCT3V-D1004_d0 (hereinafter, "JCT3V-D1004_d0"). At least as of May 30, 2014, JCT3V-D1004_d0 is available from available from http://phenix.it-sudparis.eu/jct2/doc_end_user/documents/4_Incheon/wg11/JCT3V-D1004-v1.zip, the entire content of which is incorporated herein by reference.

The scalable extension to HEVC, named SHVC, is also being developed by the JCT-VC. A recent Working Draft (WD) of SHVC is referred to as SHVC WD2 hereinafter and is described in Chen et al, "SHVC Working Draft 2," Joint Collaborative Team on Video Coding (JCT-VC) of ITU-T SG16 WP3 and ISO/IEC JTC1/SC29/WG11, 13$^{th}$ Meeting, Incheon, KR, 18-26 Apr. 2013, document no. JCTVC-M1008_v1 (hereinafter, "JCTVC-M1008_v1"). At least as of May 30, 2014, JCTVC-M1008_v1 is available from http://phenix.int-evey.fr/jct/doc_end_user/documents/13_Incheon/wg11/JCTVC-M1008-v1.zip.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise (e.g., be) a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a scanning order (e.g., the raster scan order).

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of CTUs, CU, PUs, etc. may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise (e.g., be) a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise (e.g., be) a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In a monochrome picture or a picture that has three separate color planes, a PU may comprise a single prediction block and syntax structures used to predict the prediction block samples.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU (i.e., the picture containing the prediction block of the PU).

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector. When video encoder 20 uses bi-prediction to generate the predictive blocks for a PU, the PU may have two motion vectors.

To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks (i.e., predictive sample blocks) for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a prediction block of the PU and the first reference location and a second motion vector indicating a spatial displacement between the prediction block of the PU and the second reference location.

After video encoder 20 generates predictive blocks (e.g., luma, Cb and Cr predictive blocks) for one or more PUs of a CU, video encoder 20 may generate one or more residual blocks for the CU. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may comprise (e.g., be) a transform block of luma samples, two corresponding transform blocks of chroma samples, and syntax structures used to transform the transform block samples. Thus, each TU of a CU may have (i.e., be associated with) a luma transform block, a Cb transform block, and a Cr transform block. The luma transform block of (i.e., associated with) the TU may be a sub-block of the CU's luma residual block. The Cb transform block may be a sub-block of the CU's Cb residual block. The Cr transform block may be a sub-block of the CU's Cr residual block. In a monochrome picture or a picture that has three separate color planes, a TU may comprise a single transform block of samples and syntax structures used to transform the transform block samples.

Video encoder 20 may apply one or more transforms to a transform block of a TU to generate a coefficient block for the TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units may include a NAL unit header and may encapsulate a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. In at least some examples, SEI contains information that is not necessary to decode the samples of coded pictures from VCL NAL units. Furthermore, in at least some examples, an SEI RBSP may contain one or more SEI messages. An SEI message may be a message that contains SEI.

HEVC and other video coding standards provide for various types of parameter sets. For example, a video parameter set (VPS) is a syntax structure comprising syntax elements that apply to zero or more entire coded video sequences (CVSs). A sequence parameter set (SPS) may contain information that applies to all slices of a CVS. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain (e.g., decode) syntax elements from the bitstream. Video decoder 30 may reconstruct the pictures of the video data based at least in part on the syntax elements obtained (e.g., decoded) from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks of (i.e., associated with) the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

When a video coder (e.g., video encoder 20 or video decoder 30) begins processing a current picture, the video coder may determine five reference picture set (RPS) subsets for the current picture: RefPicSetStCurrBefore, RefPicSetStCurrAfter, RefPicSetFoll, RefPicSetLtCurr, and RefPicSetLtFoll. The union of these five RPS subsets for the current picture may be referred to herein as the RPS for the current picture. RefPicSetStCurrBefore may include short-term reference pictures that occur before the current picture in output order and may be used for reference by the current picture. RefPicStCurrAfter may include short-term reference pictures that occur after the current picture in output order and may be used for reference by the current picture. RefPicSetStFoll may include short-term reference pictures that are not used for reference by the current picture. RefPicSetLtCurr may include long-term reference pictures that may be used for reference by the current picture. RefPicSetLtFoll may include long-term reference pictures that are not used for reference by the current picture.

HEVC and other video coding standards provide for several different slice types. These slice types include I slices, P slices, and B slices. In I slices, only intra prediction is allowed. In P slices, intra prediction and uni-directional inter prediction is allowed. In B slices, intra prediction, uni-directional inter prediction, and bi-directional inter prediction is allowed. When the video coder begins coding a slice of a picture, the video coder may initialize a first reference picture list (i.e., List 0). Furthermore, if the current slice is a B slice, the video coder may initialize a second reference picture list (i.e., List 1). This disclosure may refer to List 0 as "RefPicList0" and may refer to List 1 as "RefPicList1."

To generate RefPicList0, a video coder (e.g., a video encoder or a video decoder) may generate an initial version of RefPicList0. In the initial version of RefPicList0, reference pictures in RefPicSetStCurrBefore are listed first, followed by reference pictures in RefPicSetStCurrAfter, followed by reference pictures in RefPicSetLtCurr, if available. In the initial version of RefPicList0, short-term pictures with earlier output order (i.e., reference pictures in RefPicSetStCurrBefore) are firstly inserted into RefPicList0 in ascending order of picture order count (POC) distance to the current picture, then short-term pictures with later output order (i.e., reference pictures in RefPicSetStCurrAfter) are inserted into RefPicList0 in ascending order of POC distance to the current picture, and finally the long-term pictures (i.e., reference pictures in RefPicSetLtCurr) are inserted at the end. A POC distance is the difference between POC values for pictures. A POC is a variable that is associated with each picture that indicates the position of the associated picture in output order relative to the output order positions of the other pictures in the same coded video sequence.

Similarly, to generate RefPicList1, the video coder may generate an initial version of RefPicList1. In the initial version of RefPicList1, reference pictures in RefPicSetStCurrAfter are listed first, followed by reference pictures in RefPictSetStCurrBefore, followed by reference pictures in RefPicSetLtCurr. In the initial version of RefPicList1, short-term pictures with later output order (i.e., reference pictures in RefPicSetStCurrAfter) are firstly inserted into RefPicList1 in ascending order of POC distance to the current picture, then short-term pictures with earlier output order (i.e., reference pictures in RefPicSetStCurrBefore) are inserted into RefPicList1 in ascending order of POC distance to the current picture, and finally the long-term pictures (i.e., reference pictures in RefPicSetLtCurr) are inserted at the end. In this way, reference picture list initialization creates default List 0 and List 1 (if the slice is a B slice) based on three RPS subsets: RefPicSetStCurrBefore, RefPicSetStCurrAfter, and RefPicSetLtCurr.

After the video coder generates the initial version of a reference picture list (e.g., RefPicList0 or RefPicList1), the video coder may modify the order of reference pictures in the reference picture list. That is, the video coder may perform a reference picture list modification (RPLM) process to modify the order of the reference pictures in the reference picture list.

In multi-view coding, there may be multiple views of the same scene from different viewpoints. The term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

NAL units may include headers and payloads. The headers of NAL units may include nuh_reserved_zero_6bits syntax elements. In some examples, the nuh_reserved_zero_6bits syntax element of a NAL unit is equal to 0 if the NAL unit relates to a base layer in multi-view coding, 3DV coding, or scalable video coding. Data in a base layer of a bitstream may be decoded without reference to data in any other layer of the bitstream. If the NAL unit does not relate to a base layer in multi-view coding, 3DV, or scalable video coding, the nuh_reserved_zero_6bits syntax element may have a non-zero value. Specifically, if a NAL unit does not relate to a base layer in multi-view coding, 3DV, or scalable video coding, the nuh_reserved_zero_6bits syntax element of the NAL unit specify a layer identifier of the NAL unit.

Furthermore, some pictures within a layer may be decoded without reference to other pictures within the same layer. Thus, NAL units encapsulating data of certain pictures of a layer may be removed from the bitstream without affecting the decodability of other pictures in the layer. For example, pictures with even picture order count (POC) values may be decodable without reference to pictures with odd POC values. Removing NAL units encapsulating data of such pictures may reduce the frame rate of the bitstream. A subset of pictures within a layer that may be decoded without reference to other pictures within the layer may be referred to herein as a sub-layer.

NAL units may include temporal_id syntax elements. The temporal_id syntax element of a NAL unit specifies a temporal identifier of the NAL unit. If the temporal identifier of a first NAL unit is less than the temporal identifier of a second NAL unit in the same layer, the data encapsulated by the first NAL unit may be decoded without reference to the data encapsulated by the second NAL unit.

Each operation point of a bitstream is associated with a set of layer identifiers (i.e., a set of nuh_layer_id values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit belongs to the operation point. An operation point is a bitstream subset that is associated with an OpLayerIdSet and a temporal identifier. The operation point may include each NAL unit that is associated with the operation point. The operation point does not include VCL NAL units that are not associated with the operation point.

At least some video coding standards specify video buffering models. In H.264/AVC and HEVC, a buffering model is referred to as a "hypothetical reference decoder" or "HRD." In HEVC Working Draft 10, the HRD is described in Annex C. The HRD describes how data is to be buffered for decoding and how decoded data is buffered for output. For instance, the HRD describes the operation of a coded picture buffer ("CPB"), a decoded picture buffer ("DPB"), and a video decoding process. The CPB is a first-in first-out buffer containing access units in a decoding order specified by HRD. The DPB is a buffer holding decoded pictures for reference, output reordering, or output delay specified by the HRD. The behaviors of the CPB and DPB may be mathematically specified. The HRD may directly impose constraints on timing, buffer sizes, and bit rates. Furthermore, the HRD may indirectly impose constraints on various bitstream characteristics and statistics.

In H.264/AVC and HEVC, bitstream conformance and decoder conformance are specified as parts of the HRD specification. In other words, the HRD model specifies tests to determine whether a bitstream conforms to a standard and tests to determine whether a decoder conforms to the standard. Though the HRD is named as some kind of decoder, video encoders typically use the HRD to guarantee bitstream conformance, while video decoders typically do not need the HRD.

H.264/AVC and HEVC both specify two types of bitstream or HRD conformance, namely Type I and Type II. A Type I bitstream is a NAL unit stream containing only the VCL NAL units and filler data NAL unit for all access units in the bitstream. In at least some examples, a NAL unit stream is a sequence of NAL units. A Type II bitstream is a NAL unit stream that contains, in addition to the VCL NAL units and filler data NAL units for all access units in the bitstream, at least one of the following: additional non-VCL NAL units other than filler data NAL units; and all leading_zero_8bits, zero_byte, start_coded_prefix_one_3bytes, and trailing_zero_8bits syntax elements that form a byte stream from the NAL unit stream.

When a device performs a bitstream conformance test that determines whether a bitstream conforms to a video coding standard, the device may select an operation point of the bitstream. The device may then determine a set of HRD parameters applicable to the selected operation point. The device may use the set of HRD parameters applicable to the selected operation point to configure the behavior of the HRD. More particularly, the device may use the applicable set of HRD parameters to configure the behaviors of particular components of the HRD, such as a hypothetical stream scheduler (HSS), the CPB, a decoding process, the DPB, and so on. Subsequently, the HSS may inject coded video data of the bitstream into the CPB of the HRD according to a particular schedule. Furthermore, the device may invoke a decoding process that decodes the coded video data in the CPB. The decoding process may output decoded pictures to the DPB. As the device moves data through the HRD, the device may determine whether a particular set of constraints remains satisfied. For example, the device may determine whether an overflow or underflow condition occurs in the CPB or DPB while the HRD is decoding the operation point of the selected operation point. The device may select and process each operation point of the bitstream in this manner. If no operation point of the bitstream causes the constraints to be violated, the device may determine that the bitstream conforms to the video coding standard.

Both H.264/AVC and HEVC specify two types of decoder conformance, namely output timing decoder conformance and output order decoder conformance. A decoder claiming conformance to a specific profile, tier and level is able to successfully decode all bitstreams that conform to the bitstream conformance requirements of a video coding standard, such as HEVC. In some examples, a "profile" may refer to a subset of the bitstream syntax. "Tiers" and "levels" may be specified within each profile. A level of a tier may be a specified set of constraints imposed on values of the syntax elements in the bitstream. These constraints may be simple limits on values. Alternatively, the constraints may take the form of constraints on arithmetic combinations of values (e.g., picture width multiplied by picture height multiplied by number of pictures decoded per second). Typically, a level specified for a lower tier is more constrained than a level specified for a higher tier.

When a device performs a decoder conformance test to determine whether a decoder under test (DUT) conforms to a video coding standard, the device may provide, to both the HRD and the DUT, a bitstream that conforms to the video coding standard. The HRD may process the bitstream in the manner described above with regard to the bitstream conformance test. The device may determine that the DUT conforms to the video coding standard if the order of decoded pictures output by the DUT matches the order of decoded pictures output by the HRD. Moreover, the device may determine that the DUT conforms to the video coding standard if the timing with which the DUT outputs decoded pictures matches the timing with which the HRD outputs the decoded pictures.

In the H.264/AVC and HEVC HRD models, decoding or CPB removal may be access unit based. That is, the HRD is assumed to decode complete access units at one time and remove complete access units from the CPB. Furthermore, in the H.264/AVC and HEVC HRD models, it is assumed that picture decoding is instantaneous. Video encoder 20 may signal, in picture timing SEI messages, decoding times to start decoding of access units. In practical applications, if a conforming video decoder strictly follows the decoding times signalled to start decoding of access units, the earliest possible time to output a particular decoded picture is equal to the decoding time of that particular picture plus the time needed for decoding that particular picture. However, in the real world, the time needed for decoding a picture cannot be equal to zero.

HRD parameters may control various aspects of the HRD. In other words, the HRD may rely on the HRD parameters. The HRD parameters may include an initial CPB removal delay, a CPB size, a bit rate, an initial DPB output delay, and a DPB size. Video encoder 20 may signal these HRD parameters in a hrd_parameters( ) syntax structure specified in a video parameter set (VPS) and/or a sequence parameter set (SPS). Individual VPS's and/or SPS's may include multiple hrd_parameters( ) syntax structures for different sets of HRD parameters. In some examples, video encoder 20 may signal HRD parameters in buffering period SEI messages or picture timing SEI messages.

As explained above, an operation point of a bitstream is associated with a set of layer identifiers (i.e., a set of nuh_reserved_zero_6bits values) and a temporal identifier. An operation point may include each NAL unit that is associated with the operation point. An operation point may have a different frame rate and/or bit rate than an original bitstream. This is because the operation point may not include some pictures and/or some of the data of the original bitstream. Hence, if video decoder 30 were to remove data from the CPB and/or the DPB at a particular rate when processing the original bitstream and if video decoder 30 were to remove data from the CPB and/or the DPB at the same rate when processing an operation point, video decoder 30 may remove too much or too little data from the CPB and/or the DPB. Accordingly, video encoder 20 may signal different sets of HRD parameters for different operation points. For instance, video encoder 20 may include, in a VPS, multiple hrd_parameters( ) syntax structures that include HRD parameters for different operation points.

In HEVC Working Draft 10 (also referred to as WD10), the set of HRD parameters optionally includes a set of information that is common for all temporal sub-layers. In other words, the set of HRD parameters may optionally include a set of common syntax elements that are applicable to operation points that include any temporal sub-layers. A temporal sub-layer may be a temporal scalable layer of a temporal scalable bitstream consisting of VCL NAL units with a particular value of TemporalId and the associated non-VCL NAL units. In addition to the set of common information, the sets of HRD parameters may include a set of syntax elements that are specific to individual temporal sub-layer representations. For instance, the hrd_parameters( ) syntax structure may optionally include a set of information that is common for all sub-layer representations and always includes sub-layer-specific information. Because the set of common information is common to multiple sets of HRD parameters, it may be unnecessary to signal the set of common information in multiple sets of HRD parameters. Rather, in HEVC Working Draft 10, the common information may be present in a set of HRD parameters when the set of HRD parameters is the first set of HRD parameters in a VPS or the common information may be present in a set of HRD parameters when the set of HRD parameters is associated with a first operation point index. For instance, HEVC Working Draft 10 (WD10) supports the presence of common information when either the hrd_parameters ( ) syntax structure is the first hrd_parameters( ) syntax structure in the VPS or when the hrd_parameters( ) syntax structure is associated with a first operation point index.

Table 1, below, is an example syntax structure for a hrd_parameters( ) syntax structure in HEVC.

TABLE 1

HRD Parameters

| hrd_parameters( commonInfPresentFlag, MaxNumSubLayersMinus1 ) { | Descriptor |
|---|---|
|   if( commonInfPresentFlag ) { | |
|     timing_info_present_flag | u(1) |
|     if( timing_info_present_flag ) { | |
|       num_units_in_tick | u(32) |

TABLE 1-continued

HRD Parameters

| hrd_parameters( commonInfPresentFlag, MaxNumSubLayersMinus1 ) { | Descriptor |
|---|---|
|     time_scale | u(32) |
|   } | |
|   nal_hrd_parameters_present_flag | u(1) |
|   vcl_hrd_parameters_present_flag | u(1) |
|   if( nal_hrd_parameters_present_flag \|\| vcl_hrd_parameters_present_flag ){ | |
|     sub_pic_cpb_params_present_flag | u(1) |
|     if( sub_pic_cpb_params_present_flag ) { | |
|       tick_divisor_minus2 | u(8) |
|       du_cpb_removal_delay_length_minus1 | u(5) |
|     } | |
|     bit_rate_scale | u(4) |
|     cpb_size_scale | u(4) |
|     initial_cpb_removal_delay_length_minus1 | u(5) |
|     cpb_removal_delay_length_minus1 | u(5) |
|     dpb_output_delay_length_minus1 | u(5) |
|   } | |
| } | |
| for( i = 0; i <= MaxNumSubLayersMinus1; i++ ) { | |
|   fixed_pic_rate_flag[ i ] | u(1) |
|   if( fixed_pic_rate_flag[ i ] ) | |
|     pic_duration_in_tc_minus1[ i ] | ue(v) |
|   low_delay_hrd_flag[ i ] | u(1) |
|   cpb_cnt_minus1[ i ] | ue(v) |
|   if( nal_hrd_parameters_present_flag ) | |
|     sub_layer_hrd_parameters( i ) | |
|   if( vcl_hrd_parameters_present_flag ) | |
|     sub_layer_hrd_parameters( i ) | |
| } | |
| } | |

In the example of Table 1, above, and other syntax tables of this disclosure, syntax elements with type descriptor ue(v) may be variable-length unsigned integers encoded using $0^{th}$ order exponential Golomb (Exp-Golomb) coding with left bit first. In the example of Table 1 and the following tables, syntax elements having descriptors of the form u(n), where n is a non-negative integer, are unsigned values of length n.

In the example syntax of Table 1, the syntax element nal_hrd_parameters_present_flag equal to 1 specifies that NAL HRD parameters (pertaining to Type II bitstream conformance) are present in the hrd_parameters( ) syntax structure. nal_hrd_parameters_present_flag equal to 0 specifies that NAL HRD parameters are not present in the hrd_parameters( ) syntax structure. Thus, NAL HRD parameters are HRD parameters pertaining to Type II bitstream conformance. The syntax element nal_hrd_parameters_present_flag equal to 1 specifies that VCL HRD parameters (pertaining to all bitstream conformance) are present in the hrd_parameters( ) syntax structure. vcl_hrd_parameters_present_flag equal to 0 specifies that VCL HRD parameters are not present in the hrd_parameters( ) syntax structure. Thus, VCL HRD parameters are HRD parameters pertaining to all bitstream conformance.

In the example syntax of Table 1, the syntax elements in the "if (commonInfPresentFlag) { . . . }" block are the common information of the HRD parameter sets. In other words, the common information of the set of HRD parameters may include the syntax elements timing_info_present_flag, num_units_in_tick, time_scale, nal_hrd_parameters_present_flag, vcl_hrd_parameters_present_flag, sub_pic_cpb_params_present_flag, tick_divisor_minus2, du_cpb_removal_delay_length_minus1, bit_rate_scale, cpb_size_scale, initial_cpb_removal_delay_length_minus1, cpb_removal_delay_length_minus1, and dpb_output_delay_length_minus1.

Furthermore, in the example of Table 1, the syntax elements fixed_pic_rate_flag[i], pic_duration_in_tc_minus1 [i], low_delay_hrd_flag[i], and cpb_cnt_minus1[i] may be a set of sub-layer-specific HRD parameters. In other words, these syntax elements of the hrd_parameters( ) syntax structure may only be applicable to operation points that include a specific sub-layer representation. Thus, the HRD parameters of a hrd_parameters( ) syntax structure may include, in addition to the optionally-included common information, a set of sub-layer-specific HRD parameters that is specific to a particular sub-layer representation of the bitstream.

The fixed_pic_rate_flag[i] syntax element may indicate that, when HighestTid is equal to i, the temporal distance between the HRD output times of any two consecutive pictures in output order is constrained in a specific way. HighestTid may be a variable that identifies a highest temporal sub-layer (e.g., of an operation point). The pic_duration_in_tc_minus1[i] syntax element may specify, when HighestTid is equal to i, the temporal distance, in clock ticks, between the HRD output times of any consecutive pictures in output order in the coded video sequence. The low_delay_hrd_flag[i] syntax element may specify the HRD operation mode, when HighestTid is equal to i, as specified in Annex C of HEVC Working Draft 10. The cpb_cnt_minus1[i] syntax element may specify the number of alternative CPB specifications in the bitstream of the coded video sequence when HighestTid is equal to i, wherein one alternative CPB specification refers to one particular CPB operation with a particular set of CPB parameters.

Video encoder 20 may use SEI messages to include, in the bitstream, metadata that is not required for correct decoding of the sample values of pictures. However, video decoder 30 or other devices may use the metadata included in SEI messages for various other purposes. For example, video decoder 30 or another device may use the metadata in SEI messages for picture output timing, picture displaying, loss detection, and error concealment.

Video encoder 20 may include one or more SEI NAL units in an access unit. In other words, any number of SEI NAL units may be associated with an access unit. Furthermore, each SEI NAL unit may contain one or more SEI messages. The HEVC standard describes the syntax and semantics for various types of SEI messages. However, the HEVC standard does not describe the handling of the SEI messages because the SEI messages do not affect the normative decoding process. One reason to have SEI messages in the HEVC standard is to enable supplemental data being interpreted identically in different systems using HEVC. Specifications and systems using HEVC may require video encoders to generate certain SEI messages or may define specific handling of particular types of received SEI messages. Table 2, below, lists SEI messages specified in HEVC and briefly describes their purposes.

TABLE 2

Overview of SEI messages

| SEI message | Purpose |
| --- | --- |
| Buffering period | Initial delays for hypothetical reference decoder (HRD) operation |
| Picture timing | Picture output time and picture/sub-picture removal time for HRD operation |
| Pan-scan rectangle | Displaying at a different picture aspect ratio (PAR) than the PAR of the output pictures |
| Filler payload | Adjusting the bitrate to meet specific constraints |
| User data registered User data unregistered | SEI messages to be specified by external entities |
| Recovery point | Additional information for clean random access and gradual decoding refresh. |
| Scene information | Information about scene changes and transitions |
| Picture snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Decoded picture hash | Checksum of the decoded picture, which may be used for error detection |
| Decoding unit information timing | Sub-picture removal time for HRD operation |
| Active parameter sets | Provides information on active VPS, SPS, etc. |
| Structure of Pictures description | Describes the temporal and inter prediction structure of the bitstream |

In HEVC, each NAL unit includes a syntax element (e.g., nal_unit_type) that indicates a NAL unit type of the NAL unit. Furthermore, in HEVC, video decoder 30 may identify, based on the NAL unit type of a NAL unit, the NAL unit as being associated with one of a plurality of picture types. These picture types may include Instantaneous Decoding Refresh (IDR) pictures, Clean Random Access (CRA) pictures, Temporal Sub-Layer Access (TSA) pictures, Broken Link Access (BLA) pictures and coded pictures that are not IDR, CRA, or TSA pictures.

The definition of an IDR picture in HEVC may be similar to the definition of an IDR picture in H.264/AVC. Similarly, the definition of a coded picture in HEVC may be similar to the definition of a coded picture in H.264/AVC. For instance, the IDR and the coded pictures may be picture types inherited from the H.264/AVC specification. An DR picture may cause a decoding process to mark all reference pictures as "unused for reference." Because reference pictures marked as "unused for reference" may be removed from a decoded picture buffer (DPB) that stores the reference pictures, an IDR picture may clean out the DPB. All coded pictures that follow an IDR picture in decoding order can be decoded without inter prediction from any picture that precedes the IDR picture in decoding order. The first picture of each coded video sequence in decoding order is an IDR picture or a BLA picture, or a CRA picture that is the also the first picture of the bitstream. When a coded picture of an access unit is an IDR picture, the access unit may be referred to as an IDR access unit. In some examples, a coded video sequence is a sequence of access units that consists, in decoding order, of an IDR access unit followed by zero or more access units that are not IRAP access units with NoRaslOutputFlag equal to 1 including all subsequent access units up to but not including any subsequent IDR access unit.

The CRA and TSA picture types are new in HEVC and are not available in the H.264/AVC specification. The CRA picture type facilitates decoding that begins from any random access point (RAP) in the middle of a video sequence. Inserting CRA pictures in a video sequence may be more efficient than inserting IDR pictures into the same video sequence. Random access is the act of starting a decoding process for a bitstream at a point other than the beginning of the bitstream. In HEVC, a bitstream starting from a CRA picture may be a conforming bitstream. That is, the portion of a bitstream that starts with a CRA picture may conform to the HEVC specification. A TSA picture can be used to indicate a valid temporal sub-layer switching point.

In video applications such as broadcasting and streaming, users may switch between different channels and jump to specific parts of a video. Ideally, channel switching and jumping in this manner should be performed with a minimum amount of delay. Channel switching and jumping may be enabled by including random access pictures at regular intervals in video bitstreams. IDR pictures may be used in both H.264/AVC and HEVC as random access pictures. In other words, the IDR picture, specified in both H.264/AVC and HEVC can be used for random access. However, because an IDR picture starts a coded video sequence and may always clean the DPB, pictures following the IDR picture in decoding order cannot use pictures decoded prior, in decoding order, to the IDR picture for reference. Consequently, bitstreams relying on IDR pictures for random access may have significantly lower coding efficiency (e.g., 6% lower coding efficiency). To improve the coding efficiency, a CRA picture in HEVC may allow pictures that follow the CRA picture in decoding order, but precede the CRA picture in output order, to use pictures decoded before the CRA for reference.

Figure 2:
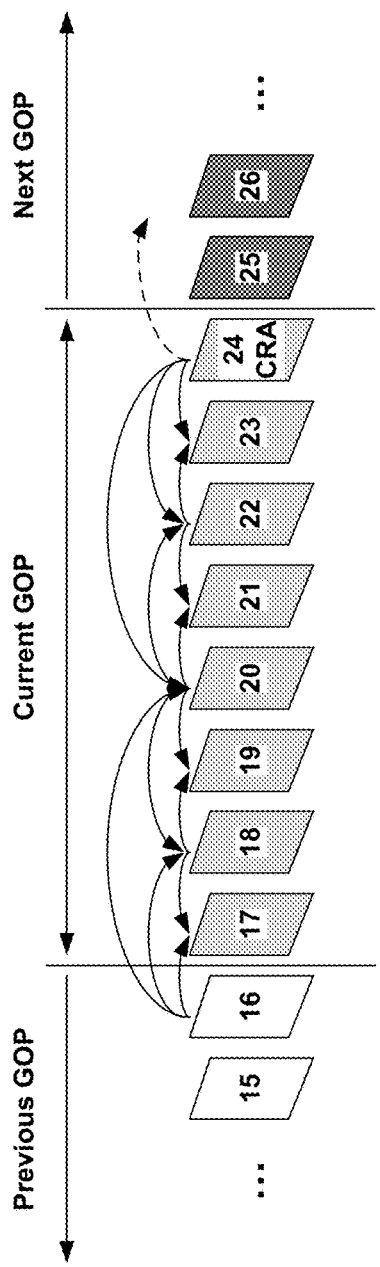
FIG. 2 is a conceptual diagram illustrating a Clean Random Access ("CRA") picture and leading pictures.

FIG. 2 is a conceptual diagram illustrating a CRA picture and leading pictures. That is, a typical prediction structure around a CRA picture is shown in the example of FIG. 2. In the example of FIG. 2, each parallelogram represents a picture. Numbers within each respective parallelogram indicate example POC values of the respective picture represented by the respective parallelogram. The CRA picture (i.e., the picture in the example of FIG. 2 with POC value 24) belongs to a Group of Pictures (GOP) that contains other pictures (i.e., pictures with POC values 17-23) following the CRA picture in decoding order, but preceding the CRA picture in output order. These pictures (i.e., the pictures follow the CRA picture in decoding order but precede the CRA picture in output order) may be referred to as "leading pictures" of the CRA picture. Video decoder 30 may correctly decode the leading pictures of a current CRA picture if the decoding starts from an IDR picture or a CRA picture that occurs in decoding order before the current CRA picture. However, video decoder 30 may not be able to correctly decode the leading pictures of a current CRA picture when random access from the current CRA picture occurs. Hence, video decoder 30 may discard the leading pictures of a current CRA picture during random access decoding from the current CRA picture.

Error propagation may occur when video decoder 30 uses an incorrectly decoded portion of a reference picture when decoding a current picture. To prevent error propagation from reference pictures that may not be available depending on where decoding starts, no picture in the GOP that follows a CRA picture may use as reference any picture that precedes the CRA picture in either decoding order or output order (including leading pictures of the CRA picture). Thus, in the example of FIG. 2, all pictures in the next GOP that follow the CRA picture both in decoding order and output order shall not use any picture that precedes the CRA picture either in decoding order or output order as reference.

Recovery point SEI messages may be used in H.264/AVC to provide random access in a manner similar to the CRA pictures in HEVC. In other words, H.264/AVC supports similar random access functionalities with a recovery point SEI message. An H.264/AVC decoder implementation may or may not support the recovery point SEI message functionality. In HEVC, a bitstream starting with a CRA picture is considered to be a conforming bitstream. When a bitstream starts with a CRA picture, the leading pictures of the CRA picture may refer to unavailable reference pictures and hence cannot be correctly decoded. However, HEVC specifies that the leading pictures of a starting CRA picture are not output, hence the name "clean random access." For establishment of a bitstream conformance requirement, HEVC may specify a decoding process to generate unavailable reference pictures for decoding of the non-output leading pictures. However, conforming decoder implementations do not have to follow that decoding process, as long as the decoder implementations can generate identical output compared to when the decoding process is performed from the beginning of the bitstream. In HEVC, a conforming bitstream may include no IDR pictures at all.

Wang et al., "AHG9: On cross-layer alignments in HEVC 3DV and scalable extensions," Joint Collaborative Team on Video Coding (JCT-VC) of ITU-T SG 16 and ISO/IEC JTC 1/SC 29/WG 11, 13$^{th}$ Meeting, Incheon, KR, April 2013, document JCTVC-M0266_v2 (hereinafter, "JCTVC-M0266_v2"), the entire content of which is incorporated herein by reference, provided a design for definition of the decoding process for cross-layer random access skipped (CL-RAS) pictures. At least as of May 30, 2014, JCTVC-M0266_v2 is available from http://phenix.int-evry.fr/jct/doc_end_user/documents/13_Incheon/wg11/JCTVC-M0266-v2.zip.

The design in JCTVC-M0266_v2 defines IRAP access units (AUs) to include all AUs that have an IRAP picture with nuh_layer_id equal to 0. The nuh_layer_id value of a picture may indicate a layer to which the picture belongs. The design in JCTVC-M0266_v2 also defines CL-RAS pictures and broken-link IDR (BL-IDR) pictures that are used to detail the process of decoding of a bitstream starting from such an IRAP access unit. Some of the relevant definitions are reproduced below. Portions of the definitions below enclosed in curly brackets indicate portions that differ from the corresponding definitions in HEVC Working Draft 10 (e.g., "{text}").

F.1.1 access unit: A set of NAL units that are associated with each other according to a specified classification rule, are consecutive in decoding order, and contain {all coded pictures associated with the same output time}.
NOTE 1—In addition to containing the VCL NAL units of the coded pictures, an access unit may also contain non-VCL NAL units.

F.1.2 coded video sequence (CVS): A sequence of access units that consists, in decoding order, of an {initial IRAP access unit}, followed by zero or more access units that are not {initial IRAP access units}, including all subsequent access units up to but not including any subsequent access unit that is an {initial IRAP access unit}.

{cross-layer random access skipped (CL-RAS) picture: A coded picture for which each VCL NAL unit has nal_unit_type equal to CL_RAS_R or CL_RAS_N.
NOTE 4—When NoClrasOutputFlag is equal to 1, the CL-RAS picture is not output and may not be correctly decodable, as the CL-RAS picture may contain references to pictures that are not present in the bitstream. CL-RAS pictures are not used as reference pictures for the decoding process of non-CL-RAS pictures.} initial intra random access point (IRAP) access unit: An IRAP access unit in which the coded picture with nuh_layer_id equal to 0 has NoRaslOutputFlag equal to 1.

instantaneous decoding refresh (IDR) picture: An IRAP picture for which each VCL NAL unit has nal_unit_type equal to IDR_W_RADL, IDR_N_LP, {BL_IDR_W_RADL, or BL_IDR_N_LP}.

F.1.3 intra random access point (IRAP) access unit: An access unit in which the coded picture {with nuh_layer_id equal to 0} is an IRAP picture.

In HEVC Working Draft 10, a random access skipped leading (RASL) picture is a coded picture for which each VCL NAL unit has nal_unit_type equal to RASL_R or RASL_N. All RASL pictures are leading pictures of an associated BLA or CRA picture. When the associated IRAP picture has NoRaslOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated IRAP picture.

That is, in HEVC Working Draft 10, the variable NoRaslOutputFlag is defined for each IRAP picture. When NoRaslOutputFlag is equal to 1, the IRAP picture starts a new coded video sequence, and the associated RASL pictures, when present, are not output. In JCTVC-M0266v2, the definition of NoRaslOutputFlag is changed as follows:

When the current picture is an IRAP picture, the following applies: [Note that this definition of NoRaslOutputFlag is the same as in JCT3V-C1004v4.zip, but moved to be applicable also to IRAP pictures with nuh_layer_id greater than 0.]

If the current picture with a particular nuh_layer_id is an IDR picture, a BLA picture, the first picture with that particular nuh_layer_id in the bitstream in decoding order, or the first picture with that particular nuh_layer_id that follows an end of sequence NAL unit in decoding order, the variable NoRaslOutputFlag is set equal to 1.

Otherwise, if some external means not specified in this Specification is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.

Otherwise, the variable HandleCraAsBlaFlag is set equal to 0 and the variable NoRaslOutputFlag is set equal to 0.

Similarly, in order to indicate to the decoding process whether the associated CL-RAS pictures, when present, are output, another variable, NoClrasOutputFlag, may be defined as follows:

When the access unit containing the current picture is an initial IRAP access unit, the following applies:

If the current picture is a BLA picture, a CRA picture with NoRaslOutputFlag equal to 1, or a BL-IDR picture, NoClrasOutputFlag is equal to 1.

Otherwise, if some external means not specified in this Specification is available to set the variable NoClrasOutputFlag equal to a value, the variable NoClrasOutputFlag is set equal to the value provided by the external means.

Otherwise, NoClrasOutputFlag is equal to 0.

The decoding process may be defined such that unavailable reference pictures are generated (similar to the generation of unavailable reference pictures in HEVC WD10) when decoding a CL-RAS picture of an initial IRAP access unit (AU) and when NoClRasOutputFlag is equal to 1. In some examples, a bitstream does not include coded CL-RAS pictures. However, some HRD operations may rely on the bitstream including coded CL-RAS pictures. For instance, in HRD operations as specified in Annex C of HEVC Working Draft 10, access units containing RASL pictures may need to be taken into consideration in derivation of CPB arrival and removal times. Accordingly, a video decoder may perform a process to generate such unavailable reference pictures. The video coder may set each sample value of each pixel in a generated unavailable reference picture to a maximum value. For instance, as described in section 8.3.3.2 of HEVC Working Draft 10:

When this process is invoked, an unavailable picture is generated as follows:

The value of each element in the sample array $S_L$ for the picture is set equal to $1<<(BitDepth_Y-1)$.

The value of each element in the sample arrays $S_{Cb}$ and $S_{Cr}$ for the picture is set equal to $1-(BitDepth_C-1)$.

The prediction mode CuPredMode[x][y] is set equal to MODE_INTRA for x=0 . . . pic_width_in_luma_samples−1, y=0 . . . pic_height_in_luma_samples−1.

U.S. Provisional Patent Application 61/812,225, filed Apr. 16, 2013, the entire content of which is incorporated by reference, is related to one or more techniques of this disclosure. In bitstreams with more than one layer based on HEVC extensions, random access points are defined as those access units where all pictures in the access unit are IRAP pictures. This imposes restrictions on the random access capability, and it may be desirable to also provide random access capability at those access units where the pictures with nuh_layer_id equal to 0 are IRAP pictures. U.S. Provisional Patent Application 61/812,225 defined the notions of CL-RAS pictures that are associated with IRAP access units containing an IRAP picture with nuh_layer_id equal to 0. In order to support random access capabilities, it would be necessary to define the behavior of the decoder when decoding starts from such an access unit where the picture with nuh_layer_id equal to 0 is an IRAP picture and not all the pictures in the AU are IRAP pictures. U.S. Provisional Patent Application 61/812,225 and JCTVC-M0266_v2 provide some of the processes related to this.

However, existing designs, including those provided U.S. Provisional Patent Application 61/812,225 and JCTVC-M0266_v2, are associated with one or more issues. For example, streaming servers and media-aware network elements (MANEs) may decide not to send CL-RAS pictures to receivers when such CL-RAS pictures are not correctly decodable (i.e. when NoClrasOutputFlag is equal to 1 for the initial IRAP AU). To enable conforming decoders to be able to handle both cases wherein bitstreams contain or not contain such CL-RAS pictures, the bitstreams of both cases need to be defined as conforming bitstreams and consequently two sets of HRD parameters are needed. Otherwise, only one case can be defined as conforming bitstreams and consequently enhancements to conforming decoders are needed to handle the other case for which the bitstreams are non-conforming bitstreams.

In another example of the shortcomings associated with U.S. Provisional Patent Application 61/812,225 and JCTVC-M0266_v2, for generation of unavailable reference pictures when decoding a CL-RAS picture of an initial IRAP AU and when NoClRasOutputFlag is equal to 1, not only do the RPS subsets RefPicSetStFoll and RefPicSetLtFoll need to be generated, but the RPS subsets RefPicSetStCurrBefore, RefPicSetStCurrAfter, and RefPicSetLtCurr also need to be generated. If such a process is not defined for RefPicSetStCurrBefore, RefPicSetStCurrAfter, and RefPicSetLtCurr subsets, then the decoding process of the CL-RAS pictures cannot be performed because there is no reference picture (neither the original reference picture, nor the generated reference pictures) in those subsets used for inter-prediction.

This disclosure defines a NoClrasPicPresentFlag to specify whether CL-RAS pictures associated with an initial IRAP AU are present. Thus, a device (e.g., a video decoder or other device) may determine, based on a value (e.g., NoClRasPicPresentFlag) whether all CL-RAS picture of (i.e., associated with) an IRAP access unit are present in a video data bitstream. The NoClrasPicPresentFlag is a variable that can be set e.g., by external means or in an SEI message. Thus, in some examples, the device may set the value (e.g., NoClRasPicPresentFlag) based at least in part on data in an SEI message of the video data bitstream. Furthermore, in some examples, the value (e.g., NoClRasPicPresentFlag) may be set by a mechanism (i.e., an external means) outside a decoding process for the video data. As described elsewhere in this disclosure, the device may perform, based at least in part on the value (e.g., NoClRasPicPresentFlag), a CPB operation.

In some examples, video encoder 20 may generate a bitstream that includes a sequence of bits that forms a representation of coded pictures and associated data. The bitstream may include syntax elements from which a device that receives the bitstream is able to derive a value (e.g., NoClRasPicPresentFlag) that specifies whether cross-layer random access skipped (CL-RAS) pictures of an Intra Random Access Point (IRAP) access unit are present in the bitstream. Video encoder 20 may output the bitstream. In some examples, video encoder 20 (or another device, such as a MANE) may generate an SEI message that sets a variable that specifies whether CL-RAS pictures of an IRAP access unit are present in a bitstream that includes a sequence of bits that forms a representation of coded pictures and associated data. In some examples, the device may include the SEI message in the bitstream.

Furthermore, some techniques of this disclosure define conformance of bitstreams where CL-RAS pictures associated with an initial IRAP access unit that has an IRAP picture with nuh_layer_id equal to 0 and NoRaslOutputFlag equal to 1. Syntax elements in a buffering period SEI message that correspond to CPB and DPB delay offsets when the CL-RAS pictures are not present in the conformance bitstream are signalled. Furthermore, some techniques of this disclosure define syntax elements in a buffering period SEI message that correspond to an alternate CPB initial removal delay and offsets values to account for removal of CL-RAS pictures. Additionally, some techniques of this disclosure define CPB and DPB behaviors using the newly defined syntax elements when the CL-RAS pictures are not present in the conforming bitstream.

Additionally, some techniques of this disclosure define a complete generation process for unavailable reference pictures when decoding a CL-RAS picture in an initial IRAP AU and when NoClRasOutputFlag is equal to 1. For instance, when CL-RAS pictures are not output (e.g., when NoClRasOutputFlag is equal to 1) and the current picture is a CL-RAS picture in an initial IRAP access unit, a video decoder (e.g., video decoder 30) may generate unavailable reference pictures for the CL-RAS picture. In some examples, an IRAP access unit is an access unit where the picture with nuh_layer_id equal to 0 is an IRAP picture. An initial IRAP access unit may be an IRAP access unit where the IRAP picture with nuh_layer_id equal to 0 has NoRaslOutputFlag equal to 1.

Furthermore, some techniques of this disclosure define a new cross-layer HRD parameters SEI message that is used to signal alternate bit rate and CPB size parameters for IRAP access units. These parameters may be used when the corresponding IRAP access unit is an initial IRAP access unit with associated CL-RAS pictures not present.

Figure 3:
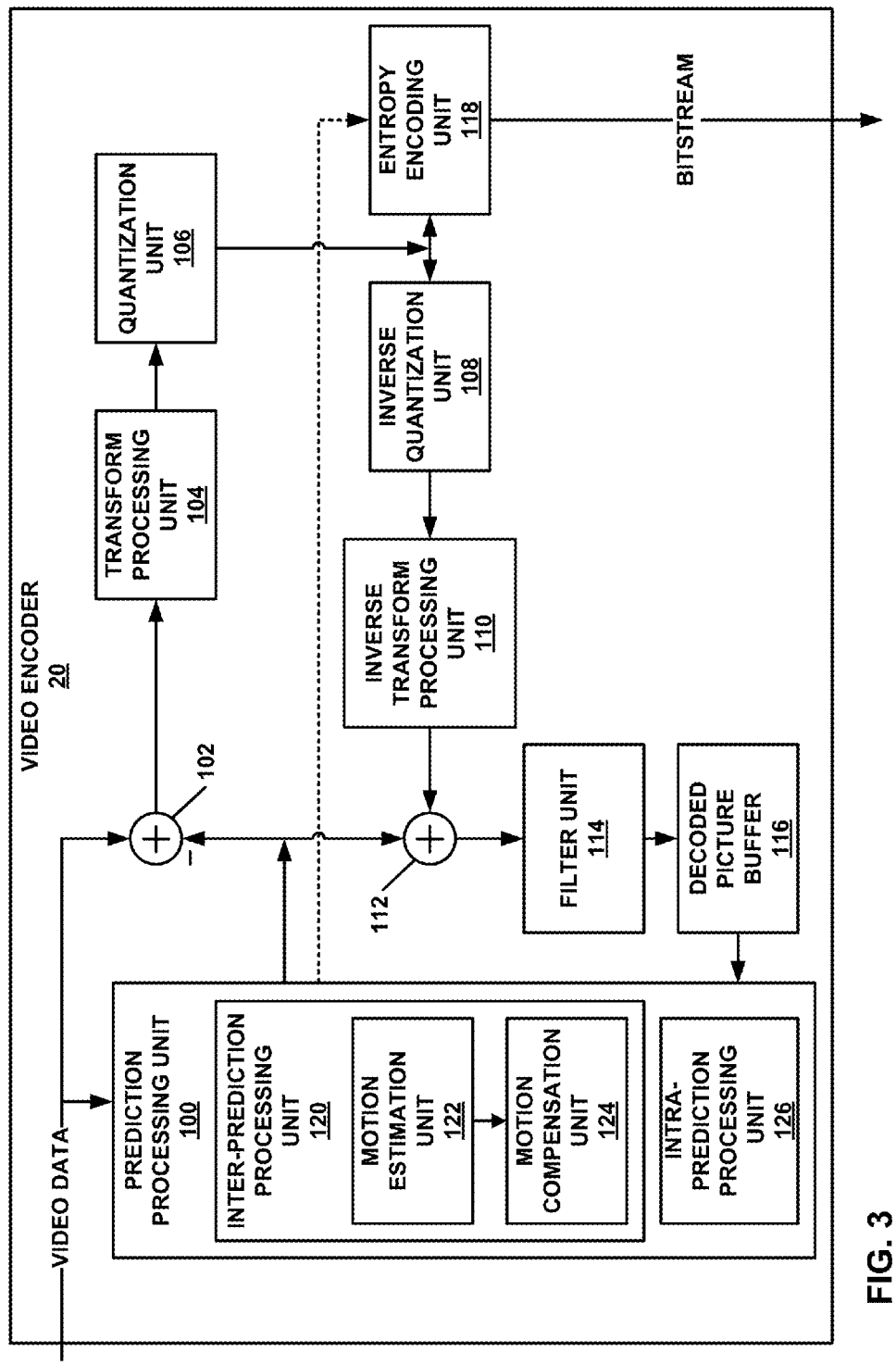
FIG. 3 is a block diagram illustrating an example video encoder that may implement the techniques described in this disclosure.

FIG. 3 is a block diagram illustrating an example video encoder 20 that may implement the techniques of this disclosure. FIG. 3 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 3, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predictive block is formed using spatial prediction from previously-encoded neighboring blocks within the same frame.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely correspond to the sample blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference region indicated by the motion vector of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) of a CU and the selected predictive blocks (e.g., luma, Cb and Cr predictive blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks of (i.e., associated with) TUs of the CU. Thus, a TU may have (i.e., be associated with) a luma transform block and two corresponding chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with (e.g., corresponding to) each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

In some examples, the bitstream generated by video encoder 20 of FIG. 3 may include one or more syntax elements from which a device that receives the bitstream (e.g. video decoder 30) is able to derive a value that specifies whether CL-RAS pictures of an IRAP access unit are present in the bitstream. For instance, a buffering period SEI message generated by video encoder 20 may include one or more syntax elements from which a device that receives the bitstream is able to derive a value that specifies whether CL-RAS pictures of an IRAP access unit are present in the bitstream.

Figure 4:
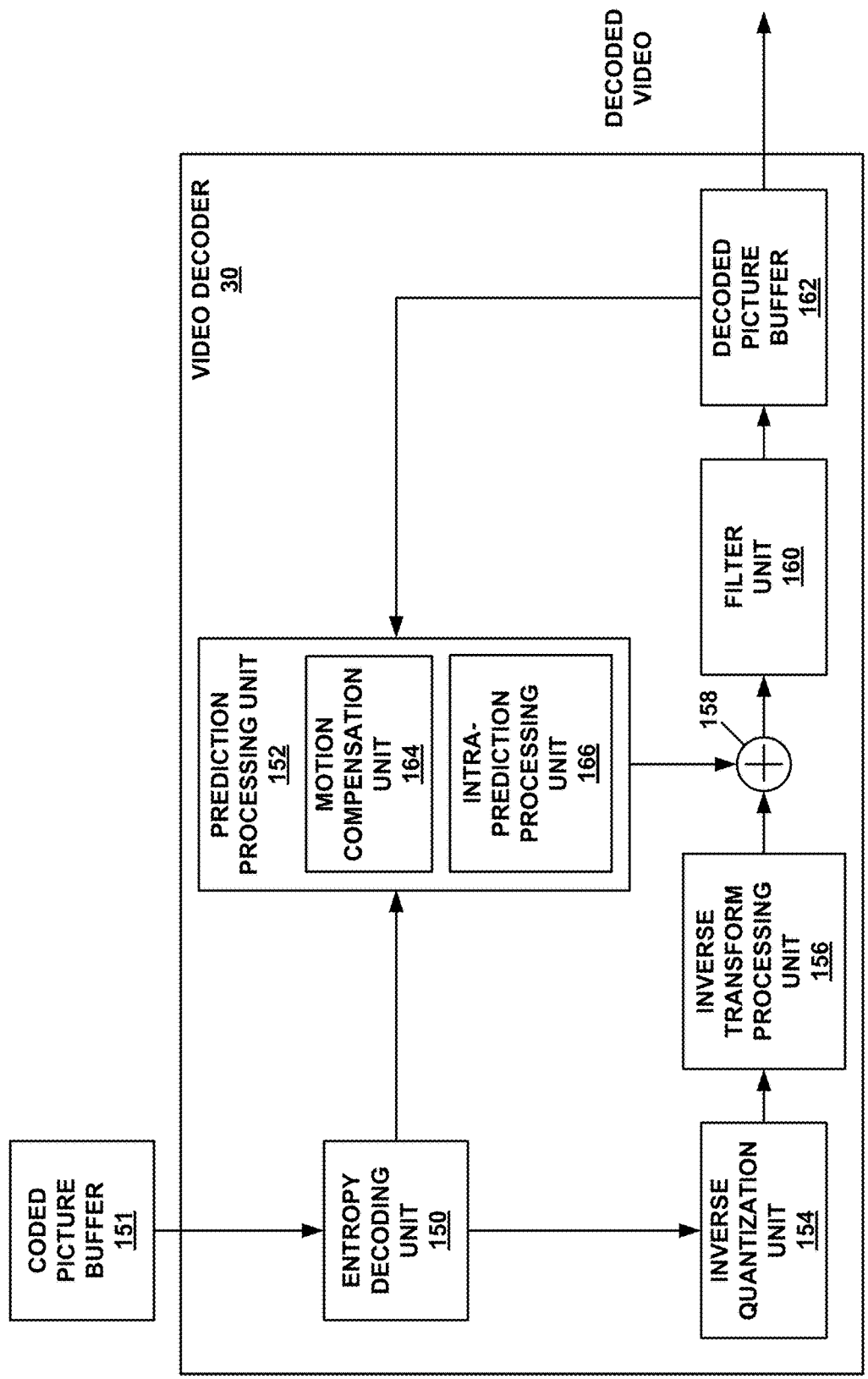
FIG. 4 is a block diagram illustrating an example video decoder that may implement the techniques described in this disclosure.

FIG. 4 is a block diagram illustrating an example video decoder 30 that is configured to implement the techniques of this disclosure. FIG. 4 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 4, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. Entropy decoding unit 150 may receive NAL units from CPB 151 and may parse the NAL units to obtain (e.g., decode) syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In accordance with one or more techniques of this disclosure, one or more components of video decoder 30 (e.g., entropy decoding unit 150) may determine a value (e.g., NoClRasPicPresentFlag). Furthermore, in accordance with one or more techniques of this disclosure, video decoder 30 may determine, based on the value, whether all CL-RAS pictures of an IRAP access unit are present in a video data bitstream. In addition, the device may decode the video data bitstream.

In addition to obtaining (e.g., decoding) syntax elements from the bitstream, video decoder 30 may perform a reconstruction operation on a CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks of (e.g., associated with) the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on sample blocks at the one or more reference blocks for the PU, predictive luma, Cb and Cr blocks for the PU.

Reconstruction unit 158 may use the transform blocks (e.g., luma, Cb and Cr transform blocks) associated with TUs of a CU and the predictive blocks (e.g., luma, Cb and Cr predictive blocks) of the PUs of the CU, i.e., either intra-prediction data or inter-prediction data, as applicable, to reconstruct the coding blocks (e.g., luma, Cb and Cr coding blocks) of the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks (e.g., luma, Cb and Cr coding blocks) of the CU. Video decoder 30 may store the coding blocks (e.g., luma, Cb and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb and Cr blocks) in decoded picture buffer 162, intra prediction or inter prediction operations on PUs of other CUs. In this way, video decoder 30 may extract, from the bitstream, transform coefficient levels of coefficient blocks, inverse quantize the transform coefficient levels, apply a transform to the transform coefficient levels to generate transform blocks, generate, based at least in part on the transform blocks, one or more coding blocks, and output the one or more coding block for display.

In a first set of examples of the techniques of this disclosure, changes to syntax, semantics and decoding processes required for defining the conformance with the use of CL-RAS pictures are defined relative to particular processes described in JCTVC-M0266v2 and U.S. Provisional Patent Application 61/812,225. In this example, the syntax elements introduced for the HRD parameters are included in the buffering period SEI message.

In the first set of examples of the techniques of this disclosure, the following definition of associated CL-RAS pictures may be provided:

associated CL-RAS pictures: CL-RAS pictures for an initial IRAP AU where the CL-RAS pictures within a CVS with layer ID value nuh_layer_id contained in layerSetLayerIdList that succeed the first picture in an initial IRAP AU and precede, in decoding order, an IRAP picture with layer ID value nuh_layer_id.

Furthermore, in the first set of examples of the techniques of this disclosure, the following changes may be made to the general decoding process described in HEVC Working Draft 10. The SHVC and MV-HEVC working drafts define some portions of SHVC and MV-HEVC in terms of changes relative to the HEVC Working Draft (e.g., HEVC Working Draft 10). Throughout the following sections, passages marked with <insert1> . . . </insert1> tags are additional changes to the syntax, semantics and decoding process of HEVC Working Draft 10 introduced by JCTVC-M0266v2 to implement SHVC and/or MV-HEVC. Passages marked with <insert2> . . . </insert2> tags are additional changes introduced by the current disclosure. Passages marked with <delete> . . . </delete> tags are removed by the current disclosure from HEVC Working Draft 10 (or changes introduced in the SHVC or MV-HEVC working drafts to HEVC Working Draft 10) to implement SHVC, MV-HEVC, or other extensions.

8.1 General Decoding Process

Input to this process is a bitstream. Output of this process is a list of decoded pictures.

The layer identifier list TargetDecLayerIdList, which specifies the list of nuh_layer_id values, in increasing order of nuh_layer_id values, of the NAL units to be decoded, is specified as follows:

If some external means, not specified in this Specification, is available to set TargetDecLayerIdList, TargetDecLayerIdList is set by the external means.

Otherwise, if the decoding process is invoked in a bitstream conformance test as specified in subclause C.1, TargetDecLayerIdList is set as specified in subclause C.1.

Otherwise, TargetDecLayerIdList contains only one nuh_layer_id value that is equal to 0.

The variable HighestTid, which identifies the highest temporal sub-layer to be decoded, is specified as follows:

If some external means, not specified in this Specification, is available to set HighestTid, HighestTid is set by the external means.

Otherwise, if the decoding process is invoked in a bitstream conformance test as specified in subclause C.1, HighestTid is set as specified in subclause C.1.

Otherwise, HighestTid is set equal to sps_max_sub_layers_minus1.

The sub-bitstream extraction process as specified in clause 10 is applied with the bitstream, HighestTid, and TargetDecLayerIdList as inputs, and the output is assigned to a bitstream referred to as BitstreamToDecode.

The decoding processes specified in the remainder of this subclause apply to each coded picture, referred to as the current picture and denoted by the variable CurrPic, in BitstreamToDecode.

Depending on the value of chroma_format_idc, the number of sample arrays of the current picture is as follows:

If chroma_format_idc is equal to 0, the current picture consists of 1 sample array $S_L$.

Otherwise (chroma_format_idc is not equal to 0), the current picture consists of 3 sample arrays $S_L$, $S_{Cb}$, $S_{Cr}$.

The decoding process for the current picture takes as inputs the syntax elements and upper-case variables from clause 7. When interpreting the semantics of each syntax element in each NAL unit, the term "the bitstream" (or part thereof, e.g. a CVS of the bitstream) refers to BitstreamToDecode (or part thereof).

The decoding process is specified such that all decoders will produce numerically identical cropped decoded pictures. Any decoding process that produces identical cropped decoded pictures to those produced by the process described herein (with the correct output order or output timing, as specified) conforms to the decoding process requirements of this Specification.

<insert1>When the current picture is an IRAP picture, the following applies:
  If the current picture with a particular nuh_layer_id is an IDR picture, a BLA picture, the first picture with that particular nuh_layer_id in the bitstream in decoding order, or the first picture with that particular nuh_layer_id that follows an end of sequence NAL unit in decoding order, the variable NoRaslOutputFlag is set equal to 1.
  Otherwise, if some external means not specified in this Specification is available to set the variable HandleCraAsBlaFlag to a value for the current picture, the variable HandleCraAsBlaFlag is set equal to the value provided by the external means and the variable NoRaslOutputFlag is set equal to HandleCraAsBlaFlag.
  Otherwise, the variable HandleCraAsBlaFlag is set equal to 0 and the variable NoRaslOutputFlag is set equal to 0.
When the access unit containing the current picture is an initial IRAP access unit, the following applies:
  If the current picture is a BLA picture, a CRA picture with NoRaslOutputFlag equal to 1, or a BL-IDR picture, NoClrasOutputFlag is equal to 1.
  Otherwise, if some external means not specified in this Specification is available to set the variable NoClrasOutputFlag equal to a value, the variable NoClrasOutputFlag is set equal to the value provided by the external means.
  Otherwise, NoClrasOutputFlag is equal to 0. </insert1>
<insert2>When the current AU is an initial IRAP AU, the value of NoClrasPicPresentFlag is specified by external means. NoClrasPicPresentFlag equal to 0 specifies that all the CL-RAS pictures associated with the initial IRAP AU are not present in the bitstream. NoClrasPicPresentFlag equal to 1 specifies that all the CL-RAS pictures that are associated with the initial IRAP AU are present in the bitstream.
Alternatively, NoClRasPicPresentFlag may be derived by the syntax elements present as part of the bitstream, e.g. by new NAL unit type values, or through a flag in the VPS, through flags in an SEI message, e.g. in the buffering period SEI message.</insert2>
When the current picture has nuh_layer_id equal to 0, the decoding process for a coded picture with nuh_layer_id equal to 0 specified in subclause 8.1.1 is invoked.

<insert2>It is a requirement of bitstream conformance that the following restriction is followed:
  If the current picture is an IRAP picture with nuh_layer_id greater than 0, then for every direct reference layer of the current layer with layer ID value directRefLayerId, there exists at least one IRAP picture in the CVS with nuh_layer_id value equal to directRefLayerId and with a decoding order preceding the current picture.</insert2>

Thus, in at least some examples, a video decoder (or other device) may perform a bitstream conformance test to determine whether the video data bitstream conforms to a video coding specification, wherein it is a requirement of bitstream conformance that if a current picture is an IRAP picture with a layer identifier greater than 0, then for each direct reference layer of a current layer, there exists at least one IRAP picture in a CVS with a layer identifier equal to a layer identifier of the current layer and with a decoding order preceding the current picture. Additionally, a device (e.g., video encoder 20 or another device) may generate a bitstream that includes a VPS that includes a syntax element (e.g., a flag) from which a video decoder is able to derive the NoClRasPicPresentFlag.

Furthermore, in accordance with the first set of examples of the techniques of this disclosure, the following changes may be made to the NAL unit header semantics provided in HEVC Working Draft 10.

F.7.4.2.2 NAL Unit Header Semantics
  The specifications in subclause 7.4.2.2 apply with following modifications and additions.
  nal_unit_type specifies the type of RBSP data structure contained in the NAL unit as specified in Table 7-1.
  NAL units that have nal_unit_type in the range of UNSPEC48 . . . UNSPEC63, inclusive, for which semantics are not specified, shall not affect the decoding process specified in this Specification.
    NOTE 1—NAL unit types in the range of UNSPEC48 . . . UNSPEC63 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values.
  For purposes other than determining the amount of data in the decoding units of the bitstream (as specified in Annex C), decoders shall ignore (remove from the bitstream and discard) the contents of all NAL units that use reserved values of nal_unit_type.
    NOTE 2—This requirement allows future definition of compatible extensions to this Specification.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a TSA picture slice_segment_layer_rbsp( ) | VCL |
| 3 | TSA_R | | |
| 4 | STSA_N | Coded slice segment of an STSA | VCL |

TABLE 7-1-continued

NAL unit type codes and NAL unit type classes

| nal_unit_type | Name of nal_unit_type | Content of NAL unit and RBSP syntax structure | NAL unit type class |
|---|---|---|---|
| 5 | STSA_R | picture slice_segment_layer_rbsp( ) | |
| 6 | RADL_N | Coded slice segment of a RADL picture slice_segment_layer_rbsp( ) | VCL |
| 7 | RADL_R | | |
| 8 | RASL_N | Coded slice segment of a RASL picture slice_segment_layer_rbsp( ) | VCL |
| 9 | RASL_R | | |
| 10 | CL_RAS_N | Coded slice segment of a CL-RAS picture slice_segment_layer_rbsp( ) | VCL |
| 11 | CL_RAS_R | | |
| 12 | RSV_VCL_N12 | Reserved non-IRAP sub-layer non-reference VCL NAL unit types | VCL |
| 14 | RSV_VCL_N14 | | |
| 13 | RSV_VCL_R13 | Reserved non-IRAP sub-layer reference VCL NAL unit types | VCL |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of an IDR picture slice_segment_layer_rbsp( ) | VCL |
| 20 | IDR_N_LP | | |
| 22 | BL_IDR_W_RADL | | |
| 23 | BL_IDR_N_LP | | |
| 21 | CRA_NUT | Coded slice segment of a CRA picture slice_segment_layer_rbsp( ) | VCL |
| 24 . . . 31 | RSV_VCL24..RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41 . . . 47 | RSV_NVCL41..RSV_NVCL47 | Reserved | non-VCL |
| 48 . . . 63 | UNSPEC48..UNSPEC63 | Unspecified | non-VCL |

NOTE 3—A CRA picture may have associated RASL or RADL pictures present in the bitstream.

NOTE 4—A BLA picture having nal_unit_type equal to BLA_W_LP may have associated RASL or RADL pictures present in the bitstream. A BLA picture having nal_unit_type equal to BLA_W_RADL does not have associated RASL pictures present in the bitstream, but may have associated RADL pictures in the bitstream. A BLA picture having nal_unit_type equal to BLA_N_LP does not have associated leading pictures present in the bitstream.

NOTE 5—An IDR picture having nal_unit_type equal to IDR_N_LP or <insert1>or BL_IDR_N_LP</insert1> does not have associated leading pictures present in the bitstream. An IDR picture having nal_unit_type equal to IDR_W_RADL <insert1>or BL_IDR_W_RADL</insert1> does not have associated RASL pictures present in the bitstream, but may have associated RADL pictures in the bitstream.

NOTE 6—A sub-layer non-reference picture is not included in any of RefPicSetStCurrBefore, RefPicSetStCurrAfter and RefPicSetLtCurr of any picture with the same value of TemporalId, and may be discarded without affecting the decodability of other pictures with the same value of TemporalId.

All coded slice segment NAL units <insert1>with a particular value of nuh_layer_id in</insert1> an access unit shall have the same value of nal_unit_type. A picture is also referred to as having a nal_unit_type equal to the nal_unit_type of the coded slice segment NAL units of the picture.

If a picture has nal_unit_type equal to TRAIL_N, TSA_N, STSA_N, RADL_N, RASL_N, <insert1>CL_RAS_N,</insert1>, RSV_VCL_N12, or RSV_VCL_N14, the picture is a sub-layer non-reference picture. Otherwise, the picture is a sub-layer reference picture.
<insert1>If the current access unit is an initial IRAP access unit, the following applies:
   If each picture in the current access unit with nuh_layer_id equal to RefLayerId[LayerIdInVps[currLayerId]][j] is an IRAP picture, where j is in the range of 0 to NumDirectRefLayers[LayerIdInVps[currLayerId]]−1, inclusive, and currLayerId is the nuh_layer_id of the current picture, the current picture shall be either an IRAP picture or a CL-RAS picture with nal_unit_type equal to CL_RAS_R.
   Otherwise, the current picture shall be a CL-RAS picture with nal_unit_type equal to CL_RAS_R.
   Otherwise, the following applies:
   If the previous picture in decoding order in the same layer as the current picture is a CL-RAS picture, the current picture shall be either a CL-RAS picture or an IRAP picture.
   Otherwise, the current picture shall not be a CL-RAS picture.</insert1>
<insert1>Within each layer,</insert1> each picture, other than the first picture in the bitstream in decoding order, is considered to be associated with the previous IRAP picture in decoding order.
When a picture is a leading picture, it shall be a RADL or RASL picture.
When a picture is a trailing picture, it shall not be a RADL or RASL picture.
When a picture is a leading picture, it shall precede, in decoding order, all trailing pictures that are associated with the same IRAP picture.
No RASL pictures shall be present in the bitstream that are associated with a BLA picture having nal_unit_type equal to BLA_W_RADL or BLA_N_LP.
No RASL pictures shall be present in the bitstream that are associated with an IDR picture.
No RADL pictures shall be present in the bitstream that are associated with a BLA picture having nal_unit_type equal to BLA_N_LP or that are associated with an IDR picture having nal_unit_type equal to IDR_N_LP<insert1>or BL_IDR_N_LP</insert1>.
   NOTE 7—It is possible to perform random access at the position of an IRAP access unit by discarding all access units before the IRAP access unit (and to correctly decode the IRAP picture and all the subsequent non-RASL pictures in decoding order), provided each parameter set is available (either in the bitstream or by external means not specified in this Specification) when it needs to be activated.
Any picture that has PicOutputFlag equal to 1 that precedes an IRAP picture in decoding order shall precede the IRAP picture in output order and shall precede any RADL picture associated with the IRAP picture in output order.
Any RASL picture associated with a CRA or BLA picture shall precede any RADL picture associated with the CRA or BLA picture in output order.
Any RASL picture associated with a CRA picture shall follow, in output order, any IRAP picture that precedes the CRA picture in decoding order.
When sps_temporal_id_nesting_flag is equal to 1 and TemporalId is greater than 0, the nal_unit_type shall be equal to TSA_R, TSA_N, RADL R, RADL_N, RASL_R, or RASL_N.
nuh_layer_id specifies the identifier of the layer.
   <insert1>When nal_unit_type is equal to CL_RAS_R, CL_RAS_N, BL_IDR_W_RADL, or BL_IDR_N_LP, the value of nuh_layer_id shall be greater than 0.</insert1>

Furthermore, in the first set of examples of the techniques of this disclosure, the following changes may be made to VPS, SPS and PPS activation of HEVC Working Draft 10.

F.7.4.2.4.2 Order of VPS, SPS and PPS RBSPs and their Activation

The specifications in subclause 7.4.2.4.2 apply with the following additions. Each PPS RBSP is initially considered not active for any layer with nuh_layer_id greater than 0 at the start of the operation of the decoding process. At most one PPS RBSP is considered active for each non-zero nuh_layer_id value at any given moment during the operation of the decoding process, and the activation of any particular PPS RBSP for a particular non-zero nuh_layer_id value results in the deactivation of the previously-active PPS RBSP for that non-zero nuh_layer_id value (if any).

When a PPS RBSP (with a particular value of pps_pic_parameter_set_id) is not active for a nuh_layer_id value and it is referred to by a coded slice segment NAL unit (using a value of slice_pic_parameter_set_id equal to the pps_pic_parameter_set_id and having that value of nuh_layer_id), it is activated for that nuh_layer_id value. This PPS RBSP is called the active layer PPS RBSP for that nuh_layer_id value until it is deactivated by the activation of another PPS RBSP for the same layer. A PPS RBSP, with that particular value of pps_pic_parameter_set_id, shall be available to the decoding process prior to its activation, included in at least one access unit with TemporalId less than or equal to the TemporalId of the PPS NAL unit or provided through external means. The nuh_layer_id value of the NAL unit containing the PPS RBSP that is activated for nuh_layer_id equal to nuhLayerIdA shall be less than or equal to nuhLayerIdA. The same PPS RBSP may be the active layer PPS for more than one nuh_layer_id value.

Any PPS NAL unit containing the value of pps_pic_parameter_set_id for the active layer PPS RBSP for a coded picture shall have the same content as that of the active layer PPS RBSP for the coded picture, unless it follows the last VCL NAL unit of the coded picture and precedes the first VCL NAL unit of another coded picture.

Each SPS RBSP is initially considered not active for any layer with nuh_layer_id greater than 0 at the start of the operation of the decoding process. At most one SPS RBSP is considered active for each non-zero nuh_layer_id value at any given moment during the operation of the decoding process, and the activation of any particular SPS RBSP for a particular non-zero nuh_layer_id value results in the deactivation of the previously-active SPS RBSP for that non-zero nuh_layer_id value (if any).

When an SPS RBSP (with a particular value of sps_seq_parameter_set_id) is not already active for a nuh_layer_id value and it is referred to by activation of a PPS RBSP for that nuh_layer_id value (in which pps_seq_parameter_set_id is equal to the sps_seq_parameter_set_id value), it is activated for that nuh_layer_id value. This SPS RBSP is called the active layer SPS RBSP for that nuh_layer_id value until it is deactivated by the activation of another SPS RBSP for the same layer. An SPS RBSP, with that particular value of sps_seq_parameter_set_id shall be available to the decoding process prior to its activation, included in at least one access unit with TemporalId equal to 0 or provided through external means. An activated SPS RBSP for a particular nuh_layer_id value shall remain active for a sequence of pictures in decoding order with that nuh_layer_id value starting from <insert1>a picture having that nuh_layer_id value in</insert1> . . . <insert2>either</insert2> . . . <insert1> an initial IRAP access unit</insert1> . . . <insert2>or the first access unit after the initial IRAP access unit that contains a picture with nuh_layer_id value</insert2>, inclusive, until either the next <insert1>picture having that nuh_layer_id value in an initial IRAP access unit</insert1>, exclusive, or the end of the CVS, whichever is earlier. The nuh_layer_id value the NAL unit containing the SPS RBSP that is activated for nuh_layer_id equal to nuhLayerIdA shall be less than or equal to nuhLayerIdA. The same SPS RBSP may be the active layer SPS for more than one nuh_layer_id value.

Any SPS NAL unit containing the value of sps_seq_parameter_set_id for the active layer SPS RBSP shall have the same content as that of the active layer SPS RBSP unless it follows the last coded picture for which the active layer SPS is required to be active and precedes the first NAL unit activating a SPS of the same value of seq_parameter_set_id.

During operation of the decoding process for VCL NAL units with a non-zero nuh_layer_id value, the values of parameters of the active layer SPS for that non-zero nuh_layer_id value, and the active layer PPS RBSP for that non-zero nuh_layer_id value are considered in effect.

In the first set of examples of the techniques of this disclosure, the following changes may be made to the decoding process of HEVC Working Draft 10 for starting the decoding of a coded picture with nuh_layer_id greater than 0.

F.8.1.1 Decoding Process for Starting the Decoding of a Coded Picture with Nuh_Layer_Id Greater than 0

Each picture referred to in this subclause is a complete coded picture.

The decoding process operates as follows for the current picture CurrPic:

1. The decoding of NAL units is specified in subclause 4.
2. The processes in subclause 8.3 specify the following decoding processes using syntax elements in the slice segment layer and above:
    Variables and functions relating to picture order count are derived in subclause 8.3.1. This needs to be invoked only for the first slice segment of a picture. It is a requirement of bitstream conformance that <insert1>the difference between the PicOrderCnVal values of the two pictures with a particular value of nuh_layer_id within the same CVS shall be the same for any value of nuh_layer_id.</insert1>
    The decoding process for RPS in subclause 8.3.2 is invoked for pictures with nuh_layer_id equal to that of CurrPic, wherein reference pictures may be marked as "unused for reference" or "used for long-term reference". This needs to be invoked only for the first slice segment of a picture.
    When <insert1>NoClrasOutputFlag is equal to 1 and the access unit containing CurrPic is an initial IRAP access unit,</insert1> the decoding process for generating unavailable reference pictures specified in <insert2>Section 5.7</insert2> is invoked, which needs to be invoked only for the first slice segment of a picture.

Furthermore, in the first set of examples of the techniques of this disclosure, the following changes may be made to the decoding process of HEVC Working Draft 10 for ending the decoding of a coded picture with nuh_layer_id greater than 0.

F.8.1.1 Decoding Process for Ending the Decoding of a Coded Picture with Nuh_Layer_Id Greater than 0

PicOutputFlag is set as follows:
    If the current picture is a RASL picture and NoRaslOutputFlag of the associated IRAP picture is equal to 1, PicOutputFlag is set equal to 0.
    <insert1>—Otherwise, if the current picture is a CL-RAS picture and NoClrasOutputFlag is equal to 1, PicOutputFlag is set equal to 0.</insert1>
    Otherwise, PicOutputFlag is set equal to pic_output_flag.

The following applies:
    The decoded picture is marked as "used for short-term reference".
    When Temporand is equal to HighestTid, the marking process for sub-layer non-reference pictures not needed for inter-layer prediction specified in subclause F.8.1.2.1 is invoked with latestDecLayerId equal to nuh_layer_id as input.

In addition, in the first set of examples of the techniques of this disclosure, the following changes may be made to the generation of unavailable reference pictures in HEVC Working Draft 10.

8.3.3.1 General Decoding Process for Generating Unavailable Reference Pictures

This process is invoked once per coded picture when the current picture is a BLA picture or is a CRA picture with NoRaslOutputFlag equal to 1.

NOTE—This process is primarily specified only for the specification of syntax constraints for RASL pictures. The entire specification of the decoding process for RASL pictures associated with an IRAP picture that has NoRaslOutputFlag equal to 1 is included herein only for purposes of specifying constraints on the allowed syntax content of such RASL pictures. During the decoding process, any RASL pictures associated with an IRAP picture that has NoRaslOutputFlag equal to 1 may be ignored, as these pictures are not specified for output and have no effect on the decoding process of any other pictures that are specified for output. However, in HRD operations as specified in Annex C may need to be taken into consideration in derivation of CPB arrival and removal times.

When this process is invoked, the following applies:
For each RefPicSetStFoll[i], with i in the range of 0 to NumPocStFoll−1, inclusive, that is equal to "no reference picture," a picture is generated as specified in subclause 8.3.3.2, and the following applies:
    The value of PicOrderCntVal for the generated picture is set equal to PocStFoll[i].
The value of PicOutputFlag for the generated picture is set equal to 0.
The generated picture is marked as "used for short-term reference".
RefPicSetStFoll[i] is set to be the generated reference picture.
    <insert1>The value of nuh_layer_id for the generated picture is set equal to nuh_layer_id.</insert1>

For each RefPicSetLtFoll[i], with i in the range of 0 to NumPocLtFoll−1, inclusive, that is equal to "no reference picture," a picture is generated as specified in subclause 8.3.3.2, and the following applies:
   The value of PicOrderCntVal for the generated picture is set equal to PocLtFoll[i].
   The value of slice_pic_order_cnt_lsb for the generated picture is inferred to be equal to (PocLtFoll[i] & (MaxPicOrderCntLsb−1).
   The value of PicOutputFlag for the generated picture is set equal to 0.
   The generated picture is marked as "used for long-term reference".
   RefPicSetLtFoll[i] is set to be the generated reference picture.
   <insert1>The value of nuh_layer_id for the generated picture is set equal to nuh_layer_id.</insert1>

Furthermore, in the first set of examples of the techniques of this disclosure, the generation of unavailable reference pictures for CL-RAS pictures in HEVC Working Draft 10 may be changed as follows.

This process is invoked once per coded picture <insert1>when NoClrasOutputFlag is equal to 1 any CL-RAS pictures</insert1>

NOTE—This process is primarily specified only for the specification of syntax constraints for <insert1>CL-RAS</insert1> pictures. The entire specification of the decoding process for <insert1>when NoClrasOutputFlag is equal to any CL-RAS 1pictures</insert1> is included herein only for purposes of specifying constraints on the allowed syntax content of such <insert1>CL-RAS pictures</insert1> pictures. During the decoding process, <insert1>when NoClrasOutputFlag is equal to 1 any CL-RAS pictures</insert1> may be ignored, as these pictures are not specified for output and have no effect on the decoding process of any other pictures that are specified for output. However, in HRD operations as specified in Annex C, <insert1>CL-RAS pictures</insert1> may need to be taken into consideration in derivation of CPB arrival and removal times.

When this process is invoked, the following applies:
   <insert2>For each RefPicSetStCurrBefore[i], with i in the range of 0 to NumPocStCurrBefore−1, inclusive, that is equal to "no-reference picture," a picture is generated as specified in subclause 8.3.3.2, and the following applies:
      The value of PicOrderCntVal for the generated picture is set equal to PocStCurrBefore[i].
      The value of PicOutputFlag for the generated picture is set equal to 0.
      The generated picture is marked as "used for short-term reference".
      RefPicSetStCurrBefore[i] is set to be the generated reference picture.
      The value of nuh_layer_id for the generated picture is set equal to nuh_layer_id.
   For each RefPicSetStCurrAfter[i], with i in the range of 0 to NumPocStCurrAfter−1, inclusive, that is equal to "no-reference picture," a picture is generated as specified in subclause 8.3.3.2, and the following applies:
      The value of PicOrderCntVal for the generated picture is set equal to PocStCurrAfter[i].
      The value of PicOutputFlag for the generated picture is set equal to 0.
      The generated picture is marked as "used for short-term reference".
      RefPicSetStCurrAfter[i] is set to be the generated reference picture.
      The value of nuh_layer_id for the generated picture is set equal to nuh_layer_id.</insert2>
   For each RefPicSetStFoll[i], with i in the range of 0 to NumPocStFoll−1, inclusive, that is equal to "no-reference picture," a picture is generated as specified in subclause 8.3.3.2, and the following applies:
      The value of PicOrderCntVal for the generated picture is set equal to PocStFoll[i].
      The value of PicOutputFlag for the generated picture is set equal to 0.
      The generated picture is marked as "used for short-term reference".
      RefPicSetStFoll[i] is set to be the generated reference picture.
      <insert1>The value of nuh_layer_id for the generated picture is set equal to nuh_layer_id.</insert1>
   <insert2>For each RefPicSetLtCurr[i], with i in the range of 0 to NumPocLtCurr−1, inclusive, that is equal to "no-reference picture," a picture is generated as specified in subclause 8.3.3.2, and the following applies:
      The value of PicOrderCntVal for the generated picture is set equal to PocLtCurr[i].
      The value of slice_pic_order_cnt_lsb for the generated picture is inferred to be equal to (PocLtCurr[i] & (MaxPicOrderCntLsb−1)).
      The value of PicOutputFlag for the generated picture is set equal to 0.
      The generated picture is marked as "used for long-term reference".
      RefPicSetLtCurr[i] is set to be the generated reference picture.
      The value of nuh_layer_id for the generated picture is set equal to nuh_layer_id.</insert2>
   For each RefPicSetLtFoll[i], with i in the range of 0 to NumPocLtFoll−1, inclusive, that is equal to "no reference picture," a picture is generated as specified in subclause 8.3.3.2, and the following applies:
      The value of PicOrderCntVal for the generated picture is set equal to PocLtFoll[i].
      The value of slice_pic_order_cnt_lsb for the generated picture is inferred to be equal to (PocLtFoll[i] & (MaxPicOrderCntLsb−1)).
      The value of PicOutputFlag for the generated picture is set equal to 0.
      The generated picture is marked as "used for long-term reference".
      RefPicSetLtFoll[i] is set to be the generated reference picture.
      <insert1>The value of nuh_layer_id for the generated picture is set equal to nuh_layer_id.</insert1>

Thus, in some examples, video decoder 30 may generate unavailable reference pictures when decoding the CL-RAS pictures for a first, second, third, fourth, and fifth reference picture subset. Each reference picture in the first reference picture subset (e.g., RefPicSetStCurrBefore) is a short-term reference picture occurring before the current picture in output order, each reference picture in the second reference picture subset (e.g., RefPicSetStCurrAfter) is a short-term reference picture occurring after the current picture in output order, each reference picture in the third reference picture subset (e.g., RefPicSetStFoll) is a short-term reference picture that is not used for inter prediction of the current picture, each reference picture in the fourth reference picture subset (e.g., RefPicSetLtCurr) is a long-term reference picture usable for inter prediction of the current picture, and each reference picture in the fifth reference picture subset (e.g., RefPicSetLtFoll) is a long-term reference picture not used for inter prediction of the current picture.

Furthermore, in some examples, video decoder 30 may, for each respective position in an array for the first reference picture subset (e.g., RefPicSetStBefore[i]), if an entry at the respective position is equal to "no reference picture," generate a reference picture for which the following applies: a picture order count (POC) value for the generated reference picture is equal to a POC value at the respective position in a first set of POC values (e.g., PocStCurrBefore), a picture output flag for the generated reference picture is set equal to 0, the generated reference picture is marked as used for short-term reference, the respective position in the array for the reference picture subset is set to the generated reference picture, and the layer identifier for the generated reference picture is set to the layer identifier of the current picture (e.g., nuh_layer_id). Furthermore, for each respective position in an array for the second reference picture subset (e.g., RefPicSetStCurrAfter[i]), if an entry at the respective position is equal to "no reference picture," the video coder may generate a reference picture for which the following applies: a POC value for the generated reference picture is equal to a POC value at the respective position in a second set of POC values (e.g., PocStCurrAfter), a picture output flag for the generated reference picture is set equal to 0, the generated reference picture is marked as used for short-term reference, the respective position in the array for the second reference picture subset is set to the generated reference picture, and the layer identifier for the generated reference picture is set to the layer identifier of the current picture. Additionally, for each respective position in an array for the third reference picture subset (e.g., RefPicSetStFoll[i]), if an entry at the respective position is equal to "no reference picture," the video decoder may generate a reference picture for which the following applies: a POC value for the generated reference picture is equal to a POC value at the respective position in a third set of POC values (e.g., PocStFoll), a picture output flag for the generated reference picture is set equal to 0, the generated reference picture is marked as used for short-term reference, the respective position in the array for the third reference picture subset is set to the generated reference picture, and the layer identifier for the generated reference picture is set to the layer identifier of the current picture. Furthermore, for each respective position in an array for the fourth reference picture subset (e.g., RefPicSetLtCurr[i]), if an entry at the respective position is equal to "no reference picture," the video decoder may generate a reference picture for which the following applies: a POC value for the generated reference picture is equal to a POC value at the respective position in a fourth set of POC values (e.g., PocLtCurr), a value of a syntax element specifying a least significant bits of a POC value (e.g., slice_pic_order_cnt_lsb) for the generated picture is inferred to be equal to a result of a bitwise "and" operation of the POC value at the respective position in the fourth set of POC values and a value resulting from a variable that indicates the maximum value that the least significant bits of POC value is allowed to have (e.g., MaxPicOrderCntLsb) minus 1, a picture output flag for the generated reference picture is set equal to 0, the generated reference picture is marked as used for long-term reference, the respective position in the array for the fourth reference picture subset is set to the generated reference picture, and the layer identifier for the generated reference picture is set to the layer identifier of the current picture. In addition, for each respective position in an array for the fifth reference picture subset (e.g., PocSetLtFoll[i]), if an entry at the respective position is equal to "no reference picture," the video decoder may generate a reference picture for which the following applies: a POC value for the generated reference picture is equal to a POC value at the respective position in a fifth set of POC values (e.g., PocLtFoll), a value of a syntax element specifying a least significant bits of a POC value (e.g., slice_pic_order_cnt_lsb) for the generated picture is inferred to be equal to a result of a bitwise "and" operation of the POC value at the respective position in the fifth set of POC values and a value resulting from a variable that indicates the maximum value that the least significant bits of POC value is allowed to have (e.g., MaxPicOrderCntLsb) minus 1, a picture output flag for the generated reference picture is set equal to 0, the generated reference picture is marked as used for long-term reference, the respective position in the array for the fifth reference picture subset is set to the generated reference picture, and the layer identifier for the generated reference picture is set to the layer identifier of the current picture.

Furthermore, in the first set of examples of the techniques of this disclosure, the following changes may be made to the buffering period SEI message syntax of HEVC Working Draft 10.

| buffering_period( payloadSize ) { | Descriptor |
|---|---|
|   bp_seq_parameter_set_id | ue(v) |
|   if( !sub_pic_hrd_params_present_flag ) { | |
|     irap_cpb_params_present_flag | u(1) |
|     irap_cross_layer_cpb_params_present_flag | u(1) |
|   } | |
|   if( irap_cpb_params_present_flag ) { | |
|     cpb_delay_offset | u(v) |
|     dpb_delay_offset | u(v) |
|   } | |
|   if( irap_cross_layer_cpb_params_present_flag ) { | |
|     cpb_cross_layer_delay_offset | u(v) |
|     dpb_cross_layer_delay_offset | u(v) |
|   } | |
|   concatenation_flag | u(1) |
|   au_cpb_removal_delay_delta_minus1 | u(v) |
|   if( NalHrdBpPresentFlag ) { | |
|     for( i = 0; i <= CpbCnt; i++ ) { | |
|       nal_initial_cpb_removal_delay[ i ] | u(v) |
|       nal_initial_cpb_removal_offset[ i ] | u(v) |
|       if( sub_pic_hrd_params_present_flag \|\| irap_cpb_params_present_flag ) { | |
|         nal_initial_alt_cpb_removal_delay[ i ] | u(v) |

-continued

```
buffering_period( payloadSize ) {                                                Descriptor
        nal_initial_alt_cpb_removal_offset[ i ]                                  u(v)
      }
      if( irap_cross_layer_cpb_params_present_flag ) {
        nal_initial_alt_cross_layer_cpb_removal_delay[ i ]                       u(v)
        nal_initial_alt_cross_layer_cpb_removal_offset[ i ]                      u(v)
      }
    }
  }
}
if( VclHrdBpPresentFlag ) {
  for( i = 0; i <= CpbCnt; i++ ) {
    vcl_initial_cpb_removal_delay[ i ]                                           u(v)
    vcl_initial_cpb_removal_offset[ i ]                                          u(v)
    if( sub_pic_hrd_params_present_flag || irap_cpb_params_present_flag) {
      vcl_initial_alt_cpb_removal_delay[ i ]                                     u(v)
      vcl_initial_alt_cpb_removal_offset[ i ]                                    u(v)
    }
    if( irap_cross_layer_cpb_params_present_flag ) {
      vcl_initial_alt_cross_layer_cpb_removal_delay[ i ]                         u(v)
      vcl_initial_alt_cross_layer_cpb_removal_offset[ i ]                        u(v)
    }
  }
}
}
```

Alternatively, in some examples, signalling of irap_cross_layer_cpb_params_present_flag is not conditioned on the value of sub_pic_hrd_params_present_flag and signalled independently in the buffering period SEI message.

Furthermore, in accordance with the first set of examples of the techniques of this disclosure, the following changes may be made to buffering period SEI message semantics.

<insert2>irap_cross_layer_cpb_params_present_flag equal to 1 specifies the presence of the initial_alt_cross_layer_cpb_removal_delay[i] and initial_alt_cross_layer_cpb_removal_offset[i] syntax elements. When not present, the value of irap_cross_layer_cpb_params_present_flag is inferred to be equal to 0. When the associated picture is neither a CRA picture nor a BLA picture, the value of irap_cross_layer_cpb_params_present_flag shall be equal to 0.

NOTE 2—No more than one of the values of sub_pic_hrd_params_present_flag, irap_cpb_params_present_flag and irap_cross_layer_cpb_params_present_flag can be equal to 1.

cpb_cross_layer_delay_offset specifies an offset to be used in the derivation of the nominal CPB removal times of access units following, in decoding order, the IRAP access unit associated with the buffering period SEI message when the CL-RAS pictures units associated with the IRAP access unit are not present. The syntax element has a length in bits given by au_cpb_removal_delay_length_minus1+1. When not present, the value of cpb_cross_layer_delay_offset is inferred to be equal to 0.

dpb_cross_layer_delay_offset specifies an offset to be used in the derivation of the DPB output times of the IRAP access unit associated with the buffering period SEI message when the CL-RAS pictures associated with the IRAP access unit are not present. The syntax element has a length in bits given by dpb_output_delay_length_minus1+1. When not present, the value of dpb_cross_layer_delay_offset is inferred to be equal to 0.

When the current picture is not the first picture in the bitstream in decoding order, let prevNonDiscardablePic be the preceding picture in decoding order with TemporalId equal to 0 that is not a RASL, RADL or sub-layer non-reference picture.</insert2> nal_initial_cpb_removal_delay[i] and nal_initial_alt_cpb_removal_delay[i] specify the default and the alternative initial CPB removal delays, respectively, for the i-th CPB when the NAL HRD parameters are in use. The syntax elements have a length in bits given by initial_cpb_removal_delay_length_minus1+1, and are in units of a 90 kHz clock. The values of the syntax elements shall not be equal to 0 and shall be less than or equal to 90000*(CpbSize[i]÷BitRate[i]), the time-equivalent of the CPB size in 90 kHz clock units.

<insert2>nal_initial_alt_cross_layer_cpb_removal_delay[i] specifies an alternative initial CPB removal delay for the i-th CPB when the NAL HRD parameters are in use. The syntax element has a length in bits given by initial_cpb_removal_delay_length_minus1+1, and is in units of a 90 kHz clock. The value of the syntax element shall not be equal to 0 and shall be less than or equal to 90000*(CpbSize[i]÷BitRate[i]), the time-equivalent of the CPB size in 90 kHz clock units.</insert2> nal_initial_cpb_removal_offset[i] and nal_initial_alt_cpb_removal_offset[i] specify the default and the alternative initial CPB removal offsets, respectively, for the i-th CPB when the NAL HRD parameters are in use. The syntax elements have a length in bits given by initial_cpb_removal_delay_length_minus1+1 and are in units of a 90 kHz clock.

<insert2>nal_initial_alt_cross_layer_cpb_removal_offset[i] specifies an alternative initial CPB removal offset for the i-th CPB when the NAL HRD parameters are in use. The syntax element has a length in bits given by initial_cpb_removal_delay_length_minus1+1 and is in units of a 90 kHz clock.</insert2>

Over the entire CVS, the sum of nal_initial_cpb_removal_delay[i] and nal_initial_cpb_removal_offset[i] shall be constant for each value of i, the sum of nal_initial_alt_cpb_removal_delay[i] and nal_initial_alt_cpb_removal_offset[i] shall be constant for each value of i, <insert2>and the sum of nal_initial_alt_cross_layer_cpb_removal_delay[i] and nal_initial_alt_cross_layer_cpb_removal_offset[i] shall be constant for each value of i.</insert2> vcl_initial_cpb_removal_delay[i] and vcl_initial_alt_cpb_removal_delay[i] specify the default and the alternative initial CPB removal delays, respectively, for the i-th CPB when the VCL HRD parameters are in use. The syntax elements have a length in bits given by initial_cpb_removal_delay_length_minus1+1, and are in units of a 90 kHz clock. The values of the syntax elements shall not be equal to 0 and shall be less than or equal to 90000*(CpbSize[i]÷BitRate[i]), the time-equivalent of the CPB size in 90 kHz clock units.

<insert2>vcl_initial_alt_cross_layer_cpb_removal_delay [i] specifies an alternative initial CPB removal delay, respectively, for the i-th CPB when the VCL HRD parameters are in use. The syntax element has a length in bits given by initial_cpb_removal_delay_length_minus1+1, and is in units of a 90 kHz clock. The value of the syntax element shall not be equal to 0 and shall be less than or equal to 90000*(CpbSize[i]÷BitRate[i]), the time-equivalent of the CPB size in 90 kHz clock units.</insert2> vcl_initial_cpb_removal_offset[i] and vcl_initial_alt_cpb_removal_offset[i] specify the default and the alternative initial CPB removal offsets, respectively, for the i-th CPB when the VCL HRD parameters are in use. The syntax elements have a length in bits given by initial_cpb_removal_delay_length_minus1+1 and are in units of a 90 kHz clock.

<insert2>vcl_initial_alt_cross_layer_cpb_removal_offset [i] specifies an alternative initial CPB removal offset, respectively, for the i-th CPB when the VCL HRD parameters is in use. The syntax element has a length in bits given by initial_cpb_removal_delay_length_minus1+1 and is in units of a 90 kHz clock.</insert2>

Over the entire CVS, the sum of vcl_initial_cpb_removal_delay[i] and vcl_initial_cpb_removal_offset[i] shall be constant for each value of i, the sum of vcl_initial_alt_cpb_removal_delay[i] and vcl_initial_alt_cpb_removal_offset[i] shall be constant for each value of i, <insert2>and the sum of vcl_initial_alt_cross_layer_cpb_removal_delay[i] and vcl_initial_alt_cross_layer_cpb_removal_offset[i] shall be constant for each value of i.</insert2>

NOTE 4—Encoders are recommended not to include irap_cpb_params_present_flag equal to 1 in buffering period SEI messages associated with a CRA or BLA picture for which at least one of its associated RASL pictures follows one or more of its associated RADL pictures in decoding order.

The semantics of the rest of the syntax elements in the buffering period SEI message remain the same.

Alternatively, additional syntax elements are signalled in the hrd_parameters( ) syntax structure that specify the lengths (in bits) of the syntax elements <insert2>cpb_cross_layer_delay_offset, dpb_cross_layer_delay_offset, nal_initial_alt_cross_layer_cpb_removal_delay[i], nal_initial_alt_cross_layer_cpb_removal_offset[i], vcl_initial_alt_cross_layer_cpb_removal_delay [i], and vcl_initial_alt_cross_layer_cpb_removal_offset[i].</insert2>

Thus, in some examples, video decoder 30 may obtain, from an SEI message of the coded video bitstream, a first syntax element (e.g., irap_cross_layer_cpb_params_present_flag) that specifies whether a second alternative CPB removal delay syntax element (e.g., nal_initial_alt_cross_layer_cpb_removal_delay) and a third alternative CPB removal offset syntax element (e.g., nal_initial_alt_cross_layer_cpb_removal_offset) are present in the SEI message. The second alternative CPB removal delay syntax element may specify an alternative initial CPB removal delay for a CPB when NAL HRD parameters are in use. The third alternative CPB removal offset syntax element specifies an alternative initial CPB removal offset for the CPB when the NAL HRD parameters are in use. Additionally, video decoder 30 may obtain, from the SEI message, a CPB cross layer delay offset syntax element that specifies an offset to be used in a derivation of nominal CPB removal times of access units following, in decoding order, an IRAP access unit associated with the SEI message when CL-RAS pictures associated with the IRAP access unit are not present in the video data bitstream. Video decoder 30 may also obtain, from the SEI message, a decoded picture buffer (DPB) cross layer delay offset syntax element that specifies an offset to be used in a derivation of DPB output times of IRAP access units associated with the SEI message when CL-RAS pictures associated with the IRAP access unit are not present in the video data bitstream.

Similarly, in some examples, a device (e.g., video encoder 20) generates an SEI message that includes a first syntax element (e.g., irap_cross_layer_cpb_params_present_flag) that specifies whether a second alternative CPB removal delay syntax element (e.g., nal_initial_alt_cross_layer_cpb_removal_delay) and a third alternative CPB removal offset syntax element (e.g., nal_initial_alt_cross_layer_cpb_removal_offset) are present in the SEI message. The second alternative CPB removal delay syntax element specifies an alternative initial CPB removal delay for a CPB when NAL HRD parameters are in use. The third alternative CPB removal offset syntax element specifies an alternative initial CPB removal offset for the CPB when the NAL HRD parameters are in use. The SEI message includes a CPB cross layer delay offset syntax element that specifies an offset to be used in a derivation of nominal CPB removal times of access units following, in decoding order, an IRAP access unit associated with the SEI message when CL-RAS pictures associated with the IRAP access unit are not present in the video data bitstream. The SEI message includes a DPB cross layer delay offset syntax element that specifies an offset to be used in a derivation of DPB output times of the IRAP access unit associated with the SEI message when CL-RAS pictures associated with the IRAP access unit are not present in the video data bitstream.

Furthermore, in some examples, video decoder 30 may obtain, from an SEI message of the coded video bitstream, a first syntax element (e.g., irap_cross_layer_cpb_params_present_flag) that specifies whether a second alternative CPB removal delay syntax element (e.g., nal_initial_alt_cross_layer_cpb_removal_delay) and a third alternative CPB removal offset syntax element (e.g., nal_initial_alt_cross_layer_cpb_removal_offset) are present in the SEI message. The second alternative CPB removal delay syntax element may specify an alternative initial CPB removal delay for a CPB when VCL HRD parameters are in use. The third alternative CPB removal offset syntax element specifies an alternative initial CPB removal offset for the CPB when the VCL HRD parameters are in use. Additionally, video decoder 30 may obtain, from the SEI message, a CPB cross layer delay offset syntax element that specifies an offset to be used in a derivation of nominal CPB removal times of access units following, in decoding order, an IRAP access unit associated with the SEI message when CL-RAS pictures associated with the IRAP access unit are not present in the video data bitstream. Video decoder 30 may also obtain, from the SEI message, a DPB cross layer delay offset syntax element that specifies an offset to be used in a derivation of DPB output times of IRAP access units associated with the SEI message when CL-RAS pictures associated with the IRAP access unit are not present in the video data bitstream.

Similarly, in some examples, a device (e.g., video encoder 20) generates an SEI message that includes a first syntax element (e.g., irap_cross_layer_cpb_params_present_flag) that specifies whether a second alternative CPB removal delay syntax element (e.g., nal_initial_alt_cross_layer_cpb_removal_delay) and a third alternative CPB removal offset syntax element (e.g., nal_initial_alt_cross_layer_cpb_removal_offset) are present in the SEI message. The second alternative CPB removal delay syntax element specifies an alternative initial CPB removal delay for a CPB when VCL HRD parameters are in use. The third alternative CPB removal offset syntax element specifies an alternative initial CPB removal offset for the CPB when the VCL HRD parameters are in use. The SEI message includes a CPB cross layer delay offset syntax element that specifies an offset to be used in a derivation of nominal CPB removal times of access units following, in decoding order, an IRAP access unit associated with the SEI message when CL-RAS pictures associated with the IRAP access unit are not present in the video data bitstream. The SEI message includes a DPB cross layer delay offset syntax element that specifies an offset to be used in a derivation of DPB output times of the IRAP access unit associated with the SEI message when CL-RAS pictures associated with the IRAP access unit are not present in the video data bitstream.

Furthermore, in the first set of examples of the techniques of this disclosure, the following changes may be made to Annex C of HEVC Working Draft 10.

This annex specifies the hypothetical reference decoder (HRD) and its use to check bitstream and decoder conformance.

Two types of bitstreams or bitstream subsets are subject to HRD conformance checking for this Specification. The first type, called a Type I bitstream, is a NAL unit stream containing only the VCL NAL units and NAL units with nal_unit_type equal to FD_NUT (filler data NAL units) for all access units in the bitstream. The second type, called a Type II bitstream, contains, in addition to the VCL NAL units and filler data NAL units for all access units in the bitstream, at least one of the following:

additional non-VCL NAL units other than filler data NAL units, all leading_zero_8bits, zero_byte, start_code_prefix_one_3bytes, and trailing_zero_8bits syntax elements that form a byte stream from the NAL unit stream (as specified in Annex B).

Figure 7:
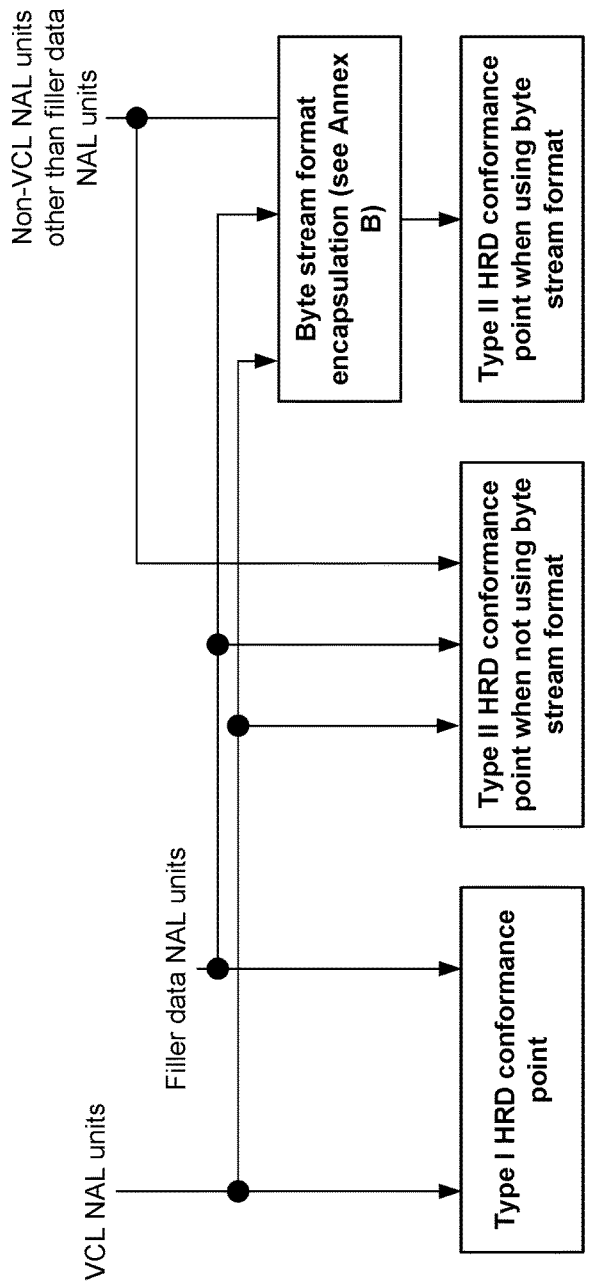
FIG. 7 is a conceptual diagram illustrating an example structure of byte streams and Network Abstraction Layer ("NAL") unit streams for Hypothetical Reference Decoder ("HRD") conformance checks.

FIG. C-1 (reproduced as FIG. 7 of this disclosure) shows the types of bitstream conformance points checked by the HRD.

The syntax elements of non-VCL NAL units (or their default values for some of the syntax elements), required for the HRD, are specified in the semantic subclauses of clause 7, Annexes D and E.

Two types of HRD parameter sets (NAL HRD parameters and VCL HRD parameters) are used. The HRD parameter sets are signalled through the hrd_parameters( ) syntax structure, which may be part of the SPS syntax structure or the VPS syntax structure.

Multiple tests may be needed for checking the conformance of a bitstream, which is referred to as the bitstream under test. For each test, the following steps apply in the order listed:

1. An operation point under test, denoted as TargetOp, is selected. The layer identifier list OpLayerIdList of TargetOp consists of the list of nuh_layer_id values, in increasing order of nuh_layer_id values, present in the bitstream subset associated with TargetOp, which is a subset of the nuh_layer_id values present in the bitstream under test. The OpTid of TargetOp is equal to the highest TemporalId present in the bitstream subset associated with TargetOp.

2. TargetDecLayerIdList is set equal to OpLayerIdList of TargetOp, HighestTid is set equal to OpTid of TargetOp, and the sub-bitstream extraction process as specified in clause 10 is invoked with the bitstream under test, HighestTid, and TargetDecLayerIdList as inputs, and the output is assigned to BitstreamToDecode.

3. The hrd_parameters( ) syntax structure and the sub_layer_hrd_parameters( ) syntax structure applicable to TargetOp are selected. If TargetDecLayerIdList contains all nuh_layer_id values present in the bitstream under test, the hrd_parameters( ) syntax structure in the active SPS (or provided through an external means not specified in this Specification) is selected. Otherwise, the hrd_parameters( ) syntax structure in the active VPS (or provided through some external means not specified in this Specification) that applies to TargetOp is selected. Within the selected hrd_parameters( ) syntax structure, if BitstreamToDecode is a Type I bitstream, the sub_layer_hrd_parameters(HighestTid) syntax structure that immediately follows the condition "if(vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if (vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8bits, zero_byte, start_code_prefix_one_3bytes, and trailing_zero_8bits syntax elements that form a byte stream from the NAL unit stream (as specified in Annex B), when present, are discarded from BitstreamToDecode, and the remaining bitstream is assigned to BitstreamToDecode.

4. An access unit associated with a buffering period SEI message (present in BitstreamToDecode or available through external means not specified in this Specification) applicable to TargetOp is selected as the HRD initialization point and referred to as access unit 0.

5. For each access unit in BitstreamToDecode starting from access unit 0, the buffering period SEI message (present in BitstreamToDecode or available through external means not specified in this Specification) that is associated with the access unit and applies to TargetOp is selected, the picture timing SEI message (present in BitstreamToDecode or available through external means not specified in this Specification) that is associated with the access unit and applies to TargetOp is selected, and when SubPicHrdFlag is equal to 1 and sub_pic_cpb_params_in_pic_timing_sei_flag is equal to 0, the decoding unit information SEI messages (present in BitstreamToDecode or available through external means not specified in this Specification) that are associated with decoding units in the access unit and apply to TargetOp are selected.

6. A value of SchedSelIdx is selected. The selected SchedSelIdx shall be in the range of 0 to cpb_cnt_minus1[HighestTid], inclusive, where cpb_cnt_minus1[HighestTid] is found in the sub_layer_hrd_parameters(HighestTid) syntax structure as selected above.

7. When the coded picture in access unit 0 has nal_unit_type equal to CRA_NUT or BLA_W_LP, and irap_cpb_params_present_flag in the selected buffering period SEI message is equal to 1, either of the following applies for selection of the initial CPB removal delay and delay offset:

If NalHrdModeFlag is equal to 1, the default initial CPB removal delay and delay offset represented by nal_initial_cpb_removal_delay[SchedSelIdx] and nal_initial_cpb_removal_offset[SchedSelIdx], respectively, in the selected buffering period SEI message are selected. Otherwise, the default initial CPB removal delay and delay offset represented by vcl_initial_cpb_removal_delay[SchedSelIdx] and vcl_initial_cpb_removal_offset[SchedSelIdx], respectively, in the selected buffering period SEI message are selected. The variable DefaultInitCpbParamsFlag is set equal to 1.

If NalHrdModeFlag is equal to 1, the alternative initial CPB removal delay and delay offset represented by nal_initial_alt_cpb_removal_delay[SchedSelIdx] and nal_initial_alt_cpb_removal_offset[SchedSelIdx], respectively, in the selected buffering period SEI message are selected. Otherwise, the alternative initial CPB removal delay and delay offset represented by vcl_initial_alt_cpb_removal_delay[SchedSelIdx] and vcl_initial_alt_cpb_removal_offset[SchedSelIdx], respectively, in the selected buffering period SEI message are selected. The variable DefaultInitCpbParamsFlag is set equal to 0, and the RASL access units associated with access unit 0 are discarded from BitstreamToDecode and the remaining bitstream is assigned to BitstreamToDecode.

<insert2>—If NalHrdModeFlag is equal to 1, an alternative initial CPB removal delay and delay offset represented by nal_initial_alt_cross_layer_cpb_removal_delay[SchedSelIdx] and nal_initial_alt_cross_layer_cpb_removal_offset[SchedSelIdx], respectively, in the selected buffering period SEI message are selected. Otherwise, the alternative initial CPB removal delay and delay offset represented by vcl_initial_alt_cross_layer_cpb_removal_delay[SchedSelIdx] and vcl_initial_alt_cross_layer_cpb_removal_offset[SchedSelIdx], respectively, in the selected buffering period SEI message are selected. The variable DefaultInitCpbParamsFlag is set equal to 0, and the CL-RAS pictures associated with access unit 0 are discarded from BitstreamToDecode and the remaining bitstream is assigned to BitstreamToDecode.</insert2>

8. When sub_pic_hrd_params_present_flag in the selected hrd_parameters( ) syntax structure is equal to 1, the CPB is scheduled to operate either at the access unit level (in which case the variable SubPicHrdFlag is set equal to 0) or at the sub-picture level (in which case the variable SubPicHrdFlag is set equal to 1).

For each operation point under test, the number of bitstream conformance tests to be performed is equal to n0*n1*(n2*2+n3)*n4, where the values of n0, n1, n2, n3, and n4 are specified as follows:

n0 is derived as follows:
If BitstreamToDecode is a Type I bitstream, n0 is equal to 1.
Otherwise (BitstreamToDecode is a Type II bitstream), n0 is equal to 2.

n1 is equal to cpb_cnt_minus1[HighestTid]+1.

n2 is the number of access units in BitstreamToDecode that each is associated with a buffering period SEI message applicable to TargetOp and for each of which both of the following conditions are true:
nal_unit_type is equal to CRA_NUT or BLA_W_LP for the VCL NAL units;
The associated buffering period SEI message applicable to TargetOp has irap_cpb_params_present_flag equal to 1.

n3 is the number of access units in BitstreamToDecode BitstreamToDecode that each is associated with a buffering period SEI message applicable to TargetOp and for each of which one or both of the following conditions are true:
nal_unit_type is equal to neither CRA_NUT nor BLA_W_LP for the VCL NAL units;
The associated buffering period SEI message applicable to TargetOp has irap_cpb_params_present_flag equal to 0.

n4 is derived as follows:
If sub_pic_hrd_params_present_flag in the selected hrd_parameters( )) syntax structure is equal to 0, n4 is equal to 1;
Otherwise, n4 is equal to 2.

When BitstreamToDecode is a Type II bitstream, the following applies:
If the sub_layer_hrd_parameters(HighestTid) syntax structure that immediately follows the condition "if(vcl_hrd_parameters_present_flag)" is selected, the test is conducted at the Type I conformance point shown in FIG. C-1, and only VCL and filler data NAL units are counted for the input bit rate and CPB storage.
Otherwise (the sub_layer_hrd_parameters(HighestTid) syntax structure that immediately follows the condition "if(nal_hrd_parameters_present_flag)" is selected), the test is conducted at the Type II conformance point shown in FIG. C-1, and all bytes of the Type II bitstream, which may be a NAL unit stream or a byte stream, are counted for the input bit rate and CPB storage.

NOTE 1—NAL HRD parameters established by a value of SchedSelIdx for the Type II conformance point shown in FIG. C-1 are sufficient to also establish VCL HRD conformance for the Type I conformance point shown in FIG. C-1 for the same values of InitCpbRemovalDelay[SchedSelIdx], BitRate[SchedSelIdx], and CpbSize[SchedSelIdx] for the VBR case (cbr_flag[SchedSelIdx] equal to 0). This is because the data flow into the Type I conformance point is a subset of the data flow into the Type II conformance point and because, for the VBR case, the CPB is allowed to become empty and stay empty until the time a next picture is scheduled to begin to arrive. For example, when decoding a CVS conforming to one or more of the profiles specified in Annex A using the decoding process specified in clauses 2 through 10, when NAL HRD parameters are provided for the Type II conformance point that not only fall within the bounds set for NAL HRD parameters for profile conformance in item f of subclause A.4.2 but also fall within the bounds set for VCL HRD parameters for profile conformance in item e) of subclause A.4.2, conformance of the VCL HRD for the Type I conformance point is also assured to fall within the bounds of item e) of subclause A.4.2.

All VPSs, SPSs and PPSs referred to in the VCL NAL units, and the corresponding buffering period, picture timing and decoding unit information SEI messages shall be conveyed to the HRD, in a timely manner, either in the bitstream (by non-VCL NAL units), or by other means not specified in this Specification.

In Annexes C, D, and E, the specification for "presence" of non-VCL NAL units that contain VPSs, SPSs, PPSs, buffering period SEI messages, picture timing SEI messages, or decoding unit information SEI messages is also satisfied when those NAL units (or just some of them) are conveyed to decoders (or to the HRD) by other means not specified in this Specification. For the purpose of counting bits, only the appropriate bits that are actually present in the bitstream are counted.

NOTE 2—As an example, synchronization of such a non-VCL NAL unit, conveyed by means other than presence in the bitstream, with the NAL units that are present in the bitstream, can be achieved by indicating two points in the bitstream, between which the non-VCL NAL unit would have been present in the bitstream, had the encoder decided to convey it in the bitstream.

When the content of such a non-VCL NAL unit is conveyed for the application by some means other than presence within the bitstream, the representation of the content of the non-VCL NAL unit is not required to use the same syntax as specified in this Specification.

NOTE 3—When HRD information is contained within the bitstream, it is possible to verify the conformance of a bitstream to the requirements of this subclause based solely on information contained in the bitstream. When the HRD information is not present in the bitstream, as is the case for all "stand-alone" Type I bitstreams, conformance can only be verified when the HRD data are supplied by some other means not specified in this Specification.

Figure 8:
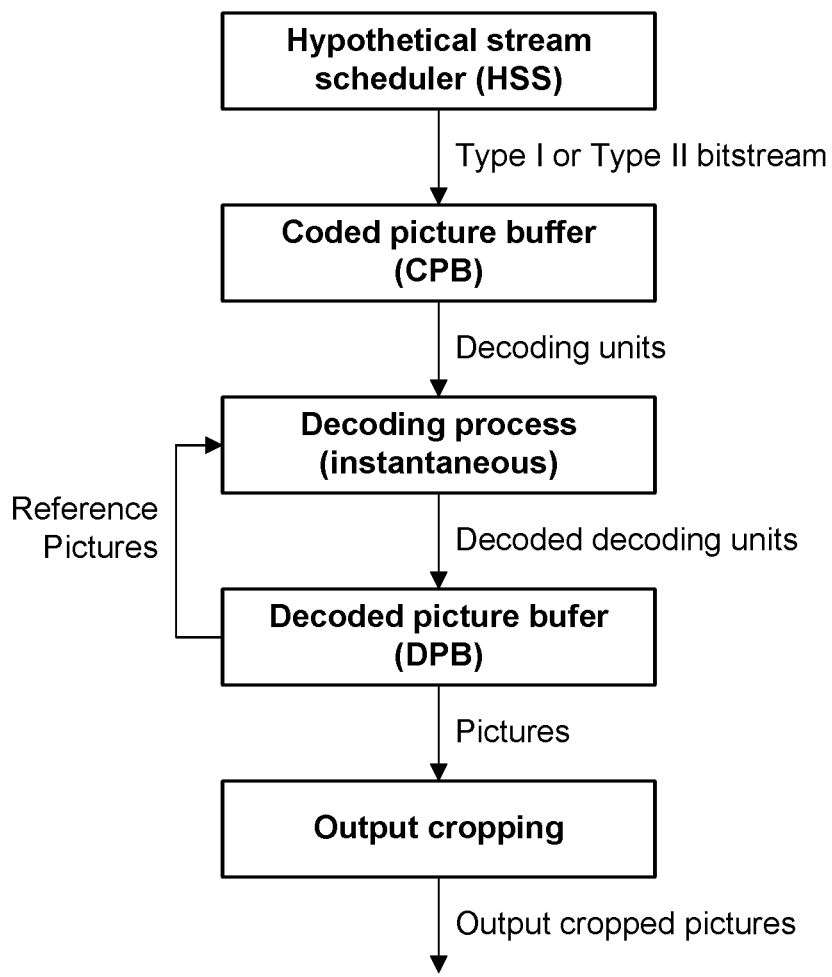
FIG. 8 is a conceptual diagram illustrating an example HRD buffer model.

The HRD contains a coded picture buffer (CPB), an instantaneous decoding process, a decoded picture buffer (DPB), and output cropping as shown in FIG. C-2 (reproduced as FIG. 8 of this disclosure).

For each bitstream conformance test, the CPB size (number of bits) is CpbSize[SchedSelIdx] as specified in subclause E.2.3, where SchedSelIdx and the HRD parameters are specified above in this subclause. The DPB size (number of picture storage buffers) is sps_max_decpic_buffering_minus1[HighestTid]+1.

The variable SubPicHrdPreferredFlag is either specified by external means, or when not specified by external means, set equal to 0.

When the value of the variable SubPicHrdFlag has not been set by step 8 above in this subclause, it is derived as follows:
SubPicHrdFlag=SubPicHrdPreferredFlag &&
sub_pic_hrd_params_present_flag(C-1)

If SubPicHrdFlag is equal to 0, the HRD operates at access unit level and each decoding unit is an access unit. Otherwise the HRD operates at sub-picture level and each decoding unit is a subset of an access unit.

NOTE 4—If the HRD operates at access unit level, each time a decoding unit that is an entire access unit is removed from the CPB. Otherwise (the HRD operates at sub-picture level), each time a decoding unit that is a subset of an access unit is removed from the CPB. In both cases, each time an entire decoded picture is output from the DPB, though the picture output time is derived based on the differently derived CPB removal times and the differently signalled DPB output delays.

The following is specified for expressing the constraints in this annex:

Each access unit is referred to as access unit n, where the number n identifies the particular access unit. Access unit 0 is selected per step 4 above. The value of n is incremented by 1 for each subsequent access unit in decoding order.

Each decoding unit is referred to as decoding unit m, where the number m identifies the particular decoding unit. The first decoding unit in decoding order in access unit 0 is referred to as decoding unit 0. The value of m is incremented by 1 for each subsequent decoding unit in decoding order.

NOTE 5—The numbering of decoding units is relative to the first decoding unit in access unit 0.

Picture n refers to the coded picture or the decoded picture of access unit n.

The HRD operates as follows:

The HRD is initialized at decoding unit 0, with the both the CPB and the DPB being set to be empty (the DPB fullness is set equal to 0).

NOTE 6—After initialization, the HRD is not initialized again by subsequent buffering period SEI messages.

Data associated with decoding units that flow into the CPB according to a specified arrival schedule are delivered by the HSS.

The data associated with each decoding unit are removed and decoded instantaneously by the instantaneous decoding process at the CPB removal time of the decoding unit.

Each decoded picture is placed in the DPB.

A decoded picture is removed from the DPB when it becomes no longer needed for inter prediction reference and no longer needed for output.

For each bitstream conformance test, the operation of the CPB is specified in subclause C.2, the instantaneous decoder operation is specified in clauses 2 through 10, the operation of the DPB is specified in subclause C.3, and the output cropping is specified in subclause C.3.3 and subclause C.5.2.2. HSS and HRD information concerning the number of enumerated delivery schedules and their associated bit rates and buffer sizes is specified in subclauses E.1.2 and E.2.2. The HRD is initialized as specified by the buffering period SEI message specified in subclauses D.2.2 and D.3.2. The removal timing of decoding units from the CPB and output timing of decoded pictures from the DPB is specified using information in picture timing SEI messages (specified in subclauses D.2.3 and D.3.3) or in decoding unit information SEI messages (specified in subclauses D.2.21 and D.3.21). All timing information relating to a specific decoding unit shall arrive prior to the CPB removal time of the decoding unit.

The requirements for bitstream conformance are specified in subclause C.4, and the HRD is used to check conformance of bitstreams as specified above in this subclause and to check conformance of decoders as specified in subclause C.5.

NOTE 7—While conformance is guaranteed under the assumption that all picture-rates and clocks used to generate the bitstream match exactly the values signalled in the bitstream, in a real system each of these may vary from the signalled or specified value.

All the arithmetic in this annex is performed with real values, so that no rounding errors can propagate. For example, the number of bits in a CPB just prior to or after removal of a decoding unit is not necessarily an integer.

The variable ClockTick is derived as follows and is called a clock tick:
 ClockTick=vui_num_units_in_tick÷vui_time_scale (C-2)

The variable ClockSubTick is derived as follows and is called a clock sub-tick:
 ClockSubTick=ClockTick÷(tick_divisor_minus2+2) (C-3)

C.2 Operation of Coded Picture Buffer (CPB)

C.2.1 General

The specifications in this subclause apply independently to each set of CPB parameters that is present and to both the Type I and Type II conformance points shown in FIG. C-1, and the set of CPB parameters is selected as specified in subclause C.1.

C.2.2 Timing of Decoding Unit Arrival

If SubPicHrdFlag is equal to 0, the variable subPicParamsFlag is set equal to 0, and the process in specified in the remainder of this subclause is invoked with a decoding unit being considered as an access unit, for derivation of the initial and final CPB arrival times for access unit n.

Otherwise (SubPicHrdFlag is equal to 1), the process in specified in the remainder of this subclause is first invoked with the variable subPicParamsFlag set equal to 0 and a decoding unit being considered as an access unit, for derivation of the initial and final CPB arrival times for access unit n, and then invoked with subPicParamsFlag set equal to 1 and a decoding unit being considered as a subset of an access unit, for derivation of the initial and final CPB arrival times for the decoding units in access unit n.

The variables InitCpbRemovalDelay[SchedSelIdx] and InitCpbRemovalDelayOffset[SchedSelIdx] are derived as follows:
 If one or more of the following conditions are true, InitCpbRemovalDelay[SchedSelIdx] and InitCpbRemovalDelayOffset[SchedSelIdx] are set equal to the values of the buffering period SEI message syntax elements nal_initial_alt_cpb_removal_delay [SchedSelIdx] and nal_initial_alt_cpb_removal_offset[SchedSelIdx], respectively, when NalHrdModeFlag is equal to 1, or vcl_initial_alt_cpb_removal_delay[SchedSelIdx] and vcl_initial_alt_cpb_removal_offset[SchedSelIdx], respectively, when NalHrdModeFlag is equal to 0, where the buffering period SEI message syntax elements are selected as specified in subclause C.1:
  Access unit 0 is a BLA access unit for which the coded picture has nal_unit_type equal to BLA_W_RADL or BLA_N_LP, and the value of irap_cpb_params_present_flag of the buffering period SEI message is equal to 1.
  Access unit 0 is a BLA access unit for which the coded picture has nal_unit_type equal to BLA_W_LP or is a CRA access unit, and the value of irap_cpb_params_present_flag of the buffering period SEI message is equal to 1, and one or more of the following conditions are true:
  UseAltCpbParamsFlag for access unit 0 is equal to 1.
  DefaultInitCpbParamsFlag is equal to 0.
  The value of subPicParamsFlag is equal to 1.
  <insert2>Else if access unit 0 is an initial IRAP access unit, the value of NoClRasPicPresentFlag is equal to 1, and the value of irap_cross_layer_cpb_params_present_flag of the buffering period SEI message is equal to 1, InitCpbRemovalDelay[SchedSelIdx] and InitCpbRemovalDelayOffset[SchedSelIdx] are set equal to the values of the buffering period SEI message syntax elements nal_initial_alt_cross_layer_cpb_removal_delay[SchedSelIdx] and nal_initial_alt_cross_layer_cpb_removal_offset [SchedSelIdx] respectively, when NalHrdModeFlag is equal to 1, or vcl_initial_alt_cross_layer_cpb_removal_delay[SchedSelIdx] and vcl_initial_alt_cross_laye_cpb_removal_offset[SchedSelIdx], respectively, when NalHrdModeFlag is equal to 0, where the buffering period SEI message containing the syntax elements is selected as specified in subclause C.1.</insert2>
 Otherwise, InitCpbRemovalDelay[SchedSelIdx] and InitCpbRemovalDelayOffset[SchedSelIdx] are set equal to the values of the buffering period SEI message syntax elements nal_initial_cpb_removal_delay[SchedSelIdx] and nal_initial_cpb_removal_offset[SchedSelIdx], respectively, when NalHrdModeFlag is equal to 1, or vcl_initial_cpb_removal_delay[SchedSelIdx] and vcl_initial_cpb_removal_offset[SchedSelIdx], respectively, when NalHrdModeFlag is equal to 0, where the buffering period SEI message syntax elements are selected as specified in subclause C.1.

The time at which the first bit of decoding unit m begins to enter the CPB is referred to as the initial arrival time initArrivalTime[m].

The initial arrival time of decoding unit m is derived as follows:
 If the decoding unit is decoding unit 0 (i.e. m=0), initArrivalTime[0]=0,
 Otherwise (the decoding unit is decoding unit m with m>0), the following applies:
  If cbr_flag[SchedSelIdx] is equal to 1, the initial arrival time for decoding unit m is equal to the final arrival time (which is derived below) of decoding unit m−1, i.e.
  if(! subPicParamsFlag)
   initArrivalTime[m]=AuFinalArrivalTime[m−1] (C-4)
  else initArrivalTime[m]=DuFinalArrivalTime[m−1]
Otherwise (cbr_flag[SchedSelIdx] is equal to 0), the initial arrival time for decoding unit m is derived as follows:
if(! subPicParamsFlag)
  initArrivalTime[m]=Max(AuFinalArrivalTime[m−1], initArrivalEarliestTime[m]) (C-5)
else
  initArrivalTime[m]=Max(DuFinalArrivalTime[m−1], initArrivalEarliestTime[m])
where initArrivalEarliestTime[m] is derived as follows:
The variable tmpNominalRemovalTime is derived as follows:
if(! subPicParamsFlag)
  tmpNominalRemovalTime= AuNominalRemovalTime[m] (C-6)
else
  tmpNominalRemovalTime=DuNominalRemovalTime[m]
where AuNominalRemovalTime[m] and DuNominalRemovalTime[m] are the nominal CPB removal time of access unit m and decoding unit m, respectively, as specified in subclause C.2.3.
If decoding unit m is not the first decoding unit of a subsequent buffering period, initArrivalEarliestTime[m] is derived as follows:
initArrivalEarliestTime[m]=tmpNominalRemovalTime−(InitCpbRemovalDelay[SchedSelIdx]+InitCpbRemovalDelayOffset[SchedSelIdx])÷90000 (C-7)
Otherwise (decoding unit m is the first decoding unit of a subsequent buffering period), initArrivalEarliestTime[m] is derived as follows:
initArrivalEarliestTime[m]=tmpNominalRemovalTime−(InitCpbRemovalDelay[SchedSelIdx]÷90000) (C-8)
The final arrival time for decoding unit m is derived as follows:
if(! subPicParamsFlag)
  AuFinalArrivalTime[m]=initArrivalTime[m]+sizeInbits[m]÷BitRate[SchedSelIdx] (C-9)
else
  DuFinalArrivalTime[m]=initArrivalTime[m]+sizeInbits[m]÷BitRate[SchedSelIdx]
where sizeInbits[m] is the size in bits of decoding unit m, counting the bits of the VCL NAL units and the filler data NAL units for the Type I conformance point or all bits of the Type II bitstream for the Type II conformance point, where the Type I and Type II conformance points are as shown in FIG. C-1. The values of SchedSelIdx, BitRate[SchedSelIdx], and CpbSize[SchedSelIdx] are constrained as follows:
If the content of the selected hrd_parameters( ) syntax structures for the access unit containing decoding unit m and the previous access unit differ, the HSS selects a value SchedSelIdx1 of SchedSelIdx from among the values of SchedSelIdx provided in the selected hrd_parameters( ) syntax structures for the access unit containing decoding unit m that results in a BitRate[SchedSelIdx1] or CpbSize[SchedSelIdx1] for the access unit containing decoding unit m. The value of BitRate[SchedSelIdx1] or CpbSize[SchedSelIdx1] may differ from the value of BitRate[SchedSelIdx0] or CpbSize[SchedSelIdx0] for the value SchedSelIdx0 of SchedSelIdx that was in use for the previous access unit.

Otherwise, the HSS continues to operate with the previous values of SchedSelIdx, BitRate[SchedSelIdx] and CpbSize[SchedSelIdx].
When the HSS selects values of BitRate[SchedSelIdx] or CpbSize[SchedSelIdx] that differ from those of the previous access unit, the following applies:
The variable BitRate[SchedSelIdx] comes into effect at the initial CPB arrival time of the current access unit.
The variable CpbSize[SchedSelIdx] comes into effect as follows:
If the new value of CpbSize[SchedSelIdx] is greater than the old CPB size, it comes into effect at the initial CPB arrival time of the current access unit.
Otherwise, the new value of CpbSize[SchedSelIdx] comes into effect at the CPB removal time of the current access unit.

C.2.3 Timing of Decoding Unit Removal and Decoding of Decoding Unit

The variables InitCpbRemovalDelay[SchedSelIdx], InitCpbRemovalDelayOffset[SchedSelIdx], CpbDelayOffset, and DpbDelayOffset are derived as follows:
If one or more of the following conditions are true, CpbDelayOffset is set equal to the value of the buffering period SEI message syntax element cpb_delay_offset, DpbDelayOffset is set equal to the value of the buffering period SEI message syntax element dpb_delay_offset, and InitCpbRemovalDelay[SchedSelIdx] and InitCpbRemovalDelayOffset[SchedSelIdx] are set equal to the values of the buffering period SEI message syntax elements nal_initial_alt_cpb_removal_delay [SchedSelIdx] and nal_initial_alt_cpb_removal_offset[SchedSelIdx], respectively, when NalHrdModeFlag is equal to 1, or vcl_initial_alt_cpb_removal_delay [SchedSelIdx] and vcl_initial_alt_cpb_removal_offset[SchedSelIdx], respectively, when NalHrdModeFlag is equal to 0, where the buffering period SEI message containing the syntax elements is selected as specified in subclause C.1:
Access unit 0 is a BLA access unit for which the coded picture has nal_unit_type equal to BLA_W_RADL or BLA_N_LP, and the value of irap_cpb_params_present_flag of the buffering period SEI message is equal to 1.
Access unit 0 is a BLA access unit for which the coded picture has nal_unit_type equal to BLA_W_LP or is a CRA access unit, and the value of irap_cpb_params_present_flag of the buffering period SEI message is equal to 1, and one or more of the following conditions are true:
UseAltCpbParamsFlag for access unit 0 is equal to 1.
DefaultInitCpbParamsFlag is equal to 0.
<insert2>—Else if access unit 0 is an initial IRAP access unit, the value of NoClRasPicPresentFlag is equal to 1, and the value of irap_cross_layer_cpb_params_present_flag of the buffering period SEI message is equal to 1, CpbDelayOffset is set equal to the value of the buffering period SEI message syntax element cpb_cross_layer_delay_offset, DpbDelayOffset is set equal to the value of the buffering period SEI message syntax element dpb_cross_layer_delay_offset, and InitCpbRemovalDelay[SchedSelIdx] and InitCpbRemovalDelayOffset[SchedSelIdx] are set equal to the values of the buffering period SEI message syntax elements nal_initial_alt_cross_layer_cpb_removal_delay[SchedSelIdx] and nal_initial_alt_cross_layer_cpb_removal_offset

[SchedSelIdx], respectively, when NalHrdModeFlag is equal to 1, or vcl_initial_alt_cross_layer_cpb_removal_delay[SchedSelIdx] and vcl_initial_alt_cross_laye_cpb_removal_offset[SchedSelIdx], respectively, when NalHrdModeFlag is equal to 0, where the buffering period SEI message containing the syntax elements is selected as specified in subclause C.1.</insert2>

Otherwise, InitCpbRemovalDelay[SchedSelIdx] and InitCpbRemovalDelayOffset[SchedSelIdx] are set equal to the values of the buffering period SEI message syntax elements nal_initial_cpb_removal_delay[SchedSelIdx] and nal_initial_cpb_removal_offset[SchedSelIdx], respectively, when NalHrdModeFlag is equal to 1, or vcl_initial_cpb_removal_delay[SchedSelIdx] and vcl_initial_cpb_removal_offset[SchedSelIdx], respectively, when NalHrdModeFlag is equal to 0, where the buffering period SEI message containing the syntax elements is selected as specified in subclause C.1, CpbDelayOffset and DpbDelayOffset are both set equal to 0.

The nominal removal time of the access unit n from the CPB is specified as follows:
  If access unit n is the access unit with n equal to 0 (the access unit that initializes the HRD), the nominal removal time of the access unit from the CPB is specified by:
  AuNominalRemovalTime[0]=InitCpbRemovalDelay [SchedSelIdx]÷90000 (C-10)
  Otherwise, the following applies:
    When access unit n is the first access unit of a buffering period that does not initialize the HRD, the following applies:
    The nominal removal time of the access unit n from the CPB is specified by:

```
if( !concatenationFlag ) {
  baseTime =
AuNominalRemovalTime[ firstPicInPrevBuffPeriod ]
    tmpCpbRemovalDelay = AuCpbRemovalDelayVal
} else {
  baseTime = AuNominalRemovalTime[ prevNonDiscardablePic ]
  tmpCpbRemovalDelay =
    Max( ( auCpbRemovalDelayDeltaMinus1 + 1 ), (C-11)
      Ceil( ( InitCpbRemovalDelay[ SchedSelIdx ] ÷
      90000 + AuFinalArrivalTime[ n − 1 ] −
      AuNominalRemovalTime[ n − 1 ]
  ) ÷ ClockTick )
}
```

AuNominalRemovalTime(n)=baseTime+ClockTick*(tmpCpbRemovalDelay−CpbDelayOffset)
  where AuNominalRemovalTime[firstPicInPrevBuffPeriod] is the nominal removal time of the first access unit of the previous buffering period, AuNominalRemovalTime[prevNonDiscardablePic] is the nominal removal time of the preceding picture in decoding order with Temporand equal to 0 that is not a RASL, RADL or sub-layer non-reference picture, AuCpbRemovalDelayVal is the value of AuCpbRemovalDelayVal derived according to au_cpb_removal_delay_minus1 in the picture timing SEI message, selected as specified in subclause C.1, associated with access unit n, and concatenationFlag and auCpbRemovalDelayDeltaMinus1 are the values of the syntax elements concatenation_flag and au_cpb_removal_delay_delta_minus1, respectively, in the buffering period SEI message, selected as specified in subclause C.1, associated with access unit n.

After the derivation of the nominal CPB removal time and before the derivation of the DPB output time of access unit n, the values of CpbDelayOffset and DpbDelayOffset are updated as follows:
  If one or more of the following conditions are true, CpbDelayOffset is set equal to the value of the buffering period SEI message syntax element cpb_delay_offset, and DpbDelayOffset is set equal to the value of the buffering period SEI message syntax element dpb_delay_offset, where the buffering period SEI message containing the syntax elements is selected as specified in subclause C.1:
    Access unit n is a BLA access unit for which the coded picture has nal_unit_type equal to BLA_W_RADL or BLA_N_LP, and the value of irap_cpb_params_present_flag of the buffering period SEI message is equal to 1.
    Access unit n is a BLA access unit for which the coded picture has nal_unit_type equal to BLA_W_LP or is a CRA access unit, and the value of irap_cpb_params_present_flag of the buffering period SEI message is equal to 1, and UseAltCpbParamsFlag for access unit n is equal to 1.
  <insert2>—Else if access unit n is an initial IRAP access unit, the value of NoClrasPicPresentFlag is equal to 1, and the value of irap_cross_layer_cpb_params_present_flag of the buffering period SEI message is equal to 1, CpbDelayOffset is set equal to the value of the buffering period SEI message syntax element cpb_cross_layer_delay_offset, and DpbDelayOffset is set equal to the value of the buffering period SEI message syntax element dpb_cross_layer_delay_offset, where the buffering period SEI message containing the syntax elements is selected as specified in subclause C.1.</insert2>
  Otherwise, CpbDelayOffset and DpbDelayOffset are both set equal to 0.

When access unit n is not the first access unit of a buffering period, the nominal removal time of the access unit n from the CPB is specified by:
AuNominalRemovalTime[n]=AuNominalRemovalTime[firstPicInCurrBuffPeriod]+ClockTick* (AuCpbRemovalDelayVal−CpbDelayOffset) (C-12)
  where AuNominalRemovalTime[firstPicInCurrBuffPeriod] is the nominal removal time of the first access unit of the current buffering period, and AuCpbRemovalDelayVal is the value of AuCpbRemovalDelayVal derived according to au_cpb_removal_delay_minus1 in the picture timing SEI message, selected as specified in subclause C.1, associated with access unit n.

When SubPicHrdFlag is equal to 1, the following applies:
  The variable duCpbRemovalDelayInc is derived as follows:
    If sub_pic_cpb_params_in_pic_timing_sei_flag is equal to 0, duCpbRemovalDelayInc is set equal to the value of du_spt_cpb_removal_delay_increment in the decoding unit information SEI message, selected as specified in subclause C.1, associated with decoding unit m.

Otherwise, if du_common_cpb_removal_delay_flag is equal to 0, duCpbRemovalDelayInc is set equal to the value of du_cpb_removal_delay_increment_minus1[i]+1 for decoding unit m in the picture timing SEI message, selected as specified in subclause C.1, associated with access unit n, where the value of i is 0 for the first num_nalus_in_du_minus1[0]+1 consecutive NAL units in the access unit that contains decoding unit m, 1 for the subsequent num_nalus_in_du_minus1[1]+1 NAL units in the same access unit, 2 for the subsequent num_nalus_in_du_minus1[2]+1 NAL units in the same access unit, etc.

Otherwise, duCpbRemovalDelayInc is set equal to the value of du_common_cpb_removal_delay_increment_minus1+1 in the picture timing SEI message, selected as specified in subclause C.1, associated with access unit n.

The nominal removal time of decoding unit m from the CPB is specified as follows, where AuNominalRemovalTime[n] is the nominal removal time of access unit n:

If decoding unit m is the last decoding unit in access unit n, the nominal removal time of decoding unit m DuNominalRemovalTime[m] is set equal to AuNominalRemovalTime[n].

Otherwise (decoding unit m is not the last decoding unit in access unit n), the nominal removal time of decoding unit m DuNominalRemovalTime[m] is derived as follows:

if(sub_pic_cpb_params_in_pic_timing_sei_flag)
  DuNominalRemovalTime[m]=DuNominalRemovalTime[m+1]−
  ClockSubTick*duCpbRemovalDelayInc (C-13)
else
  DuNominalRemovalTime[m]=AuNominalRemovalTime(n)−
  ClockSubTick*duCpbRemovalDelayInc If SubPicHrdFlag is equal to 0, the removal time of access unit n from the CPB is specified as follows, where AuFinalArrivalTime[n] and AuNominalRemovalTime[n] are the final CPB arrival time and nominal CPB removal time, respectively, of access unit n:

if(!low_delay_hrd_flag[HighestTid]||AuNominalRemovalTime[n]>=AuFinalArrivalTime[n])
  AuCpbRemovalTime[n]=AuNominalRemovalTime[n]
else (C-14)
  AuCpbRemovalTime[n]=AuNominalRemovalTime[n]+ClockTick*Ceil((AuFinalArrivalTime[n]−AuNominalRemovalTime[n])÷ClockTick)

NOTE 1—When low_delay_hrd_flag[HighestTid] is equal to 1 and AuNominalRemovalTime[n] is less than AuFinalArrivalTime[n], the size of access unit n is so large that it prevents removal at the nominal removal time.

Otherwise (SubPicHrdFlag is equal to 1), the removal time of decoding unit m from the CPB is specified as follows:

if(!low_delay_hrd_flag[HighestTid]||DuNominalRemovalTime[m]>=DuFinalArrivalTime[m])
  DuCpbRemovalTime[m]=DuNominalRemovalTime[m]
else (C-15)
  DuCpbRemovalTime[m]=DuFinalArrivalTime[m]

NOTE 2—When low_delay_hrd_flag[HighestTid] is equal to 1 and DuNominalRemovalTime[m] is less than DuFinalArrivalTime[m], the size of decoding unit m is so large that it prevents removal at the nominal removal time.

If SubPicHrdFlag is equal to 0, at the CPB removal time of access unit n, the access unit is instantaneously decoded.

Otherwise (SubPicHrdFlag is equal to 1), at the CPB removal time of decoding unit m, the decoding unit is instantaneously decoded, and when decoding unit m is the last decoding unit of access unit n, the following applies:

Picture n is considered as decoded.

The final CPB arrival time of access unit n, i.e. AuFinalArrivalTime[n], is set equal to the final CPB arrival time of the last decoding unit in access unit n, i.e. DuFinalArrivalTime[m].

The nominal CPB removal time of access unit n, i.e. AuNominalRemovalTime[n], is set equal to the nominal CPB removal time of the last decoding unit in access unit n, i.e. DuNominalRemovalTime[m].

The CPB removal time of access unit n, i.e. AuCpbRemovalTime[m], is set equal to the CPB removal time of the last decoding unit in access unit n, i.e. DuCpbRemovalTime[m].

As described with regard to the changes to section C.2.2, above, a device may perform, based in part on a value (e.g., NoClRasPicPresentFlag), a CPB operation. Furthermore, as described with regard to the changes to section C.2.2, above, when the value indicates that not all CL-RAS pictures associated with the IRAP access unit are present in the video data bitstream and a buffering period SEI message includes a first syntax element (e.g., irap_cross_layer_cpb_params_present_flag) that specifies the presence in the buffering period SEI message of a second syntax element (e.g., nal_initial_alt_cross_layer_cpb_removal_delay) and a third syntax element (e.g., nal_initial_alt_cross_layer_cpb_removal_offset), the device may set a CPB removal delay to an alternate removal delay specified by the second syntax element. In addition, the device may set a CPB removal offset to an alternate removal offset specified by the third syntax element.

A second set of examples of the techniques of this disclosure is similar to the first set of examples of the techniques of this disclosure. However, in the second set of examples of the techniques of this disclosure, an alternate syntax structure is used for the HRD parameters to handle the conformance of CL-RAS pictures. In some instances, one or more examples of the first and second sets of examples may be used together or separately. The alternate CPB and DPB removal offsets are introduced in the picture timing SEI message, instead of the buffering period SEI message. Also, an additional SEI message is specified that defines an alternate set of bit rate and CPB size for IRAP access units that can be used when associated CL-RAS pictures of an initial IRAP access unit are removed. Thus, in some examples, a device (e.g., video encoder 20) may generate an SEI message that defines a CPB size for IRAP access unit that are usable when CL-RAS pictures of an initial IRAP access unit are removed.

In the second set of examples of the techniques of this disclosure, the following changes may be made to the picture timing SEI message syntax of HEVC Working Draft 10.

| pic_timing( payloadSize ) { | Descriptor |
|---|---|
|   if( frame_field_info_present_flag ) { | |
|     pic_struct | u(4) |
|     source_scan_type | u(2) |
|     duplicate_flag | u(1) |
|   } | |
|   if( CpbDpbDelaysPresentFlag ) { | |
|     irap_cross_layer_cpb_params_present_flag | u(1) |
|     au_cpb_removal_delay_minus1 | u(v) |
|     pic_dpb_output_delay | u(v) |
|     if( irap_cross_layer_cpb_params_present_flag ) { | |
|       au_alt_cpb_removal_delay_minus1 | u(v) |
|       au_alt_pic_dpb_delay | u(v) |
|     } | |
|     if( sub_pic_hrd_params_present_flag ) | |
|       pic_dpb_output_du_delay | u(v) |
|     if( sub_pic_hrd_params_present_flag && | |
|       sub_pic_cpb_params_in_pic_timing_sei_flag ) { | |
|       num_decoding_units_minus1 | ue(v) |
|       du_common_cpb_removal_delay_flag | u(1) |
|       if( du_common_cpb_removal_delay_flag ) | |
|         du_common_cpb_removal_delay_increment_minus1 | u(v) |
|       for( i = 0; i <= num_decoding_units_minus1; i++ ) { | |
|         num_nalus_in_du_minus1[ i ] | ue(v) |
|         if( !du_common_cpb_removal_delay_flag && i < num_decoding_units_minus1 | |
| ) | |
|           du_cpb_removal_delay_increment_minus1[ i ] | u(v) |
|       } | |
|     } | |
|   } | |
| } | |

In some examples, signalling of irap_cross_layer_cpb_params_present_flag is signalled independently in the buffering period SEI message. Furthermore, in some examples, alternative CPB and DPB parameters are also signalled at the decoding unit (DU) level when sub_pic_hrd_params_present_flag is equal to 1, for sub-picture HRD operations for bitstreams that contain CL-RAS pictures and have sub_pic_hrd_params_present_flag is equal to 1 to operate appropriately for both cases when CL-RAS pictures are present or absent. A DU is a subset of an access unit (When SubPicHrdFlag is equal to 0, a DU is the entire AU).

Furthermore, in accordance with the second set of examples of the techniques of this disclosure, the picture timing SEI message semantics of HEVC Working Draft 10 may be changed as follows. In this example, the semantics of the rest of the syntax elements in the picture timing SEI message may remain the same.

<insert2>irap_cross_layer_cpb_params_present_flag equal to 1 specifies the presence of the initial_alt_cross_layer_cpb_removal_delay[i] and initial_alt_cross_layer_cpb_removal_offset[i] syntax elements. When not present, the value of irap_cross_layer_cpb_params_present_flag is inferred to be equal to 0. When the associated picture is neither a CRA picture nor a BLA picture, the value of irap_cross_layer_cpb_params_present_flag shall be equal to 0.
      NOTE 2—No more than one of the values of sub_pic_hrd_params_present_flag, irap_cpb_params_present_flag and irap_cross_layer_cpb_params_present_flag can be equal to 1.</insert2> au_cpb_removal_delay_minus1 plus 1 specifies the number clock ticks between the nominal CPB removal time of the access unit associated with the picture timing SEI message and the preceding access unit in decoding order that contained a buffering period SEI message. This value is also used to calculate an earliest possible time of arrival of access unit data into the CPB for the HSS. The syntax element is a fixed length code whose length in bits is given by au_cpb_removal_delay_length_minus1+1.

NOTE 6—The value of au_cpb_removal_delay_length_minus1 that determines the length (in bits) of the syntax element au_cpb_removal_delay_minus1 is the value of au_cpb_removal_delay_length_minus1 coded in the VPS or the SPS that is active for the coded picture associated with the picture timing SEI message, although au_cpb_removal_delay_minus1 specifies a number of clock ticks relative to the removal time of the preceding access unit containing a buffering period SEI message, which may be an access unit of a different CVS.

<insert2>au alt_cpb_removal_delay minus1 plus 1 specifies the alternate number clock ticks between the nominal CPB removal time of the access unit associated with the picture timing SEI message and the preceding access unit in decoding order that contained a buffering period SEI message. This value is also used to calculate an earliest possible time of arrival of access unit data into the CPB for the HSS. The syntax element is a fixed length code whose length in bits is given by au_cpb_removal_delay_length_minus1+1.</insert2>

NOTE 6—The value of au_cpb_removal_delay_length_minus1 that determines the length (in bits) of the syntax element au_cpb_removal_delay_minus1 is the value of au_cpb_removal_delay_length_minus1 coded in the VPS or the SPS that is active for the coded picture associated with the picture timing SEI message, although au_cpb_removal_delay_minus1 specifies a number of clock ticks relative to the removal time of the preceding access unit containing a buffering period SEI message, which may be an access unit of a different CVS.

<insert2>The variable UseAuCpbRemovalDelayMinus1 is derived as follows:

If either of the following conditions is true, UseAuCpbRemovalDelayMinus1 is set to be equal to au_alt_cpb_removal_delay_minus1.
  the preceding initial IRAP access unit in decoding order has NoClRasPicPresentFlag equal to 1, irap_cross_layer_cpb_params_present_flag is equal to 1
  if the current AU is an initial IRAP AU that has NoClRasPicPresentFlag equal to 1 and irap_cross_layer_cpb_params_present_flag is equal to 1,
Otherwise, UseAuCpbRemovalDelayMinus1 is set to be equal to au_cpb_removal_delay_minus1.</insert2>
The variable AuCpbRemovalDelayMsb of the current picture is derived as follows:
  If the current picture is associated with a buffering period SEI message that is applicable to at least one of the operation points to which the picture timing SEI message applies, AuCpbRemovalDelayMsb is set equal to 0.
  Otherwise, the following applies:
    Let maxCpbRemovalDelay be equal to $2^{au\_cpb\_removal\_delay\_length\_minus1+1}$.
    Let prevAuCpbRemovalDelayMinus1 and prevAuCpbRemovalDelayMsb be set equal to <insert2>UseAuCpbRemovalDelayMinus1</insert2> <delete>au_cpb_removal_delay_minus1</delete> and AuCpbRemovalDelayMsb, respectively, of the previous picture in decoding order that has TemporalID equal to 0, that is not a RASL, RADL or sub-layer non-reference picture, and that is within the same buffering period as the current picture.
    AuCpbRemovalDelayMsb is derived as follows:
      if(<insert2>UseAuCpbRemovalDelayMinus1</insert2>
        <delete>au_cpb_removal_delay_minus/</delete>−<=prevAuCpbRemovalDelayMinus1)
        AuCpbRemovalDelayMsb=
        prevAuCpbRemovalDelayMsb+maxCpbRemovalDelay (D-1)
      else
        AuCpbRemovalDelayMsb=
        prevAuCpbRemovalDelayMsb
The variable AuCpbRemovalDelayVal is derived as follows:
  AuCpbRemovalDelayVal=AuCpbRemovalDelayMsb+<insert2>UseAuCpbRemovalDelayMinus1</insert2><delete>au_cpb_removal_delay_minus1</delete>+1 (D-2)
The value of AuCpbRemovalDelayVal shall be in the range of 1 to $2^{32}$, inclusive.
Within one buffering period, the AuCpbRemovalDelayVal values for any two access units shall not be the same.
pic_dpb_output_delay is used to compute the DPB output time of the picture when SubPicHrdFlag is equal to 0. It specifies how many clock ticks to wait after removal of the last decoding unit in an access unit from the CPB before the decoded picture is output from the DPB.
  NOTE 7—A picture is not removed from the DPB at its output time when it is still marked as "used for short-term reference" or "used for long-term reference".
The length of the syntax element pic_dpb_output_delay is given in bits by dpb_output_delay_length_minus1+1. When sps_max_decpic_buffering_minus1[minTid] is equal to 0, where minTid is the minimum of the OpTid values of all operation points the picture timing SEI message applies to, pic_dpb_output_delay shall be equal to 0.
<insert2>pic_alt_dpb_output_delay is the alternate value used to compute the DPB output time of the picture when SubPicHrdFlag is equal to 0 and CL-RAS pictures associated with the preceding initial IRAP AU in decoding order are removed from the bitstream. It specifies how many clock ticks to wait after removal of the last decoding unit in an access unit from the CPB before the decoded picture is output from the DPB.
The length of the syntax element pic_alt_dpb_output_delay is given in bits by dpb_output_delay_length_minus1+1. When sps_max_decpic_buffering_minus1[minTid] is equal to 0, where minTid is the minimum of the OpTid values of all operation points the picture timing SEI message applies to, pic_alt_dpb_output_delay shall be equal to 0.<insert2>
The output time derived from the pic_dpb_output_delay or <insert2>pic_alt_dpb_output_delay</insert2> of any picture that is output from an output timing conforming decoder shall precede the output time derived from the pic_dpb_output_delay of all pictures in any subsequent CVS in decoding order.
The picture output order established by the values of <delete>this syntax element</delete> <insert2>pic_dpb_output_delay or pic_alt_dpb_output_delay</insert2> shall be the same order as established by the values of PicOrderCntVal.
For pictures that are not output by the "bumping" process because they precede, in decoding order, an IRAP picture with NoRaslOutputFlag equal to 1 that has no_output_of_prior_pics_flag equal to 1 or inferred to be equal to 1, the output times derived from pic_dpb_output_delay or <insert2>pic_alt_dpb_output_delay</insert2> shall be increasing with increasing value of PicOrderCntVal relative to all pictures within the same CVS.
Furthermore, in the second set of examples of the techniques of this disclosure, a cross-layer HRD parameters SEI message syntax may be defined as follows.
<insert2>

| cross_layer_hrd_parameters( payloadSize ) { | Descriptor |
|---|---|
|   cross_layer_video_parameter_set_id | ue(v) |
|   for( i = 0; i < vps_num_hrd_parameters; i++ ) | |
|     for( j = 0; j < vps_max_sub_layers_minus1; j++ ) | |
|       for( k = 0; k < CrossLayerCpbCnt[ i ][ j ]; k++ ) { | |
|         applicable_poc_cnt[ i ][ j ][ k ] | u(32) |
|         cross_layer_bit_rate_value_minus1[ i ][ j ][ k ] | ue(v) |
|         cross_layer_cpb_size_value_minus1[ i ][ j ][ k ] | ue(v) |
|       } | |
| } | |

</insert2>
Alternatively, in some examples, a cross-layer HRD end SEI message excluding the applicable_poc_cnt[i][j][k] syntax element may also be sent along with each access unit to denote that the syntax elements cross_layer_bit_rate_value_minus1[i][j][k] and cross_layer_cpb_size_value_minus1[i][j][k] are applicable to the associated access unit. Alternatively, in some examples, cross_layer_cpb_size_value_minus1[i][j][k] is not signalled in the cross-layer HRD SEI message. Alternatively, in some examples, the cross-layer bit rate and CPB size are signalled in the VPS (in the extension part, for example). Alternatively, in some examples, the cross-layer HRD parameters SEI message can also be used with HEVC version 1 bitstream (i.e., a bitstream in conformance with HEVC Working Draft 10), where additional bit rate and CPB size parameters are applicable to conformance of bitstreams where the RASL and RADL pictures are interleaved, and the RASL pictures are removed from the bitstream and the associated IRAP picture has NAL unit type BLA_W_RADL.

In accordance with the second set of examples of the techniques of this disclosure, the cross layer HRD parameters SEI message may have the following semantics.

<insert2>This SEI message may and only may be associated with IRAP AUs.

cross_layer_video_parameter_set_id indicates and shall be equal to the value of the vps_video_parameter_set_id of the VPS that is referred to by the VCL NAL units of the access unit associated with the SEI message. The value of cross_layer_video_parameter_set_id shall be in the range of 0 to 15, inclusive. The variable CrossLayerCpbCnt[i][j] is set equal to cpb_cnt_minus1[j]+1 of the i-th set of HRD parameters signalled in the VPS.

applicable_poc_cnt[i][j][k] specifies the access unit until which cross_layer_bit_rate_value_minus1[i][j][k] and cross_layer_cpb_size_value_minus1[i][j][k] are applicable. If there is an access unit that follows the current access unit (i.e. the intial IRAP AU associated with the current SEI message) in decoding order in the CVS, and this access unit contains a picture picA with nuh_layer_id equal to 0 and has PicOrderCntVal equal to the PicOrderCntVal of the picuture in the current access unit with nuh_layer_id equal to 0 plus the value of applicable_poc_cnt, the picture picA is referred to as the cross-layer refresh point access unit. Otherwise, the first access unit in decoding order with picture that has PicOrderCntVal greater than the PicOrderCntVal of the current picture plus the value of recovery_poc_cnt and nuh_layer_id equal to 0 is referred to as the cross-layer refresh point access unit. The cross-layer refresh point access unit shall not precede the current access unit in decoding order. All decoded access units that precede the cross-layer refresh point access unit in decoding order are specified to use cross_layer_bit_rate_value_minus1[i][j][k] and cross_layer_cpb_size_value_minus1[i][j][k] when NoClRasPicPresentFlag associated with the current initial IRAP AU is equal to 0. The value of applicable_poc_cnt shall be in the range of $-2^{31}$ to $2^{31}-1$, inclusive. cross_layer_bit_rate_value_minus1[i][j][k] (together with bit_rate_scale) specifies the maximum input bit rate for the i-th CPB when the CPB operates at the access unit level. cross layer bit rate value minus1[i][j][k] shall be in the range of 0 to $2^{32}-2$, inclusive. For any k>0, cross_layer_bit_rate_value_minus1[i][j][k] shall be greater than cross_layer_bit_rate_value_minus1[i][j][k−1].

When SubPicHrdFlag is equal to 0, the bit rate in bits per second is given by:
CrossLayerBitRate[i]=(cross_layer_bit_rate_value_minus1[i][j][k]+1)*$2^{(6+bit\_rate\_scale)}$ (E-52)

When SubPicHrdFlag is equal to 0 and the cross_layer_bit_rate_value_minus1[i] syntax element is not present, the value of BitRate[i] is inferred to be equal to CpbBrVclFactor*MaxBR for VCL HRD parameters and to be equal to CpbBrNalFactor*MaxBR for NAL HRD parameters, where MaxBR, CpbBrVclFactor and CpbBrNalFactor are specified in subclause A.4.

cross_layer_cpb_size_value_minus1[i][j][k] is used together with cross_layer_cpb_size_scale to specify the i-th CPB size when the CPB operates at the access unit level. cross_layer_cpb_size_value_minus1[i][j][k] shall be in the range of 0 to $2^{32}-2$, inclusive. For any k greater than 0, cross_layer_cpb_size_value_minus1[i][j][k] shall be less than or equal to cross_layer_cpb_size_value_minus1[i][j][k−1].

When SubPicHrdFlag is equal to 0, the CPB size in bits is given by:
CrossLayerCpbSize[i]=(cross_layer_cpb_size_value_minus1[i][j][k]+1)*$2^{(4+cpb\_size\_scale)}$ (E-53)

When SubPicHrdFlag is equal to 0 and the cross_layer_cpb_size_value_minus1[i] syntax element is not present, the value of CpbSize[i] is inferred to be equal to CpbBrVclFactor*MaxCPB for VCL HRD parameters and to be equal to CpbBrNalFactor*MaxCPB for NAL HRD parameters, where MaxCPB, CpbBrVclFactor and CpbBrNalFactor are specified in subclause A.4.</insert2>

Thus, in some examples, video decoder 30 may obtain, from an SEI message of a coded video bitstream, alternate bit rate and CPB size parameters for IRAP access units. For each respective one of the IRAP access units, video decoder 30 may use the alternate bit rate and CPB size parameters for the respective IRAP access unit when the respective IRAP access unit is an initial IRAP access unit with associated CL-RAS pictures not present. Furthermore, in some examples, a device (e.g., video encoder 20) may generate an SEI message that includes a syntax element that indicates an access unit until which a cross-layer bit rate value and a cross-layer CPB size value are applicable. Additionally, in some examples, a device (e.g., video encoder 20) may generate an SEI message that includes a syntax element that specifies a maximum input bit rate of a CPB when the CPB operates at an access unit level.

Furthermore, in the second set of examples of the techniques of this disclosure, the following changes may be made to Annex C, Section C.1, of HEVC Working Draft 10.

C.1 General

This annex specifies the hypothetical reference decoder (HRD) and its use to check bitstream and decoder conformance.

Two types of bitstreams or bitstream subsets are subject to HRD conformance checking for this Specification. The first type, called a Type I bitstream, is a NAL unit stream containing only the VCL NAL units and NAL units with nal_unit_type equal to FD_NUT (filler data NAL units) for all access units in the bitstream. The second type, called a Type II bitstream, contains, in addition to the VCL NAL units and filler data NAL units for all access units in the bitstream, at least one of the following:

additional non-VCL NAL units other than filler data NAL units, all leading_zero_8bits, zero_byte, start_code_prefix_one_3bytes, and trailing_zero_8bits syntax elements that form a byte stream from the NAL unit stream (as specified in Annex B).

FIG. C-1 shows the types of bitstream conformance points checked by the HRD.

The syntax elements of non-VCL NAL units (or their default values for some of the syntax elements), required for the HRD, are specified in the semantic subclauses of clause 7, Annexes D and E.

Two types of HRD parameter sets (NAL HRD parameters and VCL HRD parameters) are used. The HRD parameter sets are signalled through the hrd_parameters( ) syntax structure, which may be part of the SPS syntax structure or the VPS syntax structure.

Multiple tests may be needed for checking the conformance of a bitstream, which is referred to as the bitstream under test. For each test, the following steps apply in the order listed:

1. An operation point under test, denoted as TargetOp, is selected. The layer identifier list OpLayerIdList of TargetOp consists of the list of nuh_layer_id values, in increasing order of nuh_layer_id values, present in the bitstream subset associated with TargetOp, which is a subset of the nuh_layer_id values present in the bitstream under test. The OpTid of TargetOp is equal to the highest TemporalId present in the bitstream subset associated with TargetOp.
2. TargetDecLayerIdList is set equal to OpLayerIdList of TargetOp, HighestTid is set equal to OpTid of TargetOp, and the sub-bitstream extraction process as specified in clause 10 is invoked with the bitstream under test, HighestTid, and TargetDecLayerIdList as inputs, and the output is assigned to BitstreamToDecode.
3. The hrd_parameters( ) syntax structure and the sub_layer_hrd_parameters( ) syntax structure applicable to TargetOp are selected. If TargetDecLayerIdList contains all nuh_layer_id values present in the bitstream under test, the hrd_parameters( ) syntax structure in the active SPS (or provided through an external means not specified in this Specification) is selected. Otherwise, the hrd_parameters( ) syntax structure in the active VPS (or provided through some external means not specified in this Specification) that applies to TargetOp is selected. Within the selected hrd_parameters( ) syntax structure, if BitstreamToDecode is a Type I bitstream, the sub_layer_hrd_parameters(HighestTid) syntax structure that immediately follows the condition "if(vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if (vcl_hrd_parameters_present_flag)" (in this case the variable NalHrdModeFlag is set equal to 0) or the condition "if(nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8bits, zero_byte, start_code_prefix_one_3bytes, and trailing_zero_8bits syntax elements that form a byte stream from the NAL unit stream (as specified in Annex B), when present, are discarded from BitstreamToDecode, and the remaining bitstream is assigned to BitstreamToDecode.
4. An access unit associated with a buffering period SEI message (present in BitstreamToDecode or available through external means not specified in this Specification) applicable to TargetOp is selected as the HRD initialization point and referred to as access unit 0.
5. For each access unit in BitstreamToDecode starting from access unit 0, the buffering period SEI message (present in BitstreamToDecode or available through external means not specified in this Specification) that is associated with the access unit and applies to TargetOp is selected, the picture timing SEI message (present in BitstreamToDecode or available through external means not specified in this Specification) that is associated with the access unit and applies to TargetOp is selected, and when SubPicHrdFlag is equal to 1 and sub_pic_cpb_params_in_pic_timing_sei_flag is equal to 0, the decoding unit information SEI messages (present in BitstreamToDecode or available through external means not specified in this Specification) that are associated with decoding units in the access unit and apply to TargetOp are selected.
6. A value of SchedSelIdx is selected. The selected SchedSelIdx shall be in the range of 0 to cpb_cnt_minus1[HighestTid], inclusive, where cpb_cnt_minus1[HighestTid] is found in the sub_layer_hrd_parameters(HighestTid) syntax structure as selected above.
7. When the coded picture in access unit 0 has nal_unit_type equal to CRA_NUT or BLA_W_LP, and irap_cpb_params_present_flag in the selected buffering period SEI message is equal to 1, either of the following applies for selection of the initial CPB removal delay and delay offset:
    If NalHrdModeFlag is equal to 1, the default initial CPB removal delay and delay offset represented by nal_initial_cpb_removal_delay[SchedSelIdx] and nal_initial_cpb_removal_offset[SchedSelIdx], respectively, in the selected buffering period SEI message are selected. Otherwise, the default initial CPB removal delay and delay offset represented by vcl_initial_cpb_removal_delay[SchedSelIdx] and vcl_initial_cpb_removal_offset[SchedSelIdx], respectively, in the selected buffering period SEI message are selected. The variable DefaultInitCpbParamsFlag is set equal to 1.
    If NalHrdModeFlag is equal to 1, the alternative initial CPB removal delay and delay offset represented by nal_initial_alt_cpb_removal_delay[SchedSelIdx] and nal_initial_alt_cpb_removal_offset[SchedSelIdx], respectively, in the selected buffering period SEI message are selected. Otherwise, the alternative initial CPB removal delay and delay offset represented by vcl_initial_alt_cpb_removal_delay[SchedSelIdx] and vcl_initial_alt_cpb_removal_offset[SchedSelIdx], respectively, in the selected buffering period SEI message are selected. The variable DefaultInitCpbParamsFlag is set equal to 0, and the RASL access units associated with access unit 0 are discarded from BitstreamToDecode and the remaining bitstream is assigned to BitstreamToDecode.
8. <insert2>When NoClRasPicPresentFlag is equal to 1 and access unit 0 is associated with a cross-layer HRD parameters SEI message, the values of BitRate[SchedSelIdx] and CpbSize[SchedSelIdx] are set equal to CrossLayerBitRate[SchedSelIdx] and CrossLayerCpbSize[SchedSelIdx], respectively.</insert2>
9. When sub_pic_hrd_params_present_flag in the selected hrd_parameters( ) syntax structure is equal to 1, the CPB is scheduled to operate either at the access unit level (in which case the variable Sub- PicHrdFlag is set equal to 0) or at the sub-picture level (in which case the variable SubPicHrdFlag is set equal to 1).

For each operation point under test, the number of bitstream conformance tests to be performed is equal to n0*n1*(n2*2+n3)*n4, where the values of n0, n1, n2, n3, and n4 are specified as follows:

n0 is derived as follows:
　If BitstreamToDecode is a Type I bitstream, n0 is equal to 1.
　Otherwise (BitstreamToDecode is a Type II bitstream), n0 is equal to 2.
n1 is equal to cpb_cnt_minus1[HighestTid]+1,
n2 is the number of access units in BitstreamToDecode that each is associated with a buffering period SEI message applicable to TargetOp and for each of which both of the following conditions are true:
　nal_unit_type is equal to CRA_NUT or BLA_W_LP for the VCL NAL units;
　The associated buffering period SEI message applicable to TargetOp has irap_cpb_params_present_flag equal to 1.
n3 is the number of access units in BitstreamToDecode BitstreamToDecode that each is associated with a buffering period SEI message applicable to TargetOp and for each of which one or both of the following conditions are true:
　nal_unit_type is equal to neither CRA_NUT nor BLA_W_LP for the VCL NAL units;
　The associated buffering period SEI message applicable to TargetOp has irap_cpb_params_present_flag equal to 0.
n4 is derived as follows:
　If sub_pic_hrd_params_present_flag in the selected hrd_parameters( ) syntax structure is equal to 0, n4 is equal to 1;
　Otherwise, n4 is equal to 2.

When BitstreamToDecode is a Type II bitstream, the following applies:
　If the sub_layer_hrd_parameters(HighestTid) syntax structure that immediately follows the condition "if (vcl_hrd_parameters_present_flag)" is selected, the test is conducted at the Type I conformance point shown in FIG. C-1, and only VCL and filler data NAL units are counted for the input bit rate and CPB storage.
　Otherwise (the sub_layer_hrd_parameters(HighestTid) syntax structure that immediately follows the condition "if(nal_hrd_parameters_present_flag)" is selected), the test is conducted at the Type II conformance point shown in FIG. C-1, and all bytes of the Type II bitstream, which may be a NAL unit stream or a byte stream, are counted for the input bit rate and CPB storage.

NOTE 1—NAL HRD parameters established by a value of SchedSelIdx for the Type II conformance point shown in FIG. C-1 are sufficient to also establish VCL HRD conformance for the Type I conformance point shown in FIG. C-1 for the same values of InitCpbRemovalDelay[SchedSelIdx], BitRate[SchedSelIdx]<insert2>(or CrossLayerBitRate[SchedSelIdx] when applicable)</insert2>, and CpbSize[SchedSelIdx]<insert2>(or CrossLayerCpbSize[SchedSelIdx] when applicable)</insert2> for the VBR case (cbr_flag[SchedSelIdx] equal to 0). This is because the data flow into the Type I conformance point is a subset of the data flow into the Type II conformance point and because, for the VBR case, the CPB is allowed to become empty and stay empty until the time a next picture is scheduled to begin to arrive. For example, when decoding a CVS conforming to one or more of the profiles specified in Annex A using the decoding process specified in clauses 2 through 10, when NAL HRD parameters are provided for the Type II conformance point that not only fall within the bounds set for NAL HRD parameters for profile conformance in item f) of subclause A.4.2 but also fall within the bounds set for VCL HRD parameters for profile conformance in item e) of subclause A.4.2, conformance of the VCL HRD for the Type I conformance point is also assured to fall within the bounds of item e) of subclause A.4.2.

All VPSs, SPSs and PPSs referred to in the VCL NAL units, and the corresponding buffering period, picture timing and decoding unit information SEI messages shall be conveyed to the HRD, in a timely manner, either in the bitstream (by non-VCL NAL units), or by other means not specified in this Specification.

In Annexes C, D, and E, the specification for "presence" of non-VCL NAL units that contain VPSs, SPSs, PPSs, buffering period SEI messages, picture timing SEI messages, or decoding unit information SEI messages is also satisfied when those NAL units (or just some of them) are conveyed to decoders (or to the HRD) by other means not specified in this Specification. For the purpose of counting bits, only the appropriate bits that are actually present in the bitstream are counted.

NOTE 2—As an example, synchronization of such a non-VCL NAL unit, conveyed by means other than presence in the bitstream, with the NAL units that are present in the bitstream, can be achieved by indicating two points in the bitstream, between which the non-VCL NAL unit would have been present in the bitstream, had the encoder decided to convey it in the bitstream.

When the content of such a non-VCL NAL unit is conveyed for the application by some means other than presence within the bitstream, the representation of the content of the non-VCL NAL unit is not required to use the same syntax as specified in this Specification.

NOTE 3—When HRD information is contained within the bitstream, it is possible to verify the conformance of a bitstream to the requirements of this subclause based solely on information contained in the bitstream. When the HRD information is not present in the bitstream, as is the case for all "stand-alone" Type I bitstreams, conformance can only be verified when the HRD data are supplied by some other means not specified in this Specification.

The HRD contains a coded picture buffer (CPB), an instantaneous decoding process, a decoded picture buffer (DPB), and output cropping as shown in FIG. C-2.

For each bitstream conformance test, the DPB size (number of picture storage buffers) is sps_max_decpic_buffering_minus1[HighestTid]+1.

The variable SubPicHrdPreferredFlag is either specified by external means, or when not specified by external means, set equal to 0.

When the value of the variable SubPicHrdFlag has not been set by step 8 above in this subclause, it is derived as follows:
　SubPicHrdFlag=SubPicHrdPreferredFlag && sub_pic_hrd_params_present_flag(C-1)

If SubPicHrdFlag is equal to 0, the HRD operates at access unit level and each decoding unit is an access unit. Otherwise the HRD operates at sub-picture level and each decoding unit is a subset of an access unit.

NOTE 4—If the HRD operates at access unit level, each time a decoding unit that is an entire access unit is removed from the CPB. Otherwise (the HRD operates at sub-picture level), each time a decoding unit that is a subset of an access unit is removed from the CPB. In both cases, each time an entire decoded picture is output from the DPB, though the picture output time is derived based on the differently derived CPB removal times and the differently signalled DPB output delays.

The following is specified for expressing the constraints in this annex:

Each access unit is referred to as access unit n, where the number n identifies the particular access unit. Access unit 0 is selected per step 4 above. The value of n is incremented by 1 for each subsequent access unit in decoding order.

Each decoding unit is referred to as decoding unit m, where the number m identifies the particular decoding unit. The first decoding unit in decoding order in access unit 0 is referred to as decoding unit 0. The value of m is incremented by 1 for each subsequent decoding unit in decoding order.

NOTE 5—The numbering of decoding units is relative to the first decoding unit in access unit 0.

Picture n refers to the coded picture or the decoded picture of access unit n.

The HRD operates as follows:

The HRD is initialized at decoding unit 0, with the both the CPB and the DPB being set to be empty (the DPB fullness is set equal to 0).

NOTE 6—After initialization, the HRD is not initialized again by subsequent buffering period SEI messages.

Data associated with decoding units that flow into the CPB according to a specified arrival schedule are delivered by the HSS.

The data associated with each decoding unit are removed and decoded instantaneously by the instantaneous decoding process at the CPB removal time of the decoding unit.

Each decoded picture is placed in the DPB.

A decoded picture is removed from the DPB when it becomes no longer needed for inter prediction reference and no longer needed for output.

For each bitstream conformance test, the operation of the CPB is specified in subclause C.2, the instantaneous decoder operation is specified in clauses 2 through 10, the operation of the DPB is specified in subclause C.3, and the output cropping is specified in subclause C.3.3 and subclause C.5.2.2. HSS and HRD information concerning the number of enumerated delivery schedules and their associated bit rates and buffer sizes is specified in subclauses E.1.2 and E.2.2. The HRD is initialized as specified by the buffering period SEI message specified in subclauses D.2.2 and D.3.2. The removal timing of decoding units from the CPB and output timing of decoded pictures from the DPB is specified using information in picture timing SEI messages (specified in subclauses D.2.3 and D.3.3) or in decoding unit information SEI messages (specified in subclauses D.2.21 and D.3.21). All timing information relating to a specific decoding unit shall arrive prior to the CPB removal time of the decoding unit.

The requirements for bitstream conformance are specified in subclause C.4, and the HRD is used to check conformance of bitstreams as specified above in this subclause and to check conformance of decoders as specified in subclause C.5.

NOTE 7—While conformance is guaranteed under the assumption that all picture-rates and clocks used to generate the bitstream match exactly the values signalled in the bitstream, in a real system each of these may vary from the signalled or specified value.

All the arithmetic in this annex is performed with real values, so that no rounding errors can propagate. For example, the number of bits in a CPB just prior to or after removal of a decoding unit is not necessarily an integer. The variable ClockTick is derived as follows and is called a clock tick:

ClockTick=vui_num_units_in_tick÷vui_time_scale (C-2)

The variable ClockSubTick is derived as follows and is called a clock sub-tick:

ClockSubTick=ClockTick÷(tick_divisor_minus2+2) (C-3)

Furthermore, in the second set of examples of the techniques of this disclosure, the following changes may be made to Annex C, Section C.2.2, of HEVC Working Draft 10.

C.2.2 Timing of Decoding Unit Arrival

If SubPicHrdFlag is equal to 0, the variable subPicParamsFlag is set equal to 0, and the process in specified in the remainder of this subclause is invoked with a decoding unit being considered as an access unit, for derivation of the initial and final CPB arrival times for access unit n.

Otherwise (SubPicHrdFlag is equal to 1), the process in specified in the remainder of this subclause is first invoked with the variable subPicParamsFlag set equal to 0 and a decoding unit being considered as an access unit, for derivation of the initial and final CPB arrival times for access unit n, and then invoked with subPicParamsFlag set equal to 1 and a decoding unit being considered as a subset of an access unit, for derivation of the initial and final CPB arrival times for the decoding units in access unit n.

The variables InitCpbRemovalDelay[SchedSelIdx] and InitCpbRemovalDelayOffset[SchedSelIdx] are derived as follows:

If one or more of the following conditions are true, InitCpbRemovalDelay[SchedSelIdx] and InitCpbRemovalDelayOffset[SchedSelIdx] are set equal to the values of the buffering period SEI message syntax elements nal_initial_alt_cpb_removal_delay[SchedSelIdx] and nal_initial_alt_cpb_removal_offset[SchedSelIdx], respectively, when NalHrdModeFlag is equal to 1, or vcl_initial_alt_cpb_removal_delay[SchedSelIdx] and vcl_initial_alt_cpb_removal_offset[SchedSelIdx], respectively, when NalHrdModeFlag is equal to 0, where the buffering period SEI message syntax elements are selected as specified in subclause C.1:

Access unit 0 is a BLA access unit for which the coded picture has nal_unit_type equal to BLA_W_RADL or BLA_N_LP, and the value of irap_cpb_params_present_flag of the buffering period SEI message is equal to 1.

Access unit 0 is a BLA access unit for which the coded picture has nal_unit_type equal to BLA_W_LP or is a CRA access unit, and the value of irap_cpb_params_present_flag of the buffering period SEI message is equal to 1, and one or more of the following conditions are true:
  UseAltCpbParamsFlag for access unit 0 is equal to 1.
  DefaultInitCpbParamsFlag is equal to 0.
The value of subPicParamsFlag is equal to 1.
Otherwise, InitCpbRemovalDelay[SchedSelIdx] and InitCpbRemovalDelayOffset[SchedSelIdx] are set equal to the values of the buffering period SEI message syntax elements nal_initial_cpb_removal_delay[SchedSelIdx] and nal_initial_cpb_removal_offset[SchedSelIdx], respectively, when NalHrdModeFlag is equal to 1, or vcl_initial_cpb_removal_delay[SchedSelIdx] and vcl_initial_cpb_removal_offset[SchedSelIdx], respectively, when NalHrdModeFlag is equal to 0, where the buffering period SEI message syntax elements are selected as specified in subclause C.1.

The time at which the first bit of decoding unit m begins to enter the CPB is referred to as the initial arrival time initArrivalTime[m].

The initial arrival time of decoding unit m is derived as follows:
  If the decoding unit is decoding unit 0 (i.e. m=0), initArrivalTime[0]=0,
  Otherwise (the decoding unit is decoding unit m with m>0), the following applies:
  If cbr_flag[SchedSelIdx] is equal to 1, the initial arrival time for decoding unit m is equal to the final arrival time (which is derived below) of decoding unit m−1, i.e.
    if(! subPicParamsFlag)
      initArrivalTime[m]=AuFinalArrivalTime[m−1] (C-4)
    else
      initArrivalTime[m]=DuFinalArrivalTime[m−1]
  Otherwise (cbr_flag[SchedSelIdx] is equal to 0), the initial arrival time for decoding unit m is derived as follows:
    if(! subPicParamsFlag)
      initArrivalTime[m]=Max(AuFinalArrivalTime[m−1], initArrivalEarliestTime[m]) (C-5)
    else
      initArrivalTime[m]=Max(DuFinalArrivalTime[m−1], initArrivalEarliestTime[m])
  where initArrivalEarliestTime[m] is derived as follows:
    The variable tmpNominalRemovalTime is derived as follows:
      if(! subPicParamsFlag)
        tmpNominalRemovalTime= AuNominalRemovalTime[m] (C-6)
      else
        tmpNominalRemovalTime= DuNominalRemovalTime[m]
    where AuNominalRemovalTime[m] and DuNominalRemovalTime[m] are the nominal CPB removal time of access unit m and decoding unit m, respectively, as specified in subclause C.2.3.
    If decoding unit m is not the first decoding unit of a subsequent buffering period, initArrivalEarliestTime[m] is derived as follows:
      initArrivalEarliestTime[m]=tmpNominalRemovalTime−(InitCpbRemovalDelay[SchedSelIdx]+ InitCpbRemovalDelayOffset[SchedSelIdx])÷90000 (C-7)
    Otherwise (decoding unit m is the first decoding unit of a subsequent buffering period), initArrivalEarliestTime[m] is derived as follows:
      initArrivalEarliestTime[m]=tmpNominalRemovalTime−(InitCpbRemovalDelay[SchedSelIdx]÷90000) (C-8)

The final arrival time for decoding unit m is derived as follows:
  if(! subPicParamsFlag)
    AuFinalArrivalTime[m]=initArrivalTime[m]+ sizeInbits[m]÷BitRate[SchedSelIdx] (C-9)
  else
    DuFinalArrivalTime[m]=initArrivalTime[m]+ sizeInbits[m]÷BitRate[SchedSelIdx]
where sizeInbits[m] is the size in bits of decoding unit m, counting the bits of the VCL NAL units and the filler data NAL units for the Type I conformance point or all bits of the Type II bitstream for the Type II conformance point, where the Type I and Type II conformance points are as shown in FIG. C-1. The values of SchedSelIdx, BitRate[SchedSelIdx], and CpbSize[SchedSelIdx] are constrained as follows:
  If the content of the selected hrd_parameters( ) syntax structures <insert2>(or the cross-layer HRD parameters SEI message, when applicable)</insert2> for the access unit containing decoding unit m and the previous access unit differ, the HSS selects a value SchedSelIdx1 of SchedSelIdx from among the values of SchedSelIdx provided in the selected hrd_parameters( ) syntax structures <insert2>(or the cross-layer HRD parameters SEI message, when applicable)</insert2> for the access unit containing decoding unit m that results in a BitRate[SchedSelIdx1] or CpbSize[SchedSelIdx1] for the access unit containing decoding unit m. The value of BitRate[SchedSelIdx1] or CpbSize[SchedSelIdx1] may differ from the value of BitRate[SchedSelIdx0] or CpbSize[SchedSelIdx0] for the value SchedSelIdx0 of SchedSelIdx that was in use for the previous access unit.
  Otherwise, the HSS continues to operate with the previous values of SchedSelIdx, BitRate[SchedSelIdx] and CpbSize[SchedSelIdx].
When the HSS selects values of BitRate[SchedSelIdx] or CpbSize[SchedSelIdx] that differ from those of the previous access unit, the following applies:
  The variable BitRate[SchedSelIdx] comes into effect at the initial CPB arrival time of the current access unit.
  The variable CpbSize[SchedSelIdx] comes into effect as follows:
    If the new value of CpbSize[SchedSelIdx] is greater than the old CPB size, it comes into effect at the initial CPB arrival time of the current access unit.
    Otherwise, the new value of CpbSize[SchedSelIdx] comes into effect at the CPB removal time of the current access unit.

Furthermore, in the second set of examples of the techniques of this disclosure, the following changes may be made to Annex C, Section C.3.3, of HEVC Working Draft 10. The changes may result in video decoder 30 performing, based at least in part on a value that indicates whether all CL-RAS pictures of an IRAP access unit are present in a video data bitstream (e.g., NoClRasPicPresentFlag), a picture output process.

C.3.3 Picture Output

The processes specified in this subclause happen instantaneously at the CPB removal time of access unit n, AuCpbRemovalTime[n].

When picture n has PicOutputFlag equal to 1, its DPB output time DpbOutputTime[n] is derived as follows, where the variable firstPicInBufferingPeriodFlag is equal to 1 if access unit n is the first access unit of a buffering period and 0 otherwise:

```
if( !SubPicHrdFlag ) {
        DpbOutputTime[ n ] = AuCpbRemovalTime[ n ] +
ClockTick * picDpbOutputDelay      (C-16)
    if( firstPicInBufferingPeriodFlag )
        DpbOutputTime[ n ] -= ClockTick * DpbDelayOffset
} else
        DpbOutputTime[ n ] = AuCpbRemovalTime[ n ] +
ClockSubTick * picSptDpbOutputDuDelay
``` where <delete>picDpbOutputDelay is the value of pic_dpb_output_delay in the picture timing SEI message associated with access unit n, and </delete> picSptDpbOutputDuDelay is the value of pic_spt_dpb_output_du_delay, when present, in the decoding unit information SEI messages associated with access unit n, or the value of pic_dpb_output_du_delay in the picture timing SEI message associated with access unit n when there is no decoding unit information SEI message associated with access unit n or no decoding unit information SEI message associated with access unit n has pic_spt_dpb_output_du_delay present. <insert2>The value of picDpbOutputDelay is set as follows:

If either of the following conditions is true, picDpbOutputDelay is chosen as the value of pic_alt_dpb_output_delay in the picture timing SEI message associated with access unit n.

the preceding initial IRAP AU in decoding order has NoClRasPicPresentFlag equal to 1 and irap_cross_layer_cpb_params_present_flag is equal to 1.

the current AU is an initial IRAP AU that has NoClRasPicPresentFlag equal to 1 and irap_cross_layer_cpb_params_present_flag is equal to 1.

Otherwise, picDpbOutputDelay is the value of pic_alt_dpb_output_delay in the picture timing SEI message associated with access unit n.</insert2>

NOTE—When the syntax element pic_spt_dpb_output_du_delay is not present in any decoding unit information SEI message associated with access unit n, the value is inferred to be equal to pic_dpb_output_du_delay in the picture timing SEI message associated with access unit n.

The output of the current picture is specified as follows:

If PicOutputFlag is equal to 1 and DpbOutputTime[n] is equal to AuCpbRemovalTime[n], the current picture is output.

Otherwise, if PicOutputFlag is equal to 0, the current picture is not output, but will be stored in the DPB as specified in subclause C.3.4.

Otherwise (PicOutputFlag is equal to 1 and DpbOutputTime[n] is greater than AuCpbRemovalTime[n]), the current picture is output later and will be stored in the DPB (as specified in subclause C.3.4) and is output at time DpbOutputTime[n] unless indicated not to be output by the decoding or inference of no_output_of_prior_pics_flag equal to 1 at a time that precedes DpbOutputTime[n].

When output, the picture is cropped, using the conformance cropping window specified in the active SPS for the picture.

When picture n is a picture that is output and is not the last picture of the bitstream that is output, the value of the variable DpbOutputInterval[n] is derived as follows:

DpbOutputInterval[n]=DpbOutputTime[nextPicInOutputOrder]−DpbOutputTime[n] (C-17)

where nextPicInOutputOrder is the picture that follows picture n in output order and has PicOutputFlag equal to 1.

Figure 5:
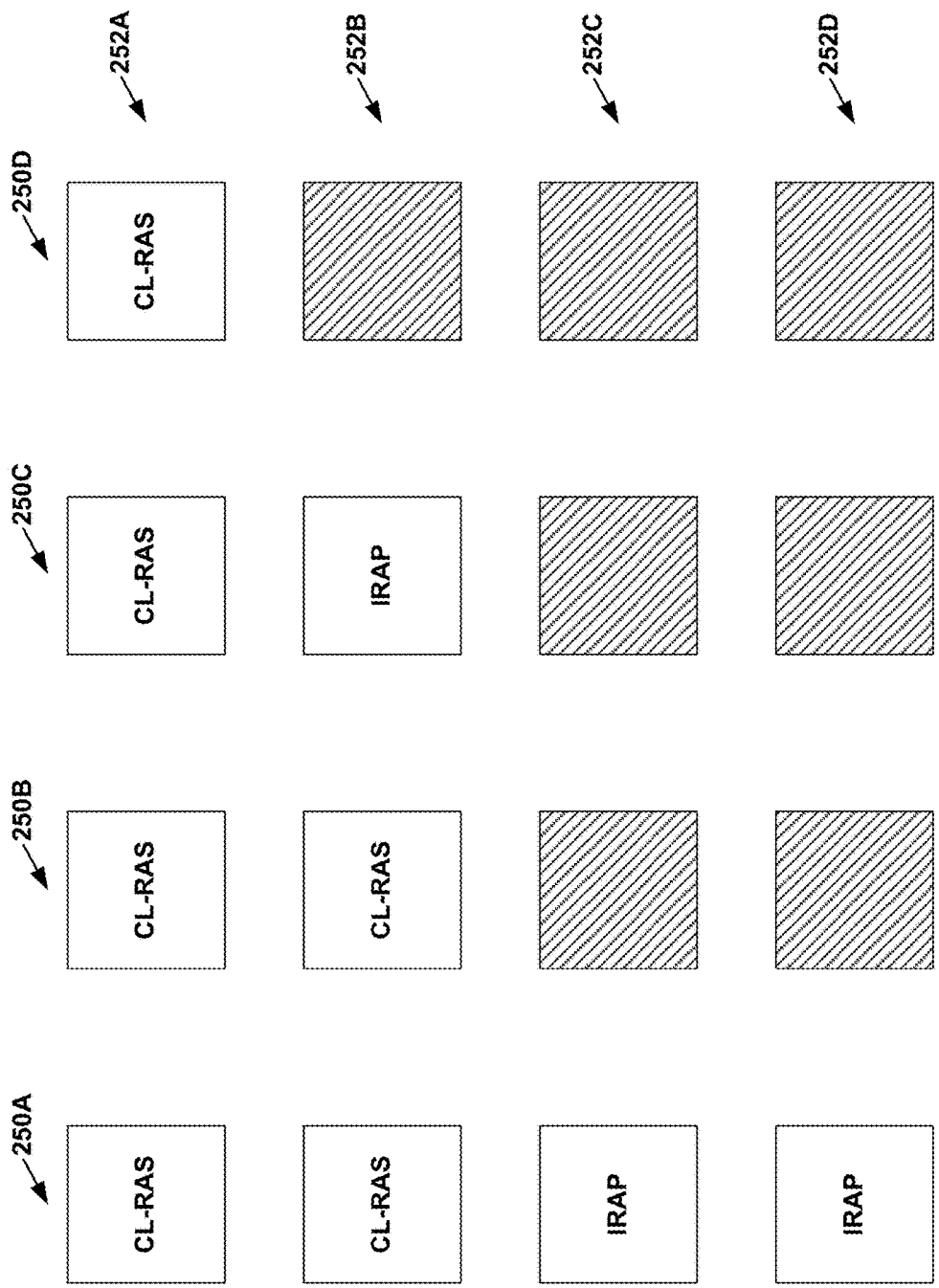
FIG. 5 is a conceptual diagram illustrating CL-RAS pictures, in accordance with one or more techniques of this disclosure.

FIG. 5 is a conceptual diagram illustrating CL-RAS pictures, in accordance with one or more techniques of this disclosure. In the example of FIG. 5, each square represents a different picture. Furthermore, in the example of FIG. 5, the squares are arranged in columns 250A through 250D (collectively, "columns 250") and rows 252A through 252D (collectively, "rows 252"). Each of columns 250 corresponds to a different access unit (AU). Each of rows 252 corresponds to a different layer. Higher ones of rows 252 are dependent on lower ones of rows 252. In the example of FIG. 5, crosshatched squares correspond to non-IRAP, non-CL-RAS pictures.

As shown in the example of FIG. 5, CL-RAS pictures may exist in IRAP access units (i.e., access units that include IRAP pictures at the base layer), such as the access units corresponding to column 250A. Furthermore, as illustrated in the example of FIG. 5, a CL-RAS picture (e.g., the CL-RAS picture in column 250B and row 252B) may exist in an access unit that succeeds, in decoding order, an IRAP access unit and precedes, in decoding order, a layer-switch IRAP access unit that includes an IRAP picture at the same layer as the CL-RAS picture. In the example of FIG. 5, column 250A corresponds to an IRAP access unit and column 250C corresponds to a layer-switch IRAP access unit.

In different instances, the coded representations of CL-RAS pictures may or may not be included in a bitstream. A conforming decoder may be required to be able to decode bitstreams that include CL-RAS pictures and bitstreams that do not include CL-RAS pictures. Hence, in accordance with one or more techniques of this disclosure, a video decoder or other device may determine, based on a value (e.g., NoClRasPicPresentFlag), whether all CL-RAS pictures of an IRAP access unit are present in a video data bitstream.

Figure 6:
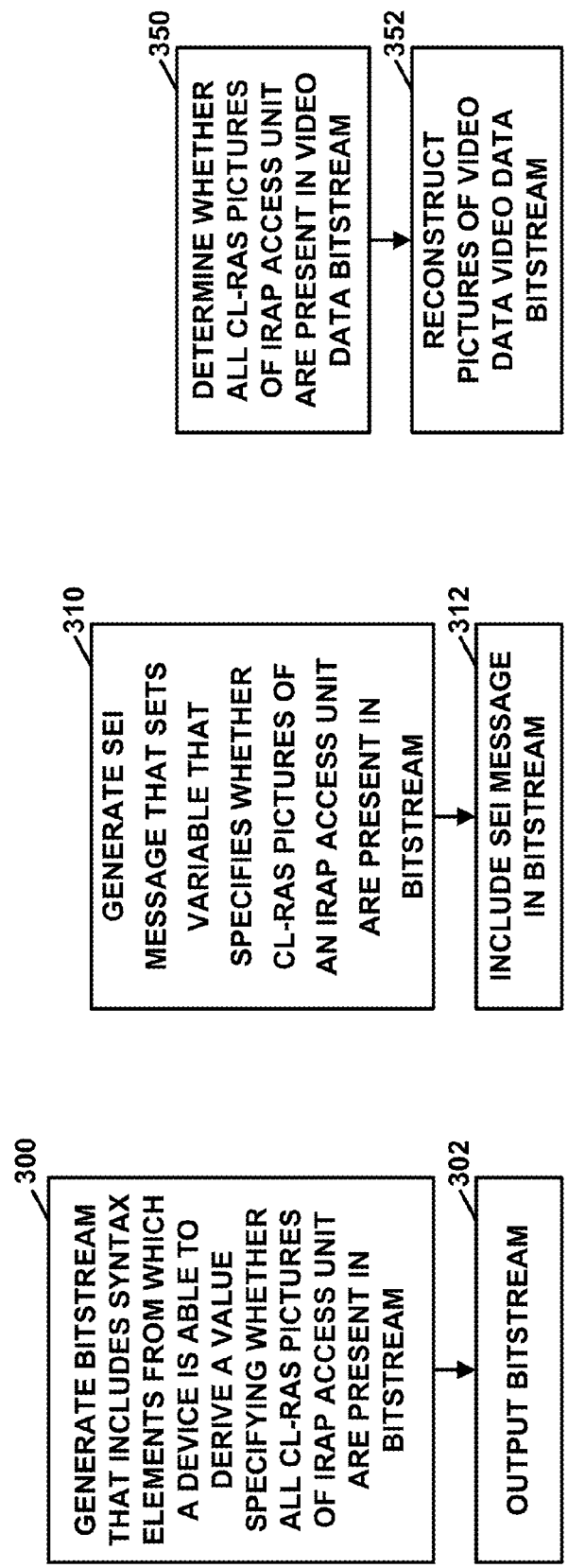
FIG. 6A is a flowchart illustrating an example operation of a video encoder, in accordance with one or more techniques of this disclosure.
FIG. 6B is a flowchart illustrating an example operation of a device, in accordance with one or more techniques of this disclosure.
FIG. 6C is a flowchart illustrating an example operation of a video decoder, in accordance with one or more techniques of this disclosure.

FIG. 6A is a flowchart illustrating an example operation of video encoder 20, in accordance with one or more techniques of this disclosure. FIG. 6A is presented as one example. Other example operations of a video encoder in accordance with the techniques of this disclosure may include more, fewer, or different actions.

In the example of FIG. 6A, video encoder 20 may generate a bitstream that includes a sequence of bits that forms a representation of coded pictures and associated data, wherein the bitstream includes syntax elements from which a device that receives the bitstream is able to derive a value that specifies whether CL-RAS pictures of an IRAP access unit are present in the bitstream (300). In addition, video encoder 20 may output the bitstream (302).

FIG. 6B is a flowchart illustrating an example operation of a device, in accordance with one or more techniques of this disclosure. FIG. 6B is presented as one example. Other example operations of a video decoder in accordance with the techniques of this disclosure may include more, fewer, or different actions. Various devices may perform the operation of FIG. 6B, such as video encoder 20, a media aware network element (MANE), or another type of device. The device may or may not be the device that originally generated a bitstream. In the example of FIG. 6B, the device may generate an SEI message that sets a variable that specifies whether CL-RAS pictures of an IRAP access unit are present in a bitstream that includes a sequence of bits that forms a representation of coded pictures and associated data (310). The device may include the SEI message in the bitstream (312).

FIG. 6C is a flowchart illustrating an example operation of video decoder 30, in accordance with one or more techniques of this disclosure. FIG. 6C is presented as one example. Other example operations of a video decoder in accordance with the techniques of this disclosure may include more, fewer, or different actions.

In the example of FIG. 6C, video decoder 30 may determine, based on a value, whether all CL-RAS pictures of an IRAP access unit are present in a video data bitstream (350). In addition, video decoder 30 may reconstruct pictures of video data based at least in part on syntax elements decoded from the video data bitstream (352).

The following paragraphs provide examples of this disclosure.

Example 1

A method of processing video data, the method comprising determining, based on a value, whether all cross-layer random access skipped (CL-RAS) pictures associated with an intra random access point (IRAP) access unit are present in a video data bitstream.

Example 2

The method of example 1, wherein the method comprises setting the value based at least in part on data in a supplemental enhancement information (SEI) message of the video data bitstream.

Example 3

The method of example 1, wherein the value is set by a mechanism outside a decoding process for the video data.

Example 4

The method of example 3, wherein when a current access unit is an initial IRAP access unit, the value is set by the mechanism outside the decoding process for the video data.

Example 5

The method of example 1, wherein the method comprises setting the value based at least in part on data in a video parameter set (VPS).

Example 6

The method of example 1, further comprising performing a bitstream conformance test to determine whether the video data bitstream conforms to a video coding specification, wherein it is a requirement of bitstream conformance that if a current picture is an IRAP picture with a layer identifier greater than 0, then for each direct reference layer of a current layer, there exists at least one IRAP picture in a coded video sequence (CVS) with a layer identifier equal to a layer identifier of the current layer and with a decoding order preceding the current picture.

Example 7

The method of example 1, wherein an activated sequence parameter set (SPS) raw byte sequence payload (RBSP) for a particular layer id value remains active for a sequence of pictures in decoding order with the particular layer id value, starting from a picture having the particular layer id value in either an initial IRAP access unit or the first access unit after the initial IRAP access unit that contains a picture with nuh_layer_id value, inclusive, until either a next picture having the particular layer id value in an initial IRAP access unit, exclusive, or the end of the CVS, whichever is earlier.

Example 8

The method of example 1, further comprising when the value indicates that not all CL-RAS pictures associated with an IRAP access unit are present in the video data bitstream and a current picture is a CL-RAS picture in an initial IRAP access unit, generating unavailable reference pictures for the CL-RAS pictures.

Example 9

The method of example 1, further comprising: obtaining, from an SEI message of the coded video bitstream, alternate bit rate and coded picture buffer (CPB) size parameters for IRAP access units; and for each respective one of the IRAP access units, using the alternate bit rate and CPB size parameters for the respective IRAP access unit when the respective IRAP access unit is an initial IRAP access unit with associated CL-RAS pictures not present.

Example 10

The method of example 1, further comprising: obtaining, from an SEI message of the coded video bitstream, a syntax element that specifies whether an alternative CPB removal delay syntax element and an alternative CPB removal offset syntax element are present in the SEI message, wherein the alternative CPB removal delay syntax element specifies an alternative initial CPB removal delay for a CPB when Network Abstraction Layer (NAL) Hypothetical Reference Decoder (HRD) parameters are in use, wherein the alternative CPB removal offset syntax element specifies an alternative initial CPB removal offset for the CPB when the NAL HRD parameters are in use; obtaining, from the SEI message, wherein the alternative CPB removal delay syntax elements specifies another set of alternative initial CPB removal delay for a CPB when Video Coding Layer (VCL) Hypothetical Reference Decoder (HRD) parameters are in use, wherein the another alternative CPB removal offset syntax element specifies an alternative initial CPB removal offset for the CPB when the VCL HRD parameters are in use; obtaining, from the SEI message, a CPB cross layer delay offset syntax element that specifies an offset to be used in a derivation of nominal CPB removal times of access units following, in decoding order, an IRAP access unit associated with the SEI message when CL-RAS pictures associated with the IRAP access unit are not present in the video data bitstream; and obtaining, from the SEI message, a decoded picture buffer (DPB) cross layer delay offset syntax element that specifies an offset to be used in a derivation of DPB output times of IRAP access units associated with the SEI message when CL-RAS pictures associated with the IRAP access unit are not present in the video data bitstream.

Example 11

The method of example 1, further comprising: obtaining, from an SEI message of the coded video bitstream, an IRAP cross-layer parameters present syntax element that specifies whether an alternative CPB removal delay syntax element and an alternative CPB removal offset syntax element are present in the SEI message, wherein the alternative CPB removal delay syntax element specifies an alternative initial CPB removal delay for a CPB when Network Abstraction Layer (NAL) Hypothetical Reference Decoder (HRD) parameters are in use, wherein the alternative CPB removal offset syntax element specifies an alternative initial CPB removal offset for the CPB when the NAL HRD parameters are in use.

Example 12

The method of example 1, further comprising: obtaining, from an SEI message of the coded video bitstream, a syntax element that specifies whether an alternative CPB removal delay syntax element and an alternative CPB removal offset syntax element are present in the SEI message, wherein the alternative CPB removal delay syntax element specifies an alternative initial CPB removal delay for a CPB when Video Coding Layer (VCL) HRD parameters are in use, wherein the alternative CPB removal offset syntax element specifies an alternative initial CPB removal offset for the CPB when the VCL HRD parameters are in use.

Example 13

The method of example 12, further comprising performing, based in part on the CPB cross layer delay syntax element and the CPB cross layer removal offset syntax element, a bitstream conformance test to determine whether the video coding bitstream conforms to a video coding standard.

Example 14

The method of example 1, further comprising: obtaining, from an SEI message, a CPB cross-layer removal delay syntax element that specifies an offset to be used in a derivation of nominal CPB removal times of access units following, in decoding order, an IRAP access unit associated with the SEI message when CL-RAS pictures associated with the IRAP access unit are not present in the video data bitstream; and obtaining, from the SEI message, a decoded picture buffer (DPB) cross-layer removal offset syntax element that specifies an offset to be used in a derivation of DPB output times of IRAP access units associated with the SEI message when CL-RAS pictures associated with the IRAP access unit are not present in the video data bitstream.

Example 15

The method of example 14, further comprising performing, based in part on the CPB cross layer delay syntax element and the CPB cross layer removal offset syntax element, a bitstream conformance test to determine whether the video coding bitstream conforms to a video coding standard.

Example 16

The method of example 14, further comprising when the value indicates that not all CL-RAS pictures associated with the IRAP access unit are present in the video data bitstream: setting a CPB delay offset equal to a value of the CPB cross-layer removal delay offset syntax element; and setting a DPB delay offset equal to a value of the DPB cross-layer removal delay offset syntax element.

Example 17

The method of example 1, further comprising performing, based in part on the value, a CPB operation.

Example 18

The method of example 9, further comprising obtaining, from an SEI message of the video coding bitstream, a syntax element that indicates an access unit until which a cross-layer bit rate value and a cross-layer CPB size value are applicable.

Example 19

The method of example 1, further comprising obtaining, from an SEI message of the video coding bitstream, a syntax element that specifies a maximum input bit rate of a CPB when the CPB operates at an access unit level.

Example 20

The method of example 1, further comprising: obtaining, from an SEI message of the video coding bitstream, a syntax element; and determining, based at least in part on the syntax element, a CPB size when the CPB operates at an access unit level.

Example 21

The method of example 1, further comprising performing, based at least in part on the value, a picture output process.

Example 22

A method comprising any of the methods of examples 1-21.

Example 23

A device comprising one or more processors configure to perform the methods of any of examples 1-21.

Example 24

A device comprising means for performing the methods of any of examples 1-21.

Example 25

A computer-readable data storage medium having stored thereon instructions that, when executed, configure a device to perform the methods of any of examples 1-21.

Example 26

A method of encoding video data, the method comprising: generating a Supplemental Enhancement Information (SEI)

message that includes a syntax element that specifies whether an alternative Coded Picture Buffer (CPB) removal delay syntax element and an alternative CPB removal offset syntax element are present in the SEI message, wherein the alternative CPB removal delay syntax element specifies an alternative initial CPB removal delay for a CPB when Network Abstraction Layer (NAL) Hypothetical Reference Decoder (HRD) parameters are in use, wherein the alternative CPB removal offset syntax element specifies an alternative initial CPB removal offset for the CPB when the NAL HRD parameters (and in some examples VCL HRD parameters) are in use; wherein the SEI message includes a CPB cross layer delay offset syntax element that specifies an offset to be used in a derivation of nominal CPB removal times of access units following, in decoding order, an IRAP access unit associated with the SEI message when Cross-Layer Random Access Skipped (CL-RAS) pictures associated with the IRAP access unit are not present in the video data bitstream; and wherein the SEI message includes a decoded picture buffer (DPB) cross layer delay offset syntax element that specifies an offset to be used in a derivation of DPB output times of IRAP access units associated with the SEI message when CL-RAS pictures associated with the IRAP access unit are not present in the video data bitstream.

Example 27

The method of example 26, wherein the SEI message includes an IRAP cross-layer parameters present syntax element that specifies whether an alternative CPB removal delay syntax element and an alternative CPB removal offset syntax element are present in the SEI message, wherein the alternative CPB removal delay syntax element specifies an alternative initial CPB removal delay for a CPB when Network Abstraction Layer (NAL) Hypothetical Reference Decoder (HRD) parameters are in use, wherein the alternative CPB removal offset syntax element specifies an alternative initial CPB removal offset for the CPB when the NAL HRD parameters are in use.

Example 28

The method of example 26, wherein the SEI message includes a syntax element that specifies whether an alternative CPB removal delay syntax element and an alternative CPB removal offset syntax element are present in the SEI message, wherein the alternative CPB removal delay syntax element specifies an alternative initial CPB removal delay for a CPB when Video Coding Layer (VCL) HRD parameters are in use, wherein the alternative CPB removal offset syntax element specifies an alternative initial CPB removal offset for the CPB when the VCL HRD parameters are in use.

Example 29

The method of example 26, wherein the SEI message includes: a CPB cross-layer removal delay syntax element that specifies an offset to be used in a derivation of nominal CPB removal times of access units following, in decoding order, an IRAP access unit associated with the SEI message when CL-RAS pictures associated with the IRAP access unit are not present in the video data bitstream; and a decoded picture buffer (DPB) cross-layer removal offset syntax element that specifies an offset to be used in a derivation of DPB output times of IRAP access units associated with the SEI message when CL-RAS pictures associated with the IRAP access unit are not present in the video data bitstream.

Example 30

A method of encoding video data, the method comprising generating a Supplemental Enhancement Information (SEI) message that includes a syntax element that indicates an access unit until which a cross-layer bit rate value and a cross-layer coded picture buffer CPB size value are applicable.

Example 31

A method of encoding video data, the method comprising generating a Supplemental Enhancement Information (SEI) message that includes a syntax element that specifies a maximum input bit rate of a CPB when the CPB operates at an access unit level.

Example 32

A device comprising one or more processors configure to perform the methods of any of examples 26-31.

Example 33

A device comprising means for performing the methods of any of examples 26-31.

Example 34

A computer-readable data storage medium having stored thereon instructions that, when executed, configure a device to perform the methods of any of examples 26-31.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples, along with various combinations of these examples, are within the scope of the following claims.

What is claimed is:

1. A method of decoding video data performed by a video decoder, the method comprising:
generating unavailable reference pictures and including the unavailable reference pictures in first, second, third, fourth, and fifth reference picture subsets for a cross-layer random access skipped (CL-RAS) picture in an initial intra random access point (IRAP) access unit present in a video data bitstream, wherein:
the CL-RAS picture is a picture that is not an IRAP picture and is in the initial IRAP access unit, wherein the CL-RAS picture contains references to pictures that are not present in the video data bitstream and a layer identifier of the CL-RAS picture is greater than 0,
each reference picture in the first reference picture subset is a short-term reference picture occurring before the CL-RAS picture in output order, each reference picture in the second reference picture subset is a short-term reference picture occurring after the CL-RAS picture in output order, each reference picture in the third reference picture subset is a short-term reference picture that is not used for inter prediction of the CL-RAS picture, each reference picture in the fourth reference picture subset is a long-term reference picture usable for inter-prediction of the CL-RAS picture, and each reference picture in the fifth reference picture subset is a long-term reference picture not used for inter prediction of the CL-RAS picture; and
decoding the CL-RAS picture based at least in part on one or more of the generated unavailable reference pictures.

2. The method of claim 1, wherein the method comprises:
setting a value based at least in part on data in a supplemental enhancement information (SEI) message of the video data bitstream; and
determining, based on the value, whether all CL-RAS pictures associated with the initial IRAP access unit are present in the video data bitstream.

3. The method of claim 1, further comprising:
determining, based on a value, whether all CL-RAS pictures associated with the initial IRAP access unit are present in the video data bitstream, wherein the value is set by a mechanism outside a decoding process for the video data.

4. The method of claim 1, further comprising:
determining, based on a value, whether all CL-RAS pictures associated with the initial IRAP access unit are present in the video data bitstream; and
performing, based in part on the value, a coded picture buffer (CPB) operation.

5. The method of claim 4, wherein performing the CPB operation comprises:
based on the value indicating that not all CL-RAS pictures associated with the initial IRAP access unit are present in the video data bitstream and a buffering period Supplemental Enhancement Information (SEI) message includes a first syntax element that specifies the presence in the buffering period SEI message of a second syntax element and a third syntax element:
setting a CPB removal delay to an alternate removal delay specified by the second syntax element; and
setting a CPB removal offset to an alternate removal offset specified by the third syntax element.

6. The method of claim 1, wherein generating the unavailable reference pictures comprises:
for each respective position in an array for the first reference picture subset, if an entry at the respective position is equal to "no reference picture," generating a reference picture for which the following applies:
a picture order count (POC) value for the generated reference picture is equal to a POC value at the respective position in a first set of POC values,
a picture output flag for the generated reference picture is set equal to 0,
the generated reference picture is marked as used for short-term reference,
the respective position in the array for the first reference picture subset is set to the generated reference picture, and
a layer identifier for the generated reference picture is set to a layer identifier of the CL-RAS picture;
for each respective position in an array for the second reference picture subset, if an entry at the respective position is equal to "no reference picture," generating a reference picture for which the following applies:
a POC value for the generated reference picture is equal to a POC value at the respective position in a second set of POC values,
a picture output flag for the generated reference picture is set equal to 0, the generated reference picture is marked as used for short-term reference,
the respective position in the array for the second reference picture subset is set to the generated reference picture, and
a layer identifier for the generated reference picture is set to the layer identifier of the CL-RAS picture;
for each respective position in an array for the third reference picture subset, if an entry at the respective position is equal to "no reference picture," generating a reference picture for which the following applies:
a POC value for the generated reference picture is equal to a POC value at the respective position in a third set of POC values,
a picture output flag for the generated reference picture is set equal to 0,
the generated reference picture is marked as used for short-term reference,
the respective position in the array for the third reference picture subset is set to the generated reference picture, and
a layer identifier for the generated reference picture is set to the layer identifier of the CL-RAS picture;
for each respective position in an array for the fourth reference picture subset, if an entry at the respective position is equal to "no reference picture," generating a reference picture for which the following applies:
a POC value for the generated reference picture is equal to a POC value at the respective position in a fourth set of POC values,
a value of a syntax element specifying least significant bits of a POC value for the generated picture is inferred to be equal to a result of a bitwise "and" operation of the POC value at the respective position in the fourth set of POC values and a value resulting from a variable that indicates the maximum value that the least significant bits of the POC value are allowed to have minus 1,
a picture output flag for the generated reference picture is set equal to 0,
the generated reference picture is marked as used for long-term reference,
the respective position in the array for the fourth reference picture subset is set to the generated reference picture, and
a layer identifier for the generated reference picture is set to the layer identifier of the CL-RAS picture;
for each respective position in a fifth reference picture subset array, if an entry at the respective position is equal to "no reference picture," generating a reference picture for which the following applies:
a POC value for the generated reference picture is equal to a POC value at the respective position in a fifth set of POC values,
a value of a syntax element specifying least significant bits of a POC value for the generated picture is inferred to be equal to a result of a bitwise "and" operation of the POC value at the respective position in the fifth set of POC values and a value resulting from a variable that indicates the maximum value that the least significant bits of the POC value are allowed to have minus 1,
a picture output flag for the generated reference picture is set equal to 0,
the generated reference picture is marked as used for long-term reference,
the respective position in the fifth reference picture subset array is set to the generated reference picture, and
a layer identifier for the generated reference picture is set to the layer identifier of the CL-RAS picture.

7. The method of claim 1, further comprising performing a bitstream conformance test to determine whether the video data bitstream conforms to a video coding specification, wherein it is a requirement of bitstream conformance that if a current picture is an IRAP picture with a layer identifier greater than 0, then for each direct reference layer of a current layer, there exists at least one IRAP picture in a coded video sequence (CVS) with a layer identifier equal to a layer identifier of the current layer and with a decoding order preceding the current picture.

8. The method of claim 1, further comprising:
obtaining, from an SEI message of the coded video bitstream, a syntax element that specifies whether an alternative CPB removal delay syntax element and an alternative CPB removal offset syntax element are present in the SEI message, wherein the alternative CPB removal delay syntax element specifies an alternative initial CPB removal delay for a CPB when Network Abstraction Layer (NAL) Hypothetical Reference Decoder (HRD) parameters are in use, and wherein the alternative CPB removal offset syntax element specifies an alternative initial CPB removal offset for the CPB when the NAL HRD parameters are in use;
obtaining, from the SEI message, a CPB cross layer delay offset syntax element that specifies an offset to be used in a derivation of nominal CPB removal times of access units following, in decoding order, an IRAP access unit associated with the SEI message when CL-RAS pictures associated with the IRAP access unit associated with the SEI message are not present in the video data bitstream; and
obtaining, from the SEI message, a decoded picture buffer (DPB) cross layer delay offset syntax element that specifies an offset to be used in a derivation of DPB output times of IRAP access units associated with the SEI message when CL-RAS pictures associated with the initial IRAP access unit are not present in the video data bitstream.

9. The method of claim 1, further comprising:
obtaining, from an SEI message of the coded video bitstream, a syntax element that specifies whether an alternative CPB removal delay syntax element and an alternative CPB removal offset syntax element are present in the SEI message, wherein the alternative CPB removal delay syntax element specifies an alternative initial CPB removal delay for a CPB when Video Coding Layer (VCL) Hypothetical Reference Decoder (HRD) parameters are in use, and wherein the alternative CPB removal offset syntax element specifies an alternative initial CPB removal offset for the CPB when the VCL HRD parameters are in use;
obtaining, from the SEI message, a CPB cross layer delay offset syntax element that specifies an offset to be used in a derivation of nominal CPB removal times of access units following, in decoding order, an IRAP access unit associated with the SEI message when CL-RAS pictures associated with the IRAP access unit associated with the SEI message are not present in the video data bitstream; and
obtaining, from the SEI message, a decoded picture buffer (DPB) cross layer delay offset syntax element that specifies an offset to be used in a derivation of DPB output times of IRAP access units associated with the SEI message when CL-RAS pictures associated with the initial IRAP access unit are not present in the video data bitstream.

10. The method of claim 1, further comprising:
determining, based on a value, whether all CL-RAS pictures associated with the initial IRAP access unit are present in the video data bitstream; and
performing, based at least in part on the value, a picture output process.

11. The method of claim 1, wherein the initial IRAP access unit is an access unit containing one or more IRAP pictures in which a coded picture with nuh_layer_id equal to 0 has NoRaslOutputFlag equal to 1, where a picture in a base layer of the initial IRAP access unit is in an IRAP picture and not all of the pictures of the initial IRAP access unit are in IRAP pictures.

12. A device comprising:
a non-transitory data storage medium configured to store video data, and
one or more processors configured to:
generate unavailable reference pictures and include the unavailable reference pictures in first, second, third, fourth, and fifth reference picture subsets for a cross-layer random access skipped (CL-RAS) picture in an initial intra random access point (IRAP) access unit present in a video data bitstream, wherein:
the CL-RAS picture is a picture that is not an IRAP picture but is in the initial IRAP access unit, wherein the CL-RAS picture contains references to pictures that are not present in the video data bitstream and a layer identifier of the CL-RAS picture is greater than 0,
each reference picture in the first reference picture subset is a short-term reference picture occurring before the CL-RAS picture in output order, each reference picture in the second reference picture subset is a short-term reference picture occurring after the CL-RAS picture in output order, each reference picture in the third reference picture subset is a short-term reference picture that is not used for inter prediction of the CL-RAS picture, each reference picture in the fourth reference picture subset is a long-term reference picture usable for inter-prediction of the CL-RAS picture, and each reference picture in the fifth reference picture subset is a long-term reference picture not used for inter prediction of the CL-RAS picture; and
decode the CL-RAS picture based at least in part on one or more of the generated unavailable reference pictures.

13. The device of claim 12, wherein the one or more processors are configured to:
set a value based at least in part on data in a supplemental enhancement information (SEI) message of the video data bitstream; and
determine, based on the value, whether all CL-RAS pictures associated with the initial IRAP access unit are present in the video data bitstream.

14. The device of claim 12, wherein the one or more processors are configured to determine, based on a value, whether all CL-RAS pictures associated with the initial IRAP access unit are present in the video data bitstream, wherein the value is set by a mechanism outside a decoding process for the video data.

15. The device of claim 12, wherein the one or more processors are configured to:
determine, based on a value, whether all CL-RAS pictures associated with the initial IRAP access unit are present in the video data bitstream; and
perform, based in part on the value, a coded picture buffer (CPB) operation.

16. The device of claim 15, wherein the one or more processors are configured such that, as part of performing the CPB operation, the one or more processors:
when the value indicates that not all CL-RAS pictures associated with the initial IRAP access unit are present in the video data bitstream and a buffering period Supplemental Enhancement Information (SEI) message includes a first syntax element that specifies the presence in the buffering period SEI message of a second syntax element and a third syntax element:
set a CPB removal delay to an alternate removal delay specified by the second syntax element; and
set a CPB removal offset to an alternate removal offset specified by the third syntax element.

17. The device of claim 12, wherein the one or more processors are configured such that:
for each respective position in an array for the first reference picture subset, if an entry at the respective position is equal to "no reference picture," the one or more processors generate a reference picture for which the following applies:
a picture order count (POC) value for the generated reference picture is equal to a POC value at the respective position in a first set of POC values,
a picture output flag for the generated reference picture is set equal to 0,
the generated reference picture is marked as used for short-term reference,
the respective position in the array for the first reference picture subset is set to the generated reference picture, and
a layer identifier for the generated reference picture is set to a layer identifier of the CL-RAS picture;
for each respective position in an array for the second reference picture subset, if an entry at the respective position is equal to "no reference picture," the one or more processors generate a reference picture for which the following applies:
a POC value for the generated reference picture is equal to a POC value at the respective position in a second set of POC values,
a picture output flag for the generated reference picture is set equal to 0,
the generated reference picture is marked as used for short-term reference,
the respective position in the array for the second reference picture subset is set to the generated reference picture, and
a layer identifier for the generated reference picture is set to the layer identifier of the CL-RAS picture;
for each respective position in an array for the third reference picture subset, if an entry at the respective position is equal to "no reference picture," the one or more processors generate a reference picture for which the following applies:
a POC value for the generated reference picture is equal to a POC value at the respective position in a third set of POC values,
a picture output flag for the generated reference picture is set equal to 0, the generated reference picture is marked as used for short-term reference,
the respective position in the array for the third reference picture subset is set to the generated reference picture, and
a layer identifier for the generated reference picture is set to the layer identifier of the CL-RAS picture;
for each respective position in an array for the fourth reference picture subset, if an entry at the respective position is equal to "no reference picture," the one or more processors generate a reference picture for which the following applies:
a POC value for the generated reference picture is equal to a POC value at the respective position in a fourth set of POC values,
a value of a syntax element specifying a least significant bits of a POC value for the generated picture is inferred to be equal to a result of a bitwise "and" operation of the POC value at the respective position in the fourth set of POC values and a value resulting from a variable that indicates the maximum value that the least significant bits of the POC value is allowed to have minus 1,
a picture output flag for the generated reference picture is set equal to 0,
the generated reference picture is marked as used for long-term reference,
the respective position in the array for the fourth reference picture subset is set to the generated reference picture, and
a layer identifier for the generated reference picture is set to the layer identifier of the CL-RAS picture;
for each respective position in an array for the fifth reference picture subset, if an entry at the respective position is equal to "no reference picture," the one or more processors generate a reference picture for which the following applies:
a POC value for the generated reference picture is equal to a POC value at the respective position in a fifth set of POC values,
a value of a syntax element specifying a least significant bits of a POC value for the generated picture is inferred to be equal to a result of a bitwise "and" operation of the POC value at the respective position in the fifth set of POC values and a value resulting from a variable that indicates the maximum value that the least significant bits of the POC value are allowed to have minus 1,
a picture output flag for the generated reference picture is set equal to 0,
the generated reference picture is marked as used for long-term reference,
the respective position in the array for the fifth reference picture subset is set to the generated reference picture, and
a layer identifier for the generated reference picture is set to the layer identifier of the CL-RAS picture.

18. The device of claim 12, wherein the one or more processors are configured to perform a bitstream conformance test to determine whether the video data bitstream conforms to a video coding specification, wherein it is a requirement of bitstream conformance that if a current picture is an IRAP picture with a layer identifier greater than 0, then for each direct reference layer of a current layer, there exists at least one IRAP picture in a coded video sequence (CVS) with a layer identifier equal to a layer identifier of the current layer and with a decoding order preceding the current picture.

19. The device of claim 12, wherein the one or more processors are configured to:
obtain, from an SEI message of the coded video bitstream, a syntax element that specifies whether an alternative CPB removal delay syntax element and an alternative CPB removal offset syntax element are present in the SEI message, wherein the alternative CPB removal delay syntax element specifies an alternative initial CPB removal delay for a CPB when Network Abstraction Layer (NAL) Hypothetical Reference Decoder (HRD) parameters are in use, and wherein the alternative CPB removal offset syntax element specifies an alternative initial CPB removal offset for the CPB when the NAL HRD parameters are in use;
obtain, from the SEI message, a CPB cross layer delay offset syntax element that specifies an offset to be used in a derivation of nominal CPB removal times of access units following, in decoding order, an IRAP access unit associated with the SEI message when CL-RAS pictures associated with the IRAP access unit associated with the SEI message are not present in the video data bitstream; and
obtain, from the SEI message, a decoded picture buffer (DPB) cross layer delay offset syntax element that specifies an offset to be used in a derivation of DPB output times of IRAP access units associated with the SEI message when CL-RAS pictures associated with the initial IRAP access unit are not present in the video data bitstream.

20. The device of claim 12, wherein the one or more processors are configured to:
obtain, from an SEI message of the coded video bitstream, a syntax element that specifies whether an alternative CPB removal delay syntax element and an alternative CPB removal offset syntax element are present in the SEI message, wherein the alternative CPB removal delay syntax element specifies an alternative initial CPB removal delay for a CPB when Video Coding Layer (VCL) Hypothetical Reference Decoder (HRD) parameters are in use, and wherein the alternative CPB removal offset syntax element specifies an alternative initial CPB removal offset for the CPB when the NAL HRD parameters are in use;
obtain, from the SEI message, a CPB cross layer delay offset syntax element that specifies an offset to be used in a derivation of nominal CPB removal times of access units following, in decoding order, an IRAP access unit associated with the SEI message when CL-RAS pictures associated with the IRAP access unit associated with the SEI message are not present in the video data bitstream; and
obtain, from the SEI message, a decoded picture buffer (DPB) cross layer delay offset syntax element that specifies an offset to be used in a derivation of DPB output times of IRAP access units associated with the SEI message when CL-RAS pictures associated with the initial IRAP access unit are not present in the video data bitstream.

21. The device of claim 12, wherein the one or more processors are configured to:
determine, based on a value, whether all CL-RAS pictures associated with the initial IRAP access unit are present in the video data bitstream; and perform, based at least in part on the value, a picture output process.

22. The device of claim 12, wherein the initial IRAP access unit is an access unit containing one or more IRAP pictures in which a coded picture with nuh_layer_id equal to 0 has NoRaslOutputFlag equal to 1, where a picture in a base layer of the initial IRAP access unit is in an IRAP picture and not all of the pictures of the initial IRAP access unit are in IRAP pictures.

23. A device for decoding video data, the device comprising:
means for generating unavailable reference pictures and including the unavailable reference pictures in first, second, third, fourth, and fifth reference picture subsets for a cross-layer random access skipped (CL-RAS) picture in an initial intra random access point (IRAP) access unit present in a video data bitstream, wherein:
the CL-RAS picture is a picture that is not an IRAP picture and is in the initial IRAP access unit, wherein the CL-RAS picture contains references to pictures that are not present in the video data bitstream and a layer identifier of the CL-RAS picture is greater than 0, and
each reference picture in the first reference picture subset is a short-term reference picture occurring before the CL-RAS picture in output order, each reference picture in the second reference picture subset is a short-term reference picture occurring after the CL-RAS picture in output order, each reference picture in the third reference picture subset is a short-term reference picture that is not used for inter prediction of the CL-RAS picture, each reference picture in the fourth reference picture subset is a long-term reference picture usable for inter-prediction of the CL-RAS picture, and each reference picture in the fifth reference picture subset is a long-term reference picture not used for inter prediction of the CL-RAS picture; and
means for decoding the CL-RAS picture based at least in part on one or more of the generated unavailable reference pictures.

24. The device of claim 23, wherein the initial IRAP access unit is an access unit containing one or more IRAP pictures in which a coded picture with nuh_layer_id equal to 0 has NoRaslOutputFlag equal to 1, where a picture in a base layer of the initial IRAP access unit is in an IRAP picture and not all of the pictures of the initial IRAP access unit are in IRAP pictures.

25. A non-transitory computer-readable data storage medium having stored thereon instructions that, when executed, cause a device to:
generate unavailable reference pictures and include the unavailable reference pictures in first, second, third, fourth, and fifth reference picture subsets for a cross-layer random access skipped (CL-RAS) picture in an initial intra random access point (IRAP) access unit present in a video data bitstream, wherein:
the CL-RAS picture is a picture that is not an IRAP picture but is in the initial IRAP access unit, wherein the CL-RAS picture contains references to pictures that are not present in the video data bitstream and a layer identifier of the CL-RAS picture is greater than 0,
each reference picture in the first reference picture subset is a short-term reference picture occurring before the CL-RAS picture in output order, each reference picture in the second reference picture subset is a short-term reference picture occurring after the CL-RAS picture in output order, each reference picture in the third reference picture subset is a short-term reference picture that is not used for inter prediction of the CL-RAS picture, each reference picture in the fourth reference picture subset is a long-term reference picture usable for inter-prediction of the CL-RAS picture, and each reference picture in the fifth reference picture subset is a long-term reference picture not used for inter prediction of the CL-RAS picture; and
decode the CL-RAS picture based at least in part on one or more of the generated unavailable reference pictures.

26. The non-transitory computer-readable data storage medium of claim 25, wherein the initial IRAP access unit is an access unit containing one or more IRAP pictures in which a coded picture with nuh_layer_id equal to 0 has NoRaslOutputFlag equal to 1, where a picture in a base layer of the initial IRAP access unit is in an IRAP picture and not all of the pictures of the initial IRAP access unit are in IRAP pictures.

* * * * *